(12) United States Patent
Ryu et al.

(10) Patent No.: US 11,818,636 B2
(45) Date of Patent: Nov. 14, 2023

(54) EXTERNAL AUDIO ELECTRONIC DEVICE, ELECTRONIC DEVICE, AND METHOD OF MANAGING COMMUNICATION LINK

(71) Applicant: Samsung Electronics Co., Ltd., Gyeonggi-do (KR)

(72) Inventors: Kyusang Ryu, Gyeonggi-do (KR); Gupil Cheong, Gyeonggi-do (KR); Sanghyeok Sim, Gyeonggi-do (KR); Sungjun Choi, Gyeonggi-do (KR); Doosuk Kang, Gyeonggi-do (KR); Seongmin Je, Gyeonggi-do (KR)

(73) Assignee: Samsung Electronics Co., Ltd

( * ) Notice: Subject to any disclaimer, the term of this patent is extended or adjusted under 35 U.S.C. 154(b) by 564 days.

(21) Appl. No.: 16/992,748

(22) Filed: Aug. 13, 2020

(65) Prior Publication Data
US 2021/0092578 A1 Mar. 25, 2021

(30) Foreign Application Priority Data
Sep. 20, 2019 (KR) .................. 10-2019-0115829

(51) Int. Cl.
*H04W 4/80* (2018.01)
*H04R 3/12* (2006.01)
(Continued)

(52) U.S. Cl.
CPC ............ *H04W 4/80* (2018.02); *G06F 3/165* (2013.01); *H04R 3/12* (2013.01); *H04W 76/14* (2018.02);
(Continued)

(58) Field of Classification Search
CPC ... H04W 4/80; H04W 68/005; H04W 72/566; H04W 76/15; H04W 76/36; H04W 88/02; H04W 92/18
(Continued)

(56) References Cited

U.S. PATENT DOCUMENTS

| 2009/0061769 A1 | 3/2009 | Zimbric et al. |
| 2012/0057518 A1 | 3/2012 | Herrala et al. |

(Continued)

FOREIGN PATENT DOCUMENTS

| KR | 1020170062853 | 6/2017 |
| KR | 10-2018-0093372 | 8/2018 |

OTHER PUBLICATIONS

International Search Report dated Nov. 19, 2020 issued in counterpart application No. PCT/KR2020/010871, 11 pages.

(Continued)

*Primary Examiner* — Ajibola A Akinyemi
(74) *Attorney, Agent, or Firm* — The Farrell Law Firm, P.C.

(57) ABSTRACT

An audio electronic device includes a communication circuit; and a processor operatively connected to the communication circuit, wherein the processor is configured to establish a first communication link with an external audio electronic device through the communication circuit, receive data from a first external electronic device by monitoring a second communication link established between the external audio electronic device and the first external electronic device, and when a right for a third communication link established between the external audio electronic device and a second external electronic device is given from the external audio electronic device, manage and maintain the third communication link, and transmit and receive data to and from the second external electronic device.

13 Claims, 35 Drawing Sheets

(51) Int. Cl.
*H04W 76/14* (2018.01)
*G06F 3/16* (2006.01)
(52) U.S. Cl.
CPC .... *H04R 2227/005* (2013.01); *H04R 2420/07* (2013.01)
(58) Field of Classification Search
USPC ........................................................ 455/41.2
See application file for complete search history.

(56) References Cited

U.S. PATENT DOCUMENTS

| | | |
|---|---|---|
| 2012/0230510 A1 | 9/2012 | Dinescu et al. |
| 2016/0219358 A1 | 7/2016 | Shaffer et al. |
| 2016/0360350 A1 | 12/2016 | Watson et al. |
| 2017/0078786 A1 | 3/2017 | Schobel et al. |
| 2017/0094389 A1* | 3/2017 | Saulsbury ............ A61B 5/6803 |
| 2017/0311105 A1 | 10/2017 | Hariharan et al. |
| 2018/0084456 A1 | 3/2018 | Gostev et al. |
| 2018/0199282 A1 | 7/2018 | Newham |
| 2018/0205813 A1* | 7/2018 | Watson ................... H04R 3/12 |
| 2019/0037312 A1 | 1/2019 | Watson et al. |
| 2019/0044576 A1 | 2/2019 | Thoen et al. |
| 2019/0052961 A1 | 2/2019 | Yun et al. |

OTHER PUBLICATIONS

European Search Report dated Jul. 5, 2022 issued in counterpart application No. 20866303.9-1216, 13 pages.

* cited by examiner

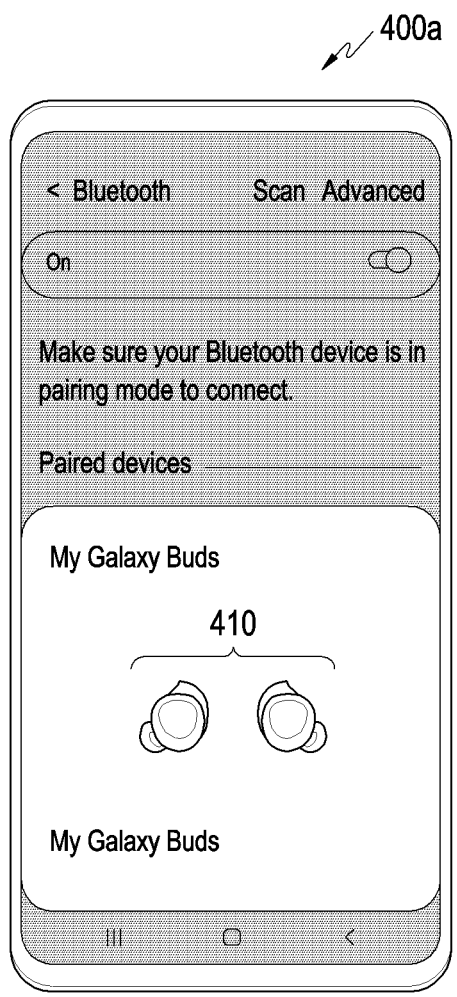
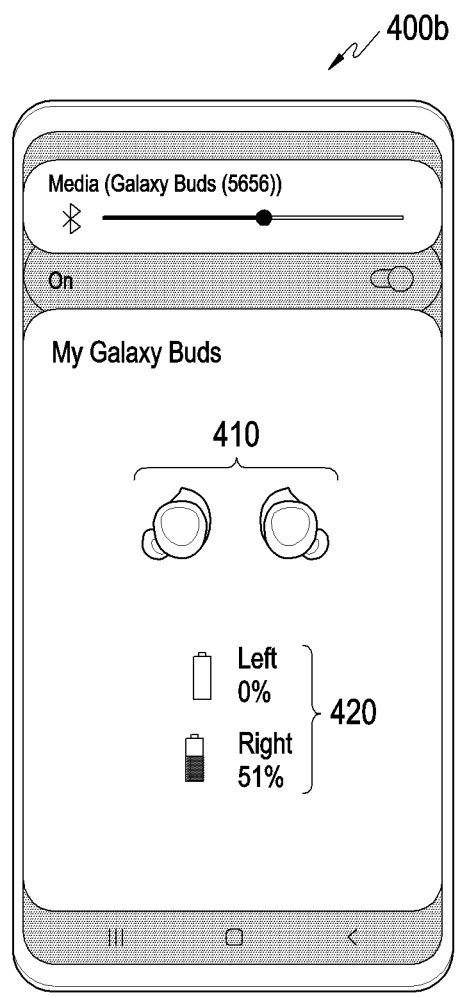
FIG.4A                    FIG.4B

EXTERNAL AUDIO ELECTRONIC DEVICE, ELECTRONIC DEVICE, AND METHOD OF MANAGING COMMUNICATION LINK

CROSS-REFERENCE TO RELATED APPLICATION(S)

This application is based on and claims priority under 35 U.S.C. § 119 to Korean Patent Application No. 10-2019-0115829, filed on Sep. 20, 2019, in the Korean Intellectual Property Office, the disclosure of which is incorporated by reference herein in its entirety.

BACKGROUND

1. Field

The disclosure relates generally to an external audio electronic device and an electronic device, and more particularity to a method of managing a communication link of electronic devices by sharing connection information between electronic devices.

2. Description of Related Art

Electronic devices having a Bluetooth communication function may establish Bluetooth communication with various topologies between a plurality of electronic devices.

A Bluetooth wireless network technology may include a Bluetooth legacy network and a Bluetooth low energy (BLE) network, and the connection may be made through topology of various connection types such as piconet and scatternet. Two devices performing a Bluetooth communication connection operation may have roles as a master and a slave in a connection setup stage, and all communication may be performed based on the roles in the connection setup stage.

A plurality of external electronic devices may be connected to one electronic device through a Bluetooth wireless network, but an infinite number of external electronic devices cannot be connected to one electronic device due to limited communication link sources of the electronic device. In the state in which a plurality of external electronic devices are connected to one electronic device through a Bluetooth wireless network, communication links with the plurality of external electronic devices may not be maintained due to limited communication link resources.

In the state in which a plurality of electronic devices are connected to one electronic device through a Bluetooth wireless network, the electronic device may not perform a basic operation (for example, a BLE scan, a page scan, or an inquiry scan) for the Bluetooth communication connection that should be performed by a user request, and the electronic device may be required to stop the operation of a Bluetooth wireless communication function to guarantee the operation of a Wi-Fi network operating in the same frequency band. Further, when one electronic device is connected to another electronic device through a Bluetooth wireless network, a predetermined amount of current is consumed, and thus current consumption may increase twofold whenever a plurality of external electronic devices are connected to the electronic device.

SUMMARY

The present disclosure has been made to address the above-mentioned problems and disadvantages, and to provide at least the advantages described below.

In accordance with an aspect of the disclosure, an audio electronic device is provided. The audio electronic device includes a communication circuit; and a processor operatively connected to the communication circuit, wherein the processor is configured to establish a first communication link with an external audio electronic device through the communication circuit, receive data from a first external electronic device by monitoring a second communication link established between the external audio electronic device and the first external electronic device, and when a right for a third communication link established between the external audio electronic device and a second external electronic device is given from the external audio electronic device, manage or maintain the third communication link, transmit first data to the second external electronic device, and receive second data from the second external electronic device.

In accordance with another aspect of the disclosure, an audio electronic device is provided. The audio electronic device includes a communication circuit; and a processor operatively connected to the communication circuit, wherein the processor is configured to establish a first communication link with an external audio electronic device through the communication circuit; establish a second communication link with a first external electronic device, and transmit second communication link connection-related information associated with the second communication link to the external audio electronic device through the first communication link; establish a third communication link with a second external electronic device, and transmit third communication link connection-related information associated with the third communication link to the external audio electronic device through the first communication link; receive information on the external audio electronic device through the first communication link, and identify whether to give a right for the second communication link, based on the received information; and give the right for the second communication link to the external audio electronic device, based on the identification, and monitor the second communication link.

In accordance with another aspect of the disclosure, an electronic device is provided. The electronic device includes a communication circuit; a display; and at least one processor operatively connected to the communication circuit and the display, wherein the at least one processor is configured to establish a first communication link with an external electronic device through the communication circuit; receive information on an audio electronic device from the external electronic device through the first communication link; and establish a second communication link with the audio electronic device, based on the received information on the audio electronic device.

In accordance with another aspect of the disclosure, an audio electronic device is provided. The audio electronic device includes a communication circuit; a speaker; and a processor operatively connected to the communication circuit and the speaker, wherein the processor is configured to establish a first communication link with an external audio electronic device through the communication circuit; monitor a second communication link established between the external audio electronic device and a first external electronic device, and receive data from the first external electronic device; receive information on a second external electronic device establishing a third communication link with the first external electronic device through the first communication link; and establish a fourth communication link with the second external electronic device, based on the received information on the second external electronic device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A illustrates the search result of a pair of external audio electronic devices, according to an embodiment;

FIG. 4B illustrates the search result of a pair of external audio electronic devices, according to an embodiment;

DETAILED DESCRIPTION

Figure 1:
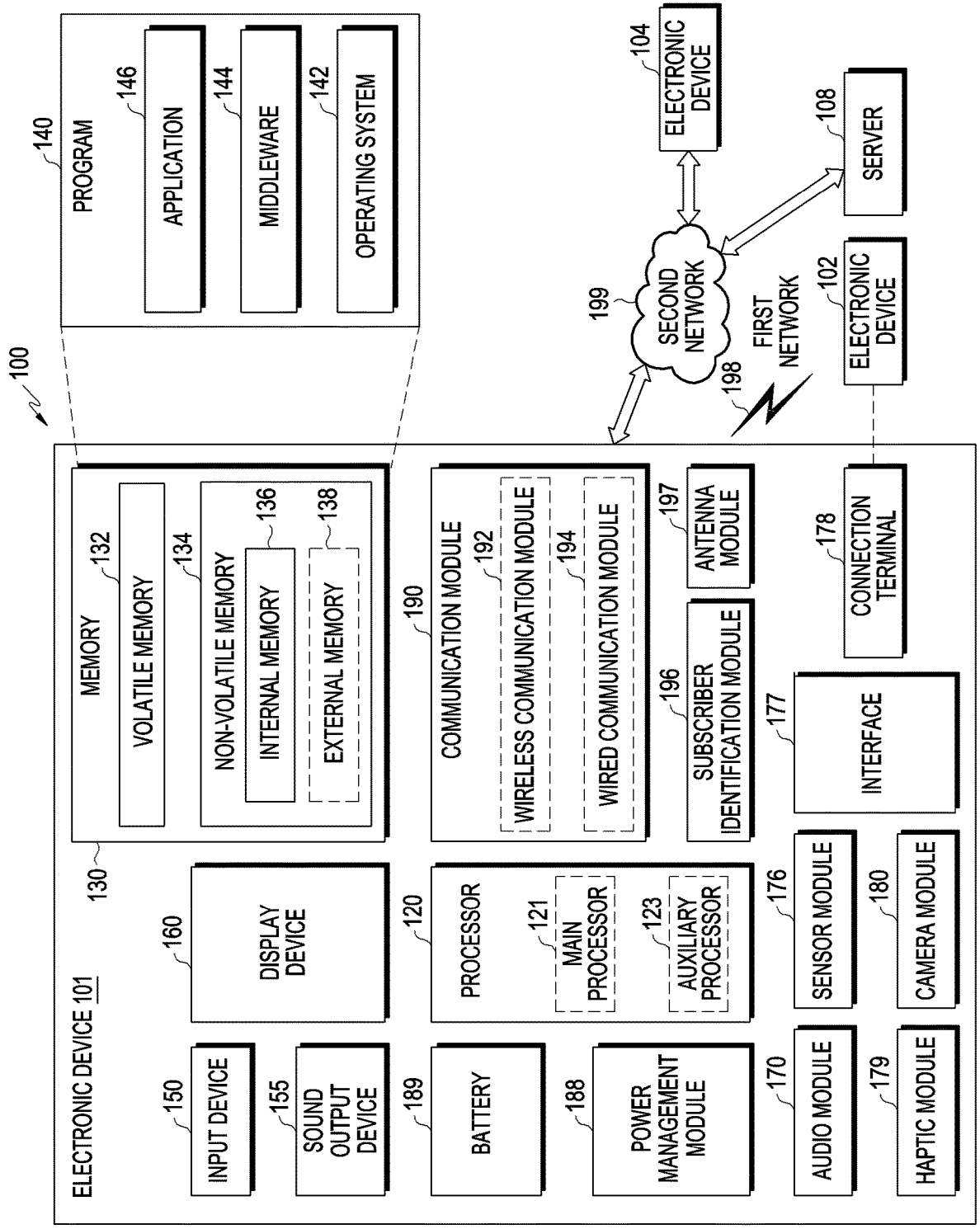
FIG. 1 is a block diagram of an electronic device within a network environment, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

According to various embodiments, the disclosure relates to an external audio electronic device, an electronic device, and a method of managing a communication link for efficiently managing communication links of electronic devices by sharing connection information between electronic devices connected through Bluetooth communication.

According to various embodiments, it is possible to efficiently manage communication links of electronic devices by sharing connection information between electronic devices connected through Bluetooth communication.

According to various embodiments, it is possible to increase efficiency of a communication link with limited communication resources, prevent a state in which the operation of a Bluetooth communication function should be stopped for the operation of another wireless network operating in the same frequency band, and reduce current consumption of the electronic device.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic 2 devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
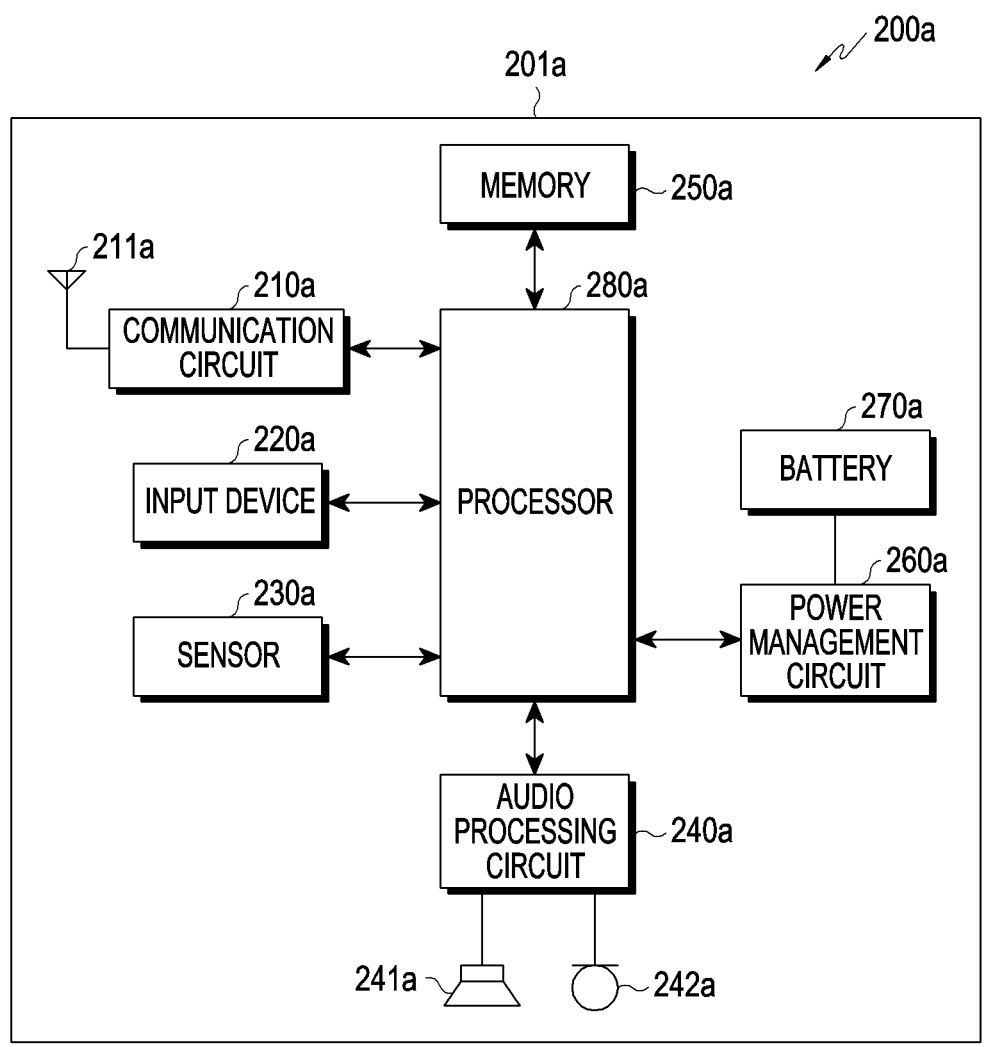
FIG. 2A is a block diagram schematically illustrating a first external audio electronic device, according to an embodiment.
Figure 2B:
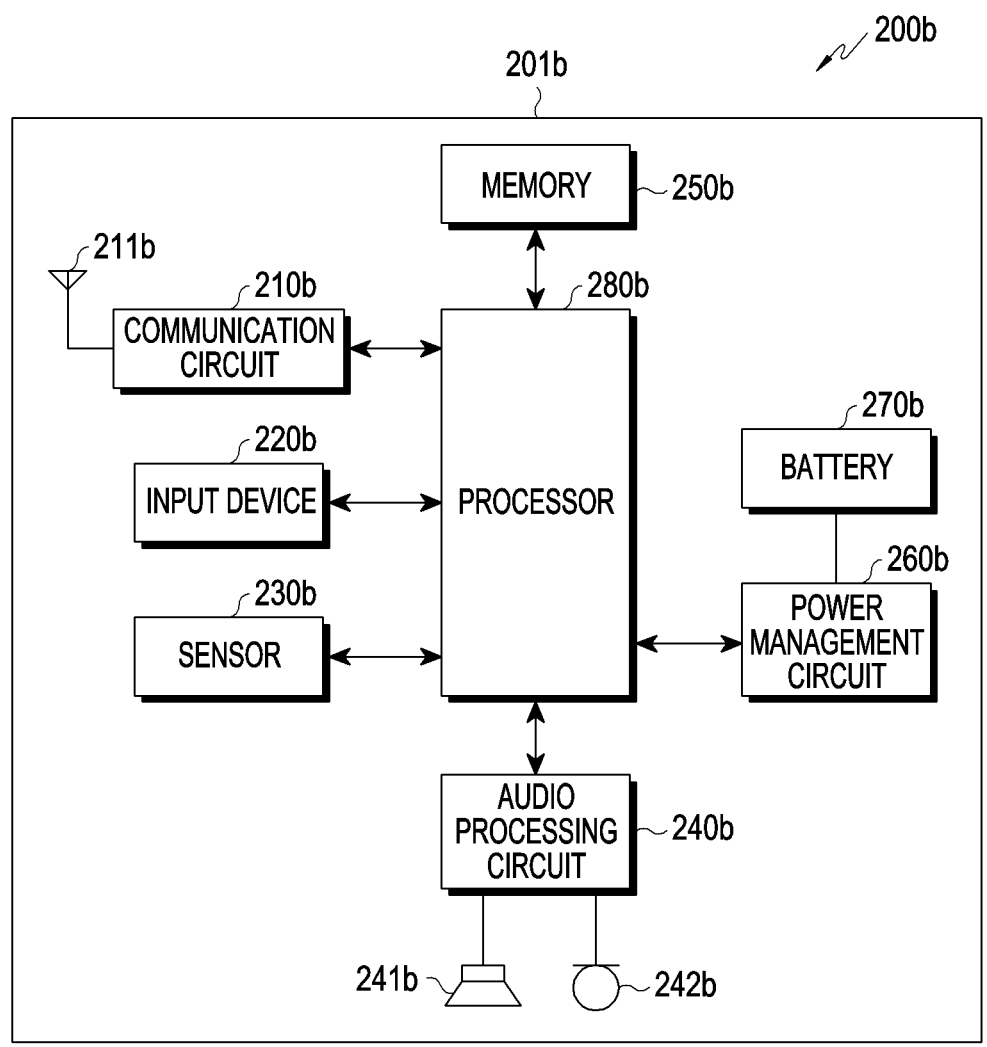
FIG. 2B is a block diagram schematically illustrating a second external audio electronic device, according to an embodiment.

FIG. 2A is a block diagram 200a schematically illustrating a first external audio electronic device, according to an embodiment, and FIG. 2B is a block diagram 200b schematically illustrating a second external audio electronic device, according to an embodiment.

Referring to FIGS. 2A and 2B, the first and second external audio electronic devices 201a and 201b may include communication circuits 210a and 210b (a first communication circuit 210 and a second communication circuit 210b), antennas 211a and 211b (a first antenna 211a and a second antenna 211a 211b), input devices 220a and 220b (a first input device 220a and a second device 220b), sensors 230a and 230b (a first sensor 230a and a second sensor 230b), audio processing circuits 240a and 240b (a first audio processing circuit 240a and a second audio processing circuit 240b), memories 250a and 250b (a first memory 250a and a second memory 250b, power management circuits 260a and 260b, batteries 270a and 270b (a first power management circuits 260a and a second power management circuits 260b), and processors 280a and 280b (a first processor 280a and a second processor 280b).

The first and second external audio electronic devices 201a and 201b may include not only audio output devices such as earphones, headsets, or speakers, but also electronic devices for receiving audio data from other electronic devices and outputting the audio data.

The communication circuits 210a and 210b may support wireless communication with an electronic device 101 (for example, a smartphone). The communication circuits 210a and 210b may support various types of communication through the antennas 211a and 211b.

The communication circuits 210a and 210b may include various RF components between the antennas 211a and 211b and the processors 280a and 280b. For example, in reception of a radio signal, the communication circuits 210a and 210b may receive the radio signal from the antennas 211a and 211b, convert the received radio signal into a baseband signal, and transmit the converted baseband signal to the processors 280a and 280b. The processors 280a and 280b may process the received baseband signal and control human/mechanical interface of the first and second external audio electronic devices 201a and 201b in accordance with the received baseband signal. In transmission of a radio signal, the processors 280a and 280b may generate a baseband signal and output the baseband signal to the communication circuits 210a and 210b. The communication circuits 210a and 210b may receive the baseband signal from the processors 280a and 280b, convert the received baseband signal to a radio signal, and transmit the radio signal to the outside through the antennas 211a and 211b.

The communication circuits 210a and 210b may support wired communication with an external device (for example, a case or a holder). The communication circuits 210a and 210b may be electrically connected to at least one contact disposed on the exterior surface of the housing of the first and second external audio electronic devices 201a and 201b. When the first and second external audio electronic devices 201a and 201b are mounted to a mounting part of the external device (for example, the case or the holder), at least one contact of the first and second external audio electronic devices 201a and 201b may be electrically connected to at least one contact installed in the mounting part of the external device.

The communication circuits 210a and 210b may support reception of audio data (or audio content) from an electronic device (for example, a server, a smartphone, a personal computer (PC), a personal digital assistant (PDA), or an access point).

The communication circuits 210a and 210b may support transmission of audio data from the first external audio electronic device 201a to the second external audio electronic device 201b or from the second external audio electronic device 201b to the first external audio electronic device 201a.

The communication circuits 210a and 210b may support cellular communication. The cellular communication may include, for example, at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile Communications (GSM).

The communication circuits 210a and 210b may support various types of communication. According to an embodiment, the communication circuits 210a and 210b may support short-range communication. The short-range communication may include at least one of, for example, wireless fidelity (Wi-Fi), Bluetooth, near field communication (NFC), or global navigation satellite system (GNSS).

The antennas 211a and 211b may include an emitter (for example, a wireless charging coil) for supporting wireless charging. The antennas 211a and 211b may be used to transmit wireless power to an external device (for example, a charging device) or wirelessly receive power from the external device. The antennas 211a and 211b may be various types of metallic members installed in the first and second external audio electronic devices 201a and 201b. According to an embodiment, the antennas 211a and 211b may be disposed inside the housing or may form the part of one surface of the housing. when the housing is formed with metal, the antennas 211a and 211b may include a partial metallic area or an entire metallic area of the housing.

The antennas 211a and 211b may be installed on a Printed Circuit Board (PCB) on which the communication circuits 210a and 210b are installed but that is not illustrated.

The input devices 220a and 220b may be configured to generate various input signals required for operating the first and second external audio electronic devices 201a and 201b. The input devices 220a and 220b may include touch pads, touch panels, or buttons. The touch pad may recognize a touch input based on at least one scheme among, for example, a capacitive scheme, a resistive scheme, an infrared scheme, and an ultrasonic scheme. When a capacitive touch pad is provided, physical contact or proximity recognition is possible. The touch pad may further include a tactile layer. The touch pad including the tactile layer may provide a tactile response to the user. The button may include, for example, a physical button and/or an optical key.

The input devices 220a and 220b may generate user input for turning on or turning off the first and second external audio electronic devices 201a and 201b. the input devices 220a and 220b may generate user input for the communication (for example, short-range communication) connection with the first and second external audio electronic devices 201a and 201b and an electronic device (for example, the electronic device 101 of FIG. 1).

The input devices 220a and 220b may generate user input related to audio data (or audio content). For example, the user input may be associated with a function of starting reproduction of audio data, pausing reproduction of audio data, stopping reproduction of audio data, controlling a reproduction speed, controlling a reproduction volume, and/or controlling mute.

The sensors 230a and 230b may detect information or signals indicating whether the first and second external audio electronic devices 201a and 201b are worn on the ears. the sensors 230a and 230b may detect information or signals indicating whether the first and second external audio electronic devices 201a and 201b are worn on an external device (for example, a charging device).

The sensors 230a and 230b may measure a physical quantity or detect operation states of the first and second external audio electronic devices 201a and 201b. The sensors 230a and 230b may convert the measured or detected information into an electrical signal. The sensors 230a and 230b may include, for example, acceleration sensors, gyro sensors, geomagnetic sensors, magnetic sensors, proximity sensors, gesture sensors, grip sensors, and/or biometric sensors.

The first and second external audio electronic devices 201a and 201b may include members to be detected, which correspond to a sensor of an external device. For example, the external device may include a Hall IC installed in the mounting part, and the first and second external audio electronic devices 201a and 201b may include magnets. When the first and second external audio electronic devices 201a and 201b are coupled to the mounting part of the external device, the Hall IC of the external device may recognize the magnets included in the first and second external audio electronic devices 201a and 201b and output signals related to coupling between the external device and the first and second external audio electronic devices 201a and 201b. In another example, the external device may include a contact installed in the mounting part, and the first and second external audio electronic devices 201a and 201b may include contacts installed in the housing. When the first and second external audio electronic devices 201a and 201b are coupled to the mounting part of the external device, the contact of the external device and the contacts of the first and second external audio electronic devices 201a and 201b may be electrically connected, and the external device may recognize coupling with the first and second external audio electronic devices 201a and 201b.

The audio processing circuits 240a and 240b may support an audio data collection function. The audio processing circuits 240a and 240b may reproduce collected audio data. According to an embodiment, the audio processing circuits 240a and 240b may include audio decoders (not shown) and D/A converters (not shown). The audio decoder may convert audio data stored in the memories 250a and 250b into a digital audio signal. The D/A converter may convert the digital audio signal converted by the audio decoder into an analog audio signal. According to various embodiments, the audio decoder may convert audio data received from an electronic device (for example, a server, a smartphone, a PC, a PDA, and/or an access point) through the communication circuits 210a and 210b and stored in the memories 250a and 250b into a digital audio signal. The speakers 241a and 241b may output the analog audio signal converted by the D/A converter.

The audio processing circuits 240a and 240b may include A/D converters (not shown). The A/D converter may convert an analog voice signal transmitted through the microphones 242a and 242b into a digital voice signal.

The audio processing circuits 240a and 240b may reproduce various pieces of preset audio data in an execution operation of the first and second external audio electronic devices 201a and 201b. For example, when wearing of the first and second external audio electronic devices 201a and 201b on ears is detected or separation thereof from ears is detected, the audio processing circuits 240a and 240b may be designed to reproduce audio data related to the corresponding effect or notification sound. When coupling of the first and second external audio electronic devices 201a and 201b to the external device (for example, the charging device) is detected or separation thereof from the external device is detected, the audio processing circuits 240a and 240b may be designed to reproduce audio data related to the corresponding effect or notification sound. The output of the effect sound or the notification sound may be omitted according to user settings or a designer intent. According to various embodiments, the audio processing circuits 240a and 240b may be designed to be included in the processors 280a and 280b.

The memories 250a and 250b may store various operating systems required for operating the first and second external audio electronic devices 201a and 201b, data corresponding to various user functions, and/or an application and algorithm. The memories 250a and 250b may include, for example, a high-speed random access memory such as one or more magnetic disc storage devices and/or a nonvolatile memory, one or more optical storage devices, and/or a flash memory (for example, NAND or NOR).

The memories 250a and 250b may include a nonvolatile memory for storing first audio data (nonvolatile audio data) received from the electronic device (for example, a server, a smartphone, a PC, a PDA, and/or an access point). The memories 250a and 250b may include a volatile memory for storing second audio data (volatile audio data) received from the electronic device.

The power management circuits 260a and 260b (Power Management Integrated Circuits (PMICs)) may efficiently manage and optimize the use of power of the batteries 270a and 270b in the first and second external audio electronic devices 201a and 201b. According to an embodiment, the processors 280a and 280b may transmit signals corresponding to load to be processed to the power management circuits 260a and 260b. The power management circuits 260a and 260b may control power supplied to the processors 280a and 280b.

The power management circuits 260a and 260b may include battery charging circuits. When first and second external audio electronic devices 201a and 201b are coupled to the external device (for example, the charging device), the power management circuits 260a and 260b may receive power from the external device and charge the batteries 270a and 270b.

The power management circuits 260a and 260b may include wireless charging circuits. The wireless charging circuit may wirelessly receive power from the external device (for example, the charging device) through the antennas 211a and 211b and may charge the batteries 270a and 270b using the received power.

The first and second external audio electronic devices 201a and 201b may include display devices (not shown). The display device may be configured to provide various screen interfaces required for operating the first and second external audio electronic devices 201a and 201b. The display device may provide a user interface related to reproduction of audio data.

According to various embodiments, the display device may provide a user interface related to a function of receiving audio data from the electronic device (for example, the electronic device 101 of FIG. 1) or a function of transmitting audio data to the electronic device.

The display device may include a light-emitting means such as a light emitting diode (LED). For example, the light-emitting means may be controlled to emit a color corresponding to charging or completion of charging. For example, when the first and second external audio electronic devices 201a and 201b are connected to the electronic device (for example, a smartphone and/or a web server) through communication, the light-emitting means may be controlled to emit a specific color. For example, the light-emitting means may be controlled to emit a specific color according to a reproduction state of the audio data (for example, reproduction and/or pause of reproduction). For example, the light-emitting means may be controlled to emit a specific color according to user input generated through an input device.

The batteries 270a and 270b may supply power to elements within the first and second external audio electronic devices 201a and 201b.

The processors 280a and 280b may be configured to control various signal flows related to audio data, information collection, and/or output.

The processors 280a and 280b may support various operations on the basis of at least the part of user input received from the input devices 220a and 220b. The processors 280a and 280b may turn on or off the first and second external audio electronic devices 201a and 201b according to the user input. The processors 280a and 280b may establish a communication connection between the first and second external audio electronic devices 201a and 201b and the electronic device (for example, the electronic device 101 of FIG. 1) according to user input. According to an embodiment, the processors 280a and 280b may receive audio data from the electronic device (for example, the electronic device 101) or transmit audio data to the electronic device according to the user input. The processors 280a and 280b may reproduce audio data or control the reproduction according to the user input (for example, start reproduction of audio data, pause reproduction of audio data, stop reproduction, control a reproduction speed, control a reproduction volume, or mute).

The processors 280a and 280b may be designed to receive audio data from the electronic device (for example, a server, a smartphone, a PC, a PDA, and/or an access point) through the communication circuits 210a and 210b and store the received audio data in the memories 250a and 250b. According to an embodiment, the processors 280a and 280b may receive nonvolatile audio data (or downloaded audio data) from the electronic device and store the received nonvolatile audio data in the nonvolatile memory. The processors 280a and 280b may receive volatile audio data (or streamlining audio data) from the electronic device (for example, the electronic device 101 of FIG. 1) and store the received volatile audio data in the volatile memory.

The processors 280a and 280b may reproduce audio data (for example, nonvolatile audio data or volatile audio data) stored in the memories 250a and 250b and output the audio data through the speakers 241a and 241b. The processors 280a and 280b may decode the audio data and acquire an audio signal (reproduce the audio data). The processors 280a and 280b may output the acquired audio signal through the speakers 241a and 241b.

The processors 280a and 280b may receive the audio signal from the electronic device (for example, the electronic device 101) and output the received audio signal through the speakers 241a and 241b. The electronic device (for example, an audio reproduction device) may decode audio data and acquire an audio signal (for example, reproduce the audio data). The electronic device (for example, the electronic device 101) may transmit the acquired audio signal to the first and second external audio electronic devices 201a and 201b. The processors 280a and 280b may perform various operations on the basis of at least some of the information acquired from the sensors 230a and 230b. The processors 280a and 280b may identify whether the first and second external audio electronic devices 201a and 201b are worn on the ears on the basis of the information acquired from the sensors 230a and 230b. When it is identified that the first and second external audio electronic devices 201a and 201b are worn on the ears, the processors 280a and 280b may reproduce audio data stored in the memories 250a and 250b according to user input for reproducing the audio data and output the audio data through the speakers 241a and 241b.

The processors 280a and 280b may transmit an electrical signal from a light receiver to the electronic device (for example, a smartphone) (for example, the electronic device 101 of FIG. 1) through the communication circuits 210a and 210b. The electronic device (for example, the electronic device 101) may analyze the electrical signal acquired from the first and second external audio electronic devices 201a and 201b and acquire information related to the corresponding detection mode (for example, proximity detection mode and/or biometric detection mode). According to an embodiment, the processors 280a and 280b may identify a heart rate on the basis of the electrical signal from the light receiver of the first and second external audio electronic devices 201a and 201b in a heart rate detection mode of the first and second external audio electronic devices 201a and 201b and/or the electronic device (for example, the electronic device 101 of FIG. 1).

The processors 280a and 280b may analyze the electrical signal from the light receiver and acquire information related to the corresponding detection mode (for example, proximity detection mode and/or biometric detection mode). The processors 280a and 280b may transmit the acquired information to the electronic device (for example, the electronic device 101 of FIG. 1) through the communication circuits 210a and 210b. The processors 280a and 280b may output the acquired information through the speakers 241a and 241b.

When it is identified that the first and second external audio electronic devices 201a and 201b are not worn on the ears in a mode in which the first and second external audio electronic devices 201a and 201b receive audio data from the electronic device (for example, the electronic device 101), reproduce the audio data, and output the audio data through the speakers 241a and 241b, the processors 280a and 280b may stop the mode or transmit a signal related thereto to an external device. The external device may receive a signal related to the state in which the first and second external audio electronic devices 201a and 201b are not worn on the ears, and stop transmitting the audio data to the first and second external audio electronic devices 201a and 201b.

When it is identified that the first and second external audio electronic devices 201a and 201b are not worn on the ears in a mode in which the first and second external audio electronic devices 201a and 201b receive an audio signal from the external device and output the audio signal through the speakers 241a and 241b, the processors 280a and 280b may stop the mode or transmit a signal related thereto to the electronic device. The electronic device (for example, the electronic device 101) may receive a signal related to the state in which the first and second external audio electronic devices 201a and 201b are not worn on the ears and stop reproducing the audio data and transmitting the audio signal.

When it is identified that the first and second external audio electronic devices 201a and 201b are worn on the ears, the processors 280a and 280b may activate a biometric sensor (for example, a heart rate sensor). When it is identified that the first and second external audio electronic devices 201a and 201b are not worn on the ears, the processors 280a and 280b may deactivate the biometric sensor.

When the first external audio electronic device 201a is connected to the second external audio electronic device 201b through communication, the first external audio electronic device 201a may be a master device and the second external audio electronic device 201b may be a slave device, or the second external audio electronic device 201b may be a master device and the first external audio electronic device 201a may be a slave device. The external audio electronic device that is the master device may output an audio signal received from the electronic device 101 through the speaker 241a and also transmit the audio signal to the external audio electronic device that is the slave device.

The first and second external audio electronic devices 201a and 201b may provide a voice recognition function for generating a voice command from an analog voice signal received using the microphones 242a and 242b. The voice command may be associated with input for supporting reception, transmission, and/or reproduction of audio data.

The first and second external audio electronic devices 201a and 201b may further include various modules according to the form of provision thereof. Since such elements may be variously modified according to the trend toward convergence of digital devices, the elements cannot all be enumerated. However, the first and second external audio electronic devices 201a and 201b may further include elements equivalent to the aforementioned elements. Further, the first and second external audio electronic devices 201a and 201b may omit specific elements from the elements according to the form of provision thereof or the elements may be replaced with other elements. This may be easily understood by those skilled in the art.

FIG. 2A illustrates the case in which the first external audio electronic device 201*a* operates as a main external audio electronic device (or an external audio electronic device) serving as a master.

When the first external audio electronic device 201*a* establishes a first communication link with the second external audio electronic device 201*b* through the communication circuit 210*a*, the processor 280*a* may configure the first external audio electronic device 201*a* as a main external audio electronic device and the second external audio electronic device 201*b* as a sub external audio electronic device.

The processor 280*a* may hand over a right for the communication link between at least one of a plurality of electronic devices and the first external audio electronic device 201*a* to the second external audio electronic device 201*b* that is the sub external audio electronic device having the established communication link with the first external audio electronic device 201*a* while the communication link between the first external audio electronic device 201*a* and each of the plurality of electronic devices is established. The entity of the right for the communication link may be a device that manages and maintains the communication link as the entity transmits a connection identification message (for example, a poll packet message) for maintaining the communication link and receives a connection identification response message (for example, a null packet message). The entity of the right for the communication link may be a device that receives a data packet (for example, audio data) from an external electronic device in order to manage the communication link and transmits a positive acknowledgement (ACK) message indicating that the data packet is normally received or a negative acknowledgement (NACK) message indicating that the data packet is not normally received to the external electronic device.

The processor 280*a* may establish a second communication link with a first electronic device 101 and a third communication link with a second electronic device 102 through the communication circuit 210*a*. The processor 280*a* of the first external audio electronic device 201*a* may establish communication links with a plurality of electronic devices as well as the first electronic device and the second electronic device.

The processor 280*a* may establish the second communication link with the first electronic device and the third communication link with the second electronic device through Bluetooth communication (for example, BLE communication or Bluetooth legacy communication) via the communication circuit 210*a*.

When the first external audio electronic device 201*a* establishes the second communication link with the first electronic device 101 and the third communication link with the second electronic device 102 through the communication circuit 210*a*, the second external audio electronic device 201*b* may monitor the second communication link and the third communication link.

The processor 280*a* may transmit connection information related to the second communication link to the second external audio electronic device 201*b* and connection information related to the third communication link to the second external audio electronic device 201, so that the second external audio electronic device 201*b* may monitor the second communication link and the third communication link. Monitoring of the communication link may be performed in various ways as well as on the basis of the connection information of the communication link.

Connection information related to the communication link for monitoring the communication link may be information for shoring communication link information generated between the first external audio electronic device 201*a* and the electronic device (for example, the first electronic device and/or the second electronic device) with the second external electronic device.

The connection information related to the communication link for monitoring the communication link may include at least one piece of address information of each of the first electronic device and the second electronic device (for example, at least one of a Bluetooth address or an LT (logical transport) address), clock information (for example, at least one of a Bluetooth piconet clock or master's CLKN (clock native)), channel information (for example, used channel map), service discovery protocol (SDP) result information, supported feature, manufacture data, or key information (for example, a link key).

The processor 280*a* may transmit communication link-related connection information as shown in Table 1 below to the second external audio electronic device 201*b*.

TABLE 1

| Peer device Address (6 bytes) | Clock (4 bytes) | LT address (3 bits) | SDP information (variable) |
|---|---|---|---|
| 0x12 34 56 00 99 88 | 0x00 8A F1 7C | 0x1 | 0x fd 12 22 45 9d 09 |
| Link key (16 bytes) | | Used Channel Map (10 bytes) | |
| 0xc9 80 b2 d1 13 f3 2d 89 95 8b 6e 65 1c fe 89 be | | 0xFF FF FF FF FF FF FF FF FF 7F | |

The processor 280*a* may transmit a connection identification message (for example, a poll packet message) to the first electronic device and receive a connection identification response message (for example, a null packet message) from the first electronic device in order to maintain the communication link with the first electronic device having the established second communication link with the first external audio electronic device 201*a*.

When receiving a data packet (for example, audio data) from the first electronic device to manage the communication link with the first electronic device having the established second communication link with the first external audio electronic device 201*a*, the processor 280*a* may transmit an ACK message indicating that the data packet is normally received or an NACK message indicating that the data packet is not normally received to the first electronic device. The processor 280*a* may receive an ACK message indicating that the data packet is normally received or an NACK message indicating that the data packet is not normally received from the second external audio electronic device 201*b* capable of receiving the data packet from the first electronic device through monitoring of the second communication link, and when receiving the NACK message from the second external audio electronic device 201*b*, make a request for retransmitting the data packet to the first electronic device. The processor 280*a* may receive the ACK message or the NACK message from the second external audio electronic device 21*b* within a predetermined time after the data packet is received from the first electronic device. When no message is received from the second external audio electronic device 201*b* within the predetermined time, the processor 280a may make a request for retransmitting the data packet to the first electronic device. The processor 280a may inquire with the second external audio electronic device 21b about whether the data packet is received from the first electronic device and receive the ACK message or the NACK message from the second external audio electronic device 201b in response to the inquiry. When the second external audio electronic device 201b is configured to make a request for retransmitting the data packet to the first electronic device, the processor 280a may not receive the ACK message or the NACK message from the second external audio electronic device 201b.

The processor 280a may transmit a connection identification message to the second electronic device and receive a connection identification response message from the second electronic device in order to maintain the communication link with the second electronic device having the established third communication link with the first external audio electronic device 201a.

When receiving a data packet (for example, audio data) from the second electronic device to manage the communication link with the second electronic device having the established third communication link with the first external audio electronic device 201a, the processor 280a may transmit the ACK message indicating that the data packet is normally received or the NACK message indicating that the data packet is not normally received to the second electronic device. The processor 280a may receive the ACK message indicating that the data packet is normally received or the NACK message indicating that the data packet is not normally received from the second external audio electronic device 201b capable of receiving the data packet from the second electronic device through monitoring of the third communication link, and when receiving the NACK message from the second external audio electronic device 201b, make a request for retransmitting the data packet to the second electronic device. The processor 280a may receive the ACK message or the NACK message from the second external audio electronic device 21b within a predetermined time after the data packet is received from the second electronic device. When no message is received from the second external audio electronic device 201b within the predetermined time, the processor 280a may make a request for retransmitting the data packet to the second electronic device. The processor 280a may inquire with the second external audio electronic device 21b about whether the data packet is received from the second electronic device and receive the ACK message or the NACK message from the second external audio electronic device 201b in response to the inquiry. When the second external audio electronic device 201b is configured to make a request for retransmitting the data packet to the second electronic device, the processor 280a may not receive the ACK message or the NACK message from the second external audio electronic device 201b.

When a condition for changing the entity of the right for the communication link is satisfied in the state in which the first external audio electronic device 201a establishes the second communication link with the first electronic device and the third communication link with the second electronic device, the processor 280a may change the entity of the right for the second communication link or the third communication link from the first external audio electronic device 201a to the second external audio electronic device 210b.

The condition for changing the entity of the right for the communication link may include at least one of communication quality information, state information of the external audio electronic device, the state in which the external audio electronic device is connected to a plurality of electronic devices through communication, or a user selection.

The condition for changing the entity of the right for the communication link is not limited to the above conditions and may include various conditions that can be configured for efficiency when the external audio electronic device is connected to at least one electronic device through communication.

The processor 280a may change the entity of the right for the communication link according to a communication quality information condition among the conditions for changing the entity of the right for the communication link. For example, when a signal intensity between the second external audio electronic device 201b and the electronic device (for example, the first electronic device or the second electronic device) is higher than a signal intensity between the first external audio electronic device 201a and the electronic device (for example, the first electronic device or the second electronic device), a right for at least one of a plurality of communication links may be given to the second external audio electronic device 201b. For example, the first external audio electronic device 201a may receive information on the signal intensity for the communication link from the second external audio electronic device 201b. When the signal intensity between the second external audio electronic device 201b and the electronic device (for example, the first electronic device or the second electronic device) is lower than the signal intensity between the first external audio electronic device 201a and the electronic device, the processor 280a may withdraw at least one right that was handed over to the second external audio electronic device 201b.

The processor 280a may change the entity of the right for the communication link according to a state information condition of the external audio electronic device (for example, a battery level). For example, when the battery level of the first external audio electronic device 201a is less than or equal to a predetermined value or when the battery level of the second external audio electronic device 201b is higher than the battery level of the first external audio electronic device 201a, the first external audio electronic device 201a may hand over the right for at least one communication link among a plurality of communication links to the second external audio electronic device 201b. For example, the first external audio electronic device 201a may receive information on the battery level from the second external audio electronic device 201b. When the battery level of the first external audio electronic device 201a is greater than or equal to a predetermined value or when the battery level of the second external audio electronic device 201b is lower than the battery level of the first external audio electronic device 201a, the processor 280a may withdraw at least one right that was handed over to the second external audio electronic device 201b.

The processor 280a may change the entity of the right for the communication link according to a state information condition of the external audio electronic device (for example, whether or not the external audio electronic device is worn) among the conditions for changing the entity of the right for the communication link. For example, when the first audio electronic device 201a is separated from the user's ears and the second external audio electronic device 201b is worn on the user's ears, the first external audio electronic device 201a may hand over the right for at least one communication link among a plurality of communication links to the second external audio electronic device 201b. For example, the first external audio electronic device 201a may receive the state information condition (for example, whether or not the external audio electronic device is worn) from the second external audio electronic device 201b. When the first external audio electronic device 201a is worn on the user's ears and the second external audio electronic device 201b is separated from the user's ears, the processor 280a may withdraw at least one right handed over to the second external audio electronic device 201b.

The processor 280a may change the entity of the right for the communication link according to the state information condition of the external audio electronic device (for example, an operation state) among the conditions for changing the entity of the right for the communication link. For example, when the first electronic device having the established second communication link with the first external audio electronic device 201a is outputting audio data to the first external audio electronic device 201a and the second external audio electronic device 201b in a first operation state (for example, a music reproduction mode) and the second electronic device having the established third communication link with the first external audio electronic device 201a is in a second operation state (for example, a standby mode), the first external audio electronic device 201a may hand over the right for the third communication link among a plurality of communication links to the second external audio electronic device 201b. For example, the first external audio electronic device 201a may receive the state information condition (for example, the operation state) from the second external audio electronic device 201b. When the second electronic device having the established third communication link with the first external audio electronic device 201a switches to the first operation state (for example, the music reproduction mode) and thus is outputting audio data to the first external audio electronic device 201a and the second external audio electronic device 201b and when the first electronic device having the established second communication link with the first external audio electronic device 201a switches to the second operation state (for example, the standby mode), the processor 280a may withdraw the right for the third communication link handed over to the second external audio electronic device 201b or may withdraw the right for the third communication link and then hand over the right for the second communication link to the second external audio electronic device 201b.

The processor 280a may change the entity of the right for the communication link according to the connection state condition of communication between the external audio electronic device and a plurality of electronic devices among the conditions for changing the entity of the right for the communication link. For example, when the first external audio electronic device 201a is connected to a plurality of electronic devices through communication, the first external audio electronic device 201a may hand over the right for the communication link with at least one electronic device selected on the basis of the order of establishment of communication links among the plurality of electronic devices to the second external audio electronic device 201b.

The processor 280a may transmit a message indicating that the right for the communication link with the at least one electronic device is given to the second external audio electronic device 201b.

The processor 280a may monitor the third communication link after handing over the right for the third communication link established between the first external audio electronic device 201a and the second electronic device among a plurality of electronic devices having established communication links to the second external audio electronic device 201b, and may stop data transmission through the third communication link and only receive data.

The processor 280a may stop both data transmission and reception through the third communication link after handing over the right for the third communication link established between the first external audio electronic device 201a and the second electronic device among the plurality of electronic devices having the established communication links to the second external audio electronic device 201b. Thereafter, the first external audio electronic device 201a may perform at least one of an operation for transmitting data through the third communication link or an operation for receiving data from the time point at which the right for the third communication link is received from the second external audio electronic device 201b.

When the second external audio electronic device 201b does not satisfy the condition for changing the entity of the right for the communication link, the processor 280a may withdraw the right for a specific communication link given to the second external audio electronic device 201b and maintain and manage the specific communication link.

When receiving a specific event (for example, reception of a call) corresponding to the condition for withdrawing the right for the communication link, the processor 280a may withdraw the right for the communication link given to the second external audio electronic device 201b. For example, when the specific event is generated from the second electronic device after the right for the third communication link with the second electronic device is given to the second external audio electronic device 201b, the processor 280a may withdraw the right for the third communication link. When the third communication link is monitored after the right for the third communication link is given to the second external audio electronic device 201b, the processor 280a may detect the specific event generated from the second electronic device through the monitoring of the third communication link. Alternatively, when the third communication link is not monitored after the right for the third communication link is given to the second external audio electronic device 201b, the processor 280a may detect the specific event generated from the second electronic device through a notification of the second external audio electronic device 201b.

When the entity of the right for the third communication link is changed from the second external audio electronic device 201b to the first external audio electronic device 201a on the basis of the specific event received from the second electronic device, the processor 280a may process the event received from the second electronic device.

The processor 280a may withdraw the right for the third communication link from the second external audio electronic device 201b according to the condition for changing the entity of the right for the communication link after giving the right for the third communication link established between the first external audio electronic device 201a and the second electronic device to the second external audio electronic device 201b, and give the right for the second communication link established between the first electronic device and the first external audio electronic device 201a.

The processor 280a may additionally give the right for the second communication link established between the first electronic device and the first external audio electronic device 201a to the second external audio electronic device 201b according to the condition for changing the entity of the right for the communication link after giving the right for the third communication link established between the first external audio electronic device 201a and the second electronic device to the second external audio electronic device 201b.

In order to establish the communication link between the second external audio electronic device 201b corresponding to the sub external audio electronic device and the second electronic device, the processor 280a may transmit information on the second external audio electronic device 201b having the established first communication link to the first electronic device having the established communication link with the second electronic device or information on the second electronic device received through the first electronic device to the second external audio electronic device 201b.

When a request for information (for example, address information) on the second external audio electronic device 201b establishing the first communication link with the first external audio electronic device 201a is made by the first electronic device 101 establishing the second communication link with the first external audio electronic device 201a through the communication circuit 210a, the processor 280a may transmit information on the second external audio electronic device 201b to the first electronic device 101.

When information (for example, address information) on the second electronic device 102 for establishing the third communication link with the first electronic device 101 is received from the first electronic device 101 for establishing the second communication link with the first external audio electronic device 201a, the processor 280a may transmit the information on the second electronic device to the second external audio electronic device 201b through the first communication link. The processor 280a may transmit a message making a request for establishing the communication link with the second electronic device to the second external audio electronic device 201b along with the information on the second electronic device.

The processor 280a may monitor connection information related to a fourth communication link established between the second electronic device and the second external audio electronic device 201b.

When the connection information related to the fourth communication link established between the second electronic device and the second external audio electronic device 201b is received from the second external audio electronic device 201b through the first communication link, the processor 280a may monitor the connection information related to the fourth communication link on the basis of the connection information related to the fourth communication link.

In order to maintain the second communication link established between the first external audio electronic device 201a and the first electronic device, the processor 280a may transmit and receive a connection identification message (poll packet message) and a connection identification response message (null packet message) to and from the first electronic device.

In order to manage the second communication link established between the first external audio electronic device 201a and the first electronic device, the processor 280a may transmit an ACK message indicating that a data packet (for example, audio data) received from the first electronic device is normally received and an NACK message indicating that the data packet is not normally received to the first electronic device. The processor 280a may monitor the first communication link and receive the ACK message indicating that the data packet from the first electronic device is normally received and the NACK message indicating that the data packet is not normally received from the second external audio electronic device 201b that is capable of receiving the data packet from the first electronic device. When receiving the NACK message from the second external audio electronic device 201b, the processor 280a may make a request for transmitting the data packet to the first electronic device.

FIG. 2B illustrates the case in which the second external audio electronic device 201b operates as a sub external audio electronic device (or audio electronic device) serving as a slave.

When the second external audio electronic device 201b generates the first communication link with the first external audio electronic device 201a through the communication circuit 210b, the processor 280b may configure the second external audio electronic device 201b as a sub external audio electronic device and the first external audio electronic device 201a as a main external audio electronic device.

The processor 280b may receive the right for the communication link between the first external audio electronic device 201a and at least one of a plurality of electronic devices having the established communication link with the first external audio electronic device 201a from the first external audio electronic device 201a.

The processor 280b may monitor the second communication link established between the first external audio electronic device 201a and the first electronic device and/or the third communication link established between the first external audio electronic device 201a and the second electronic device.

The processor 280b may receive connection information related to the second communication link established between the first external audio electronic device 201a and the first electronic device and connection information related to the third communication link established between the first external audio electronic device 201a and the second electronic device from the first external audio electronic device 201a through the first communication link established with the first external audio electronic device 201a through the communication circuit 210b. The processor 280b may monitor the second communication link on the basis of the received connection information related to the second communication link and receive data from the first electronic device. The processor 280b may monitor the third communication link on the basis of the received connection information related to the third communication link and receive data from the second electronic device.

Communication link-related connection information for monitoring the communication link may include at least one piece of address information (for example, at least one of Bluetooth address information or LT address information) of each of the first external audio electronic device 201a, the first electronic device or the second electronic device, clock information (for example, at least one of Bluetooth piconet clock information or master's CLKN information (clock native)), channel information (for example, used channel map information), SDP result information, supported feature information, manufactured data, or key information (for example, link key information).

The processor 280b may calculate a channel access code and a hopping frequency on the basis of the communication link-related connection information and monitor each of the second communication link and the third communication link on the basis of the calculation result.

The second external audio electronic device 201b may monitor data transmitted and received between the first external audio electronic device 201a and the first electronic device through the second communication link or between the first external audio electronic device 201*a* and the second electronic device through the third communication link on the basis of connection information related to the second communication link and connection information related to the third communication link received from the first external audio electronic device 201*a*. For example, the second external audio electronic device may monitor all packet messages such as a packet message for maintaining the communication link such as a poll packet message/null packet message, an asynchronous connectionless control (ACL-C) message for link control, and an asynchronous connectionless user (ACL-U) message for user data, or may monitor the second communication link or the third communication link only at a specific time point according to circumstances on the basis of connection information related to the second communication link and connection information related to the third communication link received from the first external audio electronic device 201*a*. For example, the second external audio electronic device 201*b* may generate the first communication link with the first external audio electronic device 201*a* and monitor the second communication link or the third communication link from the time point of a connection request transmitted from the first electronic device or the second electronic device while continuously scanning for a page using address information (for example, Bluetooth address information) of the first external audio electronic device 201*a* received during a connection process for generating the first communication link.

When the data packet transmitted from the first electronic device is normally received while the second communication link is monitored, the processor 280*b* may transmit an ACK message indicating that the data packet is normally received to the first external audio electronic device 201*a*. When the data packet is not normally received from the first electronic device, the processor 280*b* may transmit an NACK message indicating that the data packet is not normally received to the first external audio electronic device 201*a*.

When the second external audio electronic device 201*b* satisfies the condition for changing the entity of the right for the communication link, the processor 280 may receive the right for the communication link between the first external audio electronic device 201*a* and at least one of a plurality of electronic devices establishing the communication link with the first external audio electronic device 201*a* from the first external audio electronic device 201*a*.

When the processor 280*b* receives the right for the third communication link between the first external audio electronic device 201*a* and the second electronic device among the plurality of electronic devices for establishing the communication link with the first external audio electronic device 201*a*, the processor 280*b* may maintain and manage the third communication link established between the second electronic device and the first external audio electronic device 201*a*. The processor 280*b* may transmit and receive a connection identification message (for example, a poll packet message) and a connection identification response message (for example, a null packet message) to and from the second electronic device through the third communication link in order to maintain the third communication link. The processor 280*b* may transmit the ACK message indicating the data packet received from the second electronic device is normally received or the NACK message indicating that the data packet is not normally received to the second electronic device through the third communication link in order to manage the third communication link. The processor 280*b* may receive the ACK message indicating that the data packet is normally received or the NACK message indicating that the data packet is not normally received from the first external audio electronic device 201*a* that is capable of receiving the data packet from the second electronic device through monitoring of the third communication link, and when receiving the NACK message from the first external audio electronic device 201*a*, make a request for retransmitting the data packet to the second electronic device. The processor 280*b* may receive the ACK message or the NACK message from the first external audio electronic device 201*a* within a predetermined time after the data packet is received from the second electronic device. When no message is received from the first external audio electronic device 201 within the predetermined time, the processor 280*b* may make a request for retransmitting the data packet to the second electronic device. The processor 280*b* may inquire with the first external audio electronic device 201*a* about whether the data packet is received from the second electronic device and receive the ACK message or the NACK message from the first external audio electronic device 201*a* in response to the inquiry. When the first external audio electronic device 201*a* is configured to make a request for retransmitting the data packet to the second electronic device, the processor 280*b* may not receive the ACK message or the NACK message from the first external audio electronic device 201*a*.

The processor 280*b* may receive a message indicating that the right for the communication link between the first external audio electronic device 201*a* and at least one of a plurality of electronic devices for establishing the communication links with the first external audio electronic device 201*a* is given from the first external audio electronic device 201*a* corresponding to the main external audio electronic device through the communication circuit 210*b* and maintain and manage the communication link of the at least one electronic device on the basis of the received message indicating that the right is given.

The processor 280*b* may provide the same service as that of the first external audio electronic device 201*a* to the plurality of electronic devices for establishing the communication links with the first external audio electronic device 201*a* on the basis of communication link-related connection information (for example, SDP result information, supported feature information, and/or manufacture data).

When the second external audio electronic device 201*b* does not satisfy the condition for changing the entity of the right for the communication link, the processor 280*b* may automatically hand over the right for the specific communication link given to the second external audio electronic device 201*b* to the first external audio electronic device 201*a*. For example, the second external audio electronic device 201*b* may receive an event from the second electronic device in the state in which the second external audio electronic device 201*b* maintains and manages the communication link (for example, the third communication link) between the first external audio electronic device 201*a* and the second electronic device. The second external audio electronic device 201*b* may automatically hand over the right for the third communication link to the first external audio electronic device 201*a* according to the type of the received event (for example, reception of a call).

The processor 280*b* may make a request for transferring the third communication link to the first external audio electronic device to allow the first external audio electronic device 201*a* to withdraw the right for the third communication link on the basis of the type of the event (for example, reception of a call) received from the second electronic device.

In the state in which the processor 280b maintains and manages the third communication link between the first external audio electronic device 201a and the second electronic device, the processor 280b may receive, from the first external audio electronic device 201a, a message indicating the right for the third communication link is withdrawn and a message indicating that the right for the second communication link between the first electronic device and the first external audio electronic device 201a is given. After returning the right for the third communication link to the first external audio electronic device 201a, the processor 280b may monitor the third communication link and receive data from the second external electronic device. The processor 280b may transmit and receive data to and from the first electronic device while managing and maintaining the second communication link.

When the processor 280b receives the message indicating that the right for the second communication link between the first electronic device and the first external audio electronic device 201a is given from the first external audio electronic device 201a in the state in which the processor 280b maintains and manages the third communication link between the first external audio electronic device 201a and the second electronic device, the processor 280b may manage and maintain the second communication link while managing and/or maintaining the third communication link.

The processor 280b may establish the communication link with the second electronic device on the basis of information on the second electronic device received from the first external audio electronic device 201a corresponding to the main external audio electronic device and/or a request from the second electronic device.

The processor 280b may establish the first communication link with the first external audio electronic device 201a and receive information on the second electronic device (for example, address information) and/or a message making a request for establishing the communication link with the second electronic device from the first external audio electronic device 201a through the first communication link. The processor 280b may establish a fourth communication link with the second electronic device through the communication circuit 210b on the basis of the information on the second electronic device (for example, address information). For example, the processor 280b may establish the fourth communication link with the second electronic device through a paging operation, a pairing operation, and a connection operation using a Bluetooth legacy communication technology. For example, the processor 280b may establish the fourth communication link with the second electronic device through an advertising scan operation and a connection operation using a BLE communication technology.

When a connection request is received from the second electronic device, the processor 280b may establish the fourth communication link with the second electronic device through the communication circuit 210b. For example, the processor 280b may establish the fourth communication link with the second electronic device through a paging operation, a pairing operation, and a connection operation using a Bluetooth legacy communication technology. For example, the processor 280b may establish the fourth communication link with the second electronic device through an advertising scan operation and a connection operation using a BLE communication technology.

The processor 280b may transmit connection information related to the fourth link to the first external audio electronic device 201a through the first communication link in order to allow the first external audio electronic device 201a to monitor the fourth communication link.

In order to maintain the fourth communication link established between the second external audio electronic device 201b and the second electronic device, the processor 280b may transmit and receive a connection identification message (i.e., a poll packet message) and a connection identification response message (i.e., a null packet message) to and from the second electronic device.

In order to manage the fourth communication link established between the second external audio electronic device 201b and the second electronic device, the processor 280b may transmit an ACK message indicating that a data packet (for example, audio data) received from the second electronic device is normally received and an NACK message indicating that the data packet is not normally received to the second electronic device. The processor 280b may monitor the fourth communication link and receive the ACK message indicating that the data packet (for example, audio data) from the second electronic device is normally received and the NACK message indicating that the data packet is not normally received from the first external audio electronic device 201a that is capable of receiving the data packet from the second electronic device. When receiving the NACK message from the first external audio electronic device 201a, the processor 280b may make a request for retransmitting the data packet to the second electronic device. The processor 280b may receive the ACK message or the NACK message from the first external audio electronic device 201a within a predetermined time after the data packet is received from the second electronic device. When no message is received from the first external audio electronic device 201a within the predetermined time, the processor 280b may make a request for retransmitting the data packet to the second electronic device. The processor 280b may inquire with the first external audio electronic device 201a about whether the data packet is received from the second electronic device and receive the ACK message or the NACK message from the first external audio electronic device 201a in response to the inquiry. When the first external audio electronic device 201a is configured to make a request for retransmitting the data packet to the second electronic device, the processor 280b may not receive the ACK message or the NACK message from the first external audio electronic device 201a.

Figure 3:
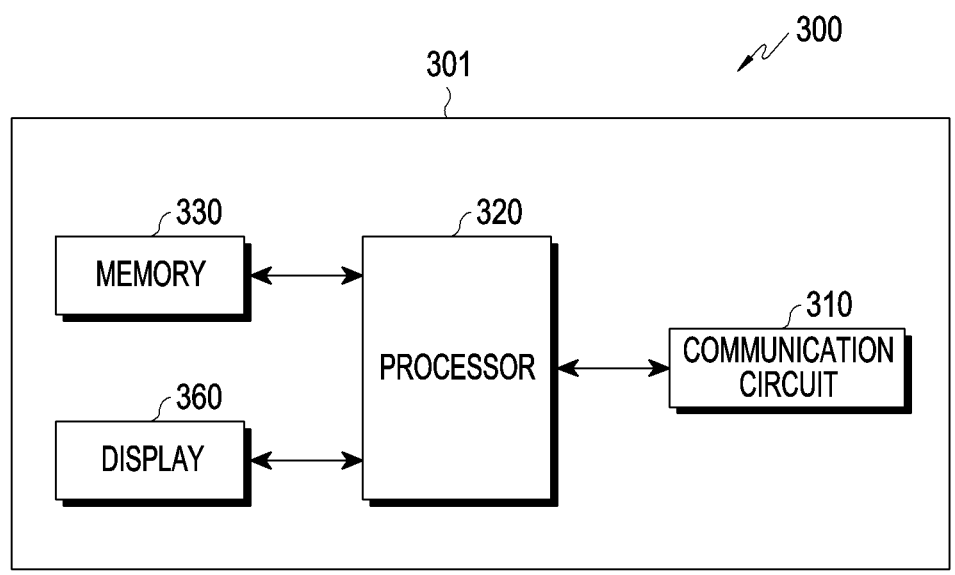
FIG. 3 is a block diagram schematically illustrating an electronic device, according to an embodiment.

FIG. 3 is a block diagram 300 schematically illustrating an electronic device, according to an embodiment. According to various embodiments, an electronic device 301 may establish a communication link with a first external audio electronic device 201a and/or a second external audio electronic device 201b and establish a communication link with at least one of a first electronic device and/or a second electronic device. At least one of the first electronic device and/or the second electronic device establishing the communication link with the electronic device 301 may include the same elements as those of the electronic device 301 in FIG. 3.

Referring to FIG. 3, the electronic device 301 includes a communication circuit 310, a processor 320, a memory 330, a communication circuit 350, and a display 360.

The electronic device 301 may be implemented to be substantially the same as or similar to the electronic device 101 of FIG. 1. For example, the electronic device 301 may be implemented as a smartphone supporting Bluetooth communication.

The electronic device 301 may establish a communication link with a pair of external audio electronic devices or at least one external electronic device through the communication circuit 310 (using, for example, Bluetooth communication). According to an embodiment, a pair of external audio electronic devices and/or at least one external electronic device may be implemented as electronic devices supporting Bluetooth communication.

The communication circuit 310 may be implemented to be substantially the same as or similar to the communication module 190 of FIG. 1 or may include a plurality of communication circuits having the communication circuit 310 and using different communication technologies. The communication circuit 310 may be a communication circuit capable of performing Bluetooth communication and may perform Bluetooth legacy communication and BLE communication.

The processor 320 may control the overall operation of the electronic device 301.

When the electronic device 301 is connected to the external electronic device while a communication link with the first external audio electronic device 201b is established, the electronic device 301 may transmit information (for example, address information) on the second external audio electronic device 201 for establishing the communication link with the first external audio electronic device and/or a message making a request for establishing the communication link with the second external audio electronic device to the external electronic device.

When the electronic device 301 is connected to the external electronic device while the communication link with the first external audio electronic device is established, the electronic device 301 may make a request for information on the second external audio electronic device for establishing the communication link with the first external audio electronic device to the first external audio electronic device and receive the information.

When the electronic device 301 is connected to the external electronic device while the communication link with the first external audio electronic device is established, the electronic device 301 may receive information in advance and store the information on the second external audio electronic device for establishing the communication link with the first external audio electronic device during a connection process for establishing the communication link with the first external audio electronic device.

As the electronic device 301 receives information on the second external audio electronic device for establishing the communication link with the first external audio electronic device during the connection process for establishing the communication link with the first external audio electronic device, the electronic device 301 may know of the existence of the second external audio electronic device for establishing the communication link with the first external audio electronic device.

When the electronic device 301 is connected to the external electronic device while the communication link with the first external audio electronic device 201b is established, the electronic device 301 may transmit information (for example, device information) on the external electronic device to the first external audio electronic device for establishing the communication link with the second external audio electronic device.

In order to transmit the information on the external electronic device to the second external audio electronic device for establishing the communication link with the first external audio electronic device, the electronic device 301 may transmit information on the external electronic device to the first external audio electronic device.

The processor 320 may display a user interface including information related to a pair of external audio electronic devices on the basis of information included in a signal (for example, an advertising signal) received from the pair of external audio electronic devices while a Bluetooth communication connection operation based on the communication circuit 310 is performed. For example, information included in the signal (for example, the advertising signal) received from a pair of external audio electronic devices may include at least one piece of identification information of the external audio electronic device (hereinafter, referred to as device identification information), account information of the user (hereinafter, referred to as user account information), information indicating pairing with another device is currently performed (hereinafter, referred to as current pairing information), a list of previously paired devices (hereinafter, referred to as a pairing list), information on devices which can be simultaneously paired (hereinafter, referred to as simultaneous pairing information), transmission power (Tx power) information, information on a detection area or the remaining battery (hereinafter, referred to as battery state information).

The processor 320 may display images corresponding to a pair of external audio electronic devices on the display 360 on the basis of information included in the signal (for example, the advertising signal) received from the pair of external audio electronic devices.

FIG. 4A is a diagram 400a illustrating the search result of a pair of external audio electronic devices, according to an embodiment. FIG. 4B is a diagram 400b illustrating the search result of a pair of external audio electronic devices, according to an embodiment.

As illustrated in FIG. 4A, the electronic device 301 displays an image 410 corresponding to a pair of external audio electronic devices on the basis of information included in a signal (for example, an advertising signal) received from the pair of external audio electronic devices while performing a Bluetooth connection operation.

As illustrated in FIG. 4B, the electronic device 301 displays an image 410 corresponding to a pair of found external audio electronic devices and a battery state 420 of each external audio electronic device on the basis of information included in a signal received from the pair of external audio electronic devices while performing a Bluetooth connection operation.

The external electronic device including the same elements as those of the electronic device 301 may establish a communication link with the electronic device 301 establishing the communication link with the first external audio electronic device 201b. When the communication link with the electronic device 301 is established, the external electronic device may establish the communication link with the second external audio electronic device on the basis of information on the second external audio electronic device received from the electronic device 301 and/or a message making a request for establishing the communication link with the second external audio electronic device.

The external electronic device may make a request for the connection to the second external audio electronic device and establish the communication link with the second external audio electronic device. For example, the external electronic device may establish the communication link with the second external audio electronic device through a paging operation, a pairing operation, and a connection operation using a Bluetooth legacy communication technology. For example, the external electronic device may establish the communication link with the second external audio electronic device through an advertising scan operation and a connection operation using a BLE communication technology.

The memory 330 may store data or instructions related to the operation of the electronic device 301. Further, the memory 330 may store information related to Bluetooth communication of the first external audio electronic device 201a, the second external audio electronic device 201b, and/or at least one external electronic device. The information related to Bluetooth communication of the first external audio electronic device 201a, the second external audio electronic device 201b, and/or the at least one external electronic device may be transmitted to each of the first external audio electronic device 201a, the second external audio electronic device 201b, and/or the at least one external electronic device through a server. For example, when the first external audio electronic device 201a and the second external audio electronic device 201b are devices supporting the same user account or similar user accounts (for example, a family account), the first external audio electronic device 201a and the second external audio electronic device 201b may share information (for example, link information) related to Bluetooth communication generated between the first external audio electronic device and the second external audio electronic device through an external device (for example, an external server) linked to the first external audio electronic device 201a or the second external audio electronic device 201b through the same or similar user account.

The display 360 may be implemented to be substantially the same as or similar to the display device 160 of FIG. 1. The display 360 may display an operation of Bluetooth communication of the first external audio electronic device 201a, the second external audio electronic device 201b, and/or at least one external electronic device.

Figure 5A:
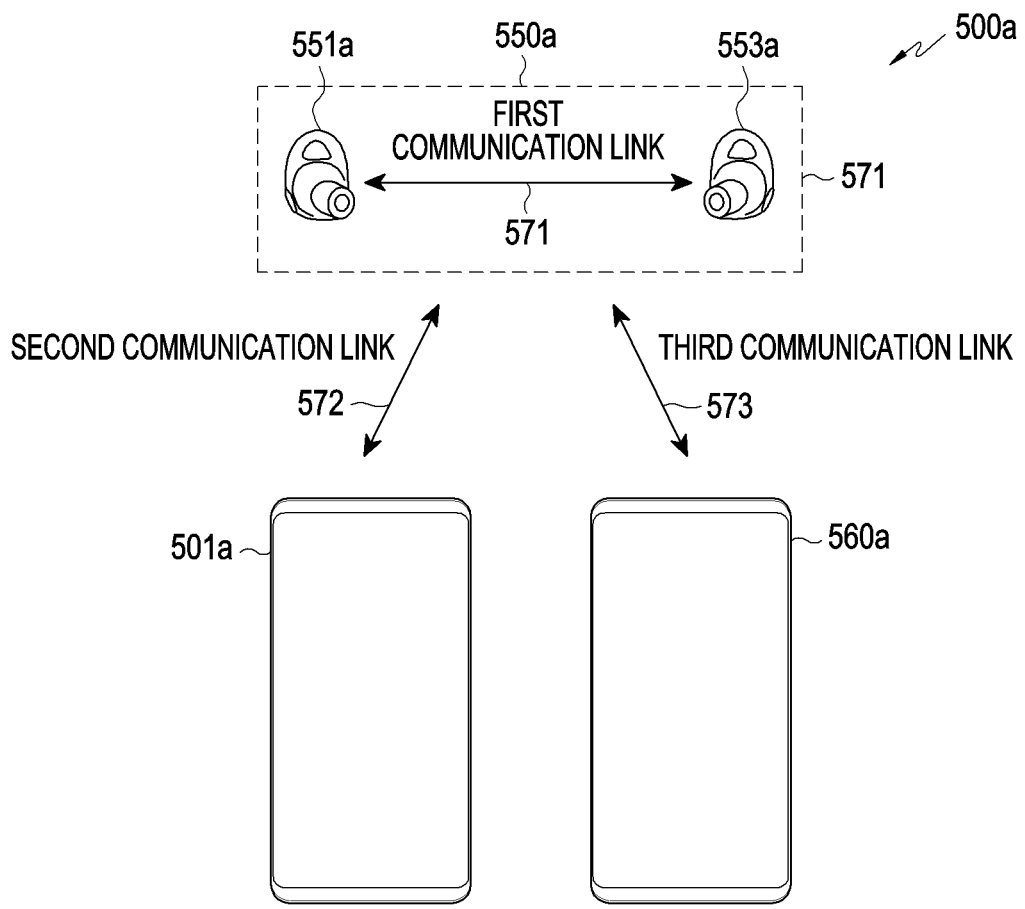
FIG. 5A illustrates an operation for establishing communication links between electronic devices, according to an embodiment.
Figure 5B:
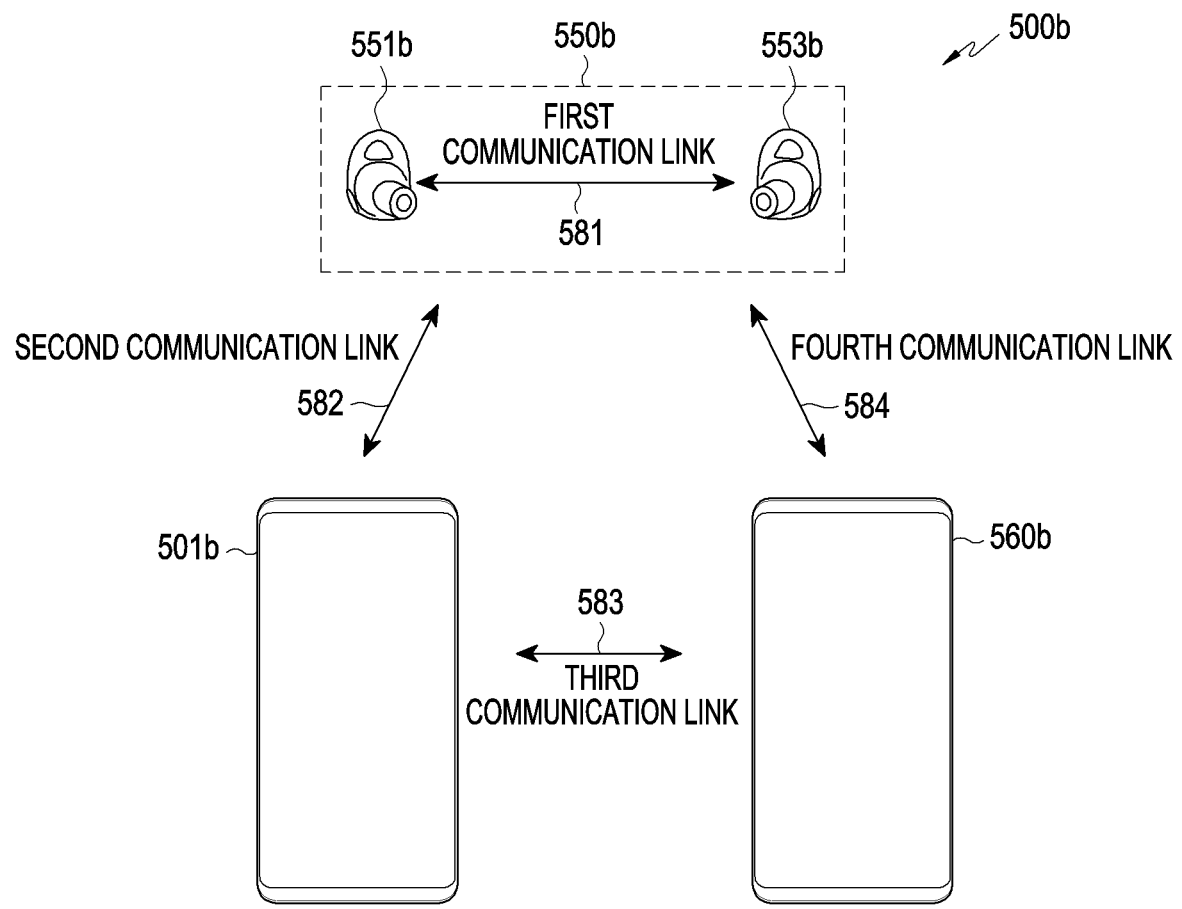
FIG. 5B illustrates an operation for establishing communication links between electronic devices, according to an embodiment.

FIG. 5A is a diagram 500a illustrating an operation for establishing communication links between electronic devices according to an embodiment. FIG. 5B is a diagram 500b illustrating an operation for establishing communication links between electronic devices, according to an embodiment.

Referring to FIGS. 5A and 5B, according to various embodiments, a pair of external audio electronic devices 550a and 550b operating as one pair include first external audio electronic devices 551a and 551b and second external audio electronic devices 553a and 553b. The first external audio electronic device 551a and the second external audio electronic device 553a are each included in the external audio device 550a. The first external audio electronic device 551b and the second external audio electronic device 553b are each included in the external audio device 550b.

When the first external audio electronic device 551a or 551b and the second external audio electronic device 553a or 553b are separate external audio electronic devices, the first external audio electronic device 551a or 551b may include a pair of external audio electronic devices operating as one pair, and the second external audio electronic device 553a or 553b may include a pair of external audio electronic devices operating as one pair.

The first external audio electronic devices 551a and 551b and the second external audio electronic devices 553a and 553b may include communication circuits (for example, Bluetooth™ communication circuits), and a communication link may be established (or created) between the first external audio electronic devices 551a and 551b (for example, right (R) of wireless ear buds) and the second external audio electronic devices 553a and 553b (for example, left (L) of wireless ear buds) through the communication circuit.

A pair of external audio electronic devices 550a and 550b may be configured to have roles as a main external audio electronic device and a sub external audio electronic device during a communication connection process, and the roles may be changed according to a specific condition even after the communication link is established.

The main external audio electronic device may establish communication links with a plurality of electronic devices and serve to maintain and manage the established communication links. The main external audio electronic device may maintain and manage a communication link established with the sub external audio electronic device.

When a first communication link 571 is established between the first external audio electronic device 551a and the second external audio electronic device 553a and the first external audio electronic device 551a is configured as the main external audio electronic device, the first external audio electronic device 551a may establish a second communication link 572 with a first electronic device 501a, establish a third communication link 573 with a second electronic device 560a, and maintain and manage the communication links.

When the second external audio electronic device 553a is configured as the sub external audio electronic device, the second external audio electronic device 553a may receive data from the first electronic device 501a and the second electronic device 560a while monitoring the second communication link 572 and the third communication link 573.

The second external audio electronic device 553a may receive connection information related to the second communication link established between the first external audio electronic device 551a and the first electronic device 501a and connection information related to the third communication link established between the first external audio electronic device 551a and the second electronic device 560a from the first external audio electronic device 551a. The second external audio electronic device 553a may receive data from the first electronic device 501a and the second electronic device 560a while monitoring the second communication link 572 and the third communication link 573 on the basis of the connection information related to the second communication link and the connection information related to the third communication link.

Monitoring of the communication link is not limited to a method based on communication link-related connection information and may be performed in other ways.

When the first external audio electronic device 551a which is the main external audio electronic device hands over the right for the third communication link 573 established with at least one of the first electronic device 501a or the second electronic device 560a to the second external audio electronic device 553a which is the sub external audio electronic device on the basis of the condition for changing the entity of the right for the communication link, the second external audio electronic device 553a may maintain and manage (for example, manage data transmission and reception) the third communication link 573 established between the first external audio electronic device 551a and the second electronic device 560a on behalf of the first external audio electronic device 551a.

The first external audio electronic device 551*a* may hand over the right for the third communication link 573 established between the first external audio electronic device 551*a* and the second external audio electronic device 560*a* to the second external audio electronic device 553*a* and monitor the third communication link 573.

Referring to FIG. 5B, a first communication link 571 may be established between the first external audio electronic device 551*b* and the second external audio electronic device 553*b*, and a second communication link 582 may be established between the first external audio electronic device 551*b* and the first electronic device 501*b*. When information on the second electronic device 560*b* establishing a third communication link 583 with the first electronic device 501*b* is received from the first electronic device 501*b*, the first external audio electronic device 551*b* may transmit the received information on the second electronic device 560*b* to the second external audio electronic device 553*b*.

The second external audio electronic device 553*b* may make a request for the connection to the second electronic device 560*b* on the basis of the information on the second electronic device 560*b* received from the first external audio electronic device 551*b* to establish a fourth communication link 584 with the second electronic device 560*b* and maintain and manage (for example, manage data transmission and reception) the fourth communication link 584 established with the second electronic device 560*b*.

The first external audio electronic device 551*b* may monitor the fourth communication link 584 established between the second external audio electronic device 553*b* and the second electronic device 560*b*.

The first external audio electronic device 551*b* may receive data from the second electronic device 560*b* while monitoring the fourth communication link 584 on the basis of connection information related to the fourth communication link established between the second external audio electronic device 553*b* and the second electronic device 560*b* received from the second external audio electronic device 553*b*.

When the third communication link 583 with the second electronic device 560*b* is established in the state in which the first electronic device 501*b* establishes the second communication link 582 with the first external audio electronic device 551*b* which is the main external audio electronic device, the first electronic device 501*b* may transmit information on the second external audio electronic device 553*b* to the second electronic device 560*b* through the third communication link 583.

The first electronic device 501*b* may transmit a request to the first external audio electronic device 551*b* to receive information on the second external audio electronic device 553*b* through the second communication link 582 or may receive the information on the second external audio electronic device 553*b* in advance and store the information on the second external audio electronic device 553*b* during a connection process for establishing the second communication link 582 with the first external audio electronic device 551*b*.

When receiving the information on the second external audio electronic device 553*b* from the first electronic device 501*b* in the state in which the third communication link 583 with the first electronic device 501*b* is established, the second electronic device 560*b* may make a request for the connection to the second external audio electronic device 553*b* on the basis of the information on the second external audio electronic device 553*b* and establish a fourth communication link 584 with the second external audio electronic device 553*b*.

According to various embodiments, an audio electronic device may include a communication circuit and a processor operatively connected to the communication circuit, wherein the processor may be configured to establish a first communication link with an external audio electronic device through the communication circuit, receive data from a first external electronic device by monitoring a second communication link established between the external audio electronic device and the first external electronic device, and when a right for a third communication link established between the external audio electronic device and a second external electronic device is given from the external audio electronic device, manage and/or maintain the third communication link and transmit and receive data to and from the second external electronic device.

When the first communication link is established, the processor may be configured to set the external audio electronic device as a main audio electronic device serving as a master and set the audio electronic device as a sub audio electronic device serving as a slave.

The processor may be configured to monitor the second communication link, based on second communication link connection-related information received from the external audio electronic device.

When the audio electronic device satisfies a condition for changing an entity of the right for the third communication link, the processor may be configured to receive a request for changing the entity of the right for the third communication link from the external audio electronic device and manage and/or maintain the third communication link.

The condition for changing the entity of the right for the communication link may include at least one of communication quality information of the audio electronic device and/or the external audio electronic device, state information, a connection state of communication with a plurality of external electronic devices, or a user selection.

When the audio electronic device operating as the entity of the right for the third communication link does not satisfy the condition for changing the entity of the right for the third communication, the processor may be configured to return the right for the third communication link to the external audio electronic device, monitor the third communication link, and receive data from the second external electronic device.

When a specific event is received from the second external electronic device and a condition for processing the specific event is not satisfied, the processor may be configured to return the right for the third communication link to the external audio electronic device, monitor the third communication link, and receive data from the second external electronic device.

When a specific event is received from the second external electronic device and a condition for processing the specific event is satisfied, the processor may be configured to maintain the right for the third communication link and process the specific event.

The processor may be configured to transmit and receive a packet message for maintaining the third communication link to and from the second external electronic device through the third communication link.

The processor may be configured to transmit a response message indicating whether data transmitted from the second external electronic device through the third communication link is normally received to the second external electronic device.

When the external audio electronic device does not monitor the third communication link and data is received from the second external electronic device through the third communication link, the processor may be configured to inform, through the first communication link, the external audio electronic device of reception of the data through the third communication link.

When the right for the third communication link is withdrawn from the external audio electronic device and a right for the second communication link is given while the third communication link is managed and/or maintained, the processor may be configured to return the right for the third communication link to the external audio electronic device, monitor the third communication link to receive data from the second external electronic device, manage and/or maintain the second communication link, and transmit and receive data to and from the first external electronic device.

When a right for the second communication link is given from the external audio electronic device while the third communication link is managed and/or maintained, the processor may be configured to manage and/or maintain the third communication link and manage and/or maintain the second communication link.

According to various embodiments, an audio electronic device may include a communication circuit and a processor operatively connected to the communication circuit, wherein the processor may be configured to establish a first communication link with an external audio electronic device through the communication circuit, establish a second communication link with a first external electronic device, transmit second communication link connection-related information associated with the second communication link to the external audio electronic device through the first communication link, establish a third communication link with a second external electronic device, transmit third communication link connection-related information associated with the third communication link to the external audio electronic device through the first communication link, receive information on the external audio electronic device through the first communication link, identify whether to give a right for the second communication link, based on the received information, give the right for the second communication link to the external audio electronic device, based on the identification, and monitor the second communication link.

When the information on the external audio electronic device matches a condition for changing an entity of the right for the second communication link, the processor may be configured to give the right for the second communication to the external audio electronic device.

According to various embodiments, an electronic device may include a communication circuit, a display, and at least one processor operatively connected to the communication circuit and the display, wherein the at least one processor may be configured to establish a first communication link with an external electronic device through the communication circuit, receive information on an audio electronic device from the external electronic device through the first communication link, and establish a second communication link with the audio electronic device, based on the received information on the audio electronic device.

The information on the audio electronic device may include address information of the audio electronic device.

According to various embodiments, an audio electronic device may include a communication circuit, a speaker, and a processor operatively connected to the communication circuit and the speaker, wherein the processor may be configured to establish a first communication link with an external audio electronic device through the communication circuit, monitor a second communication link established between the external audio electronic device and a first external electronic device, receive data from the first external electronic device, receive information on a second external electronic device establishing a third communication link with the first external electronic device through the first communication link, and establish a fourth communication link with the second external electronic device, based on the received information on the second external electronic device.

The processor may be configured to receive connection information related to the second communication link from the external audio electronic device and monitor the second communication link, based on the received connection information related to the second communication link.

The processor may be configured to transmit connection information related to the fourth communication link to the external audio electronic device through the first communication link.

Figure 6:
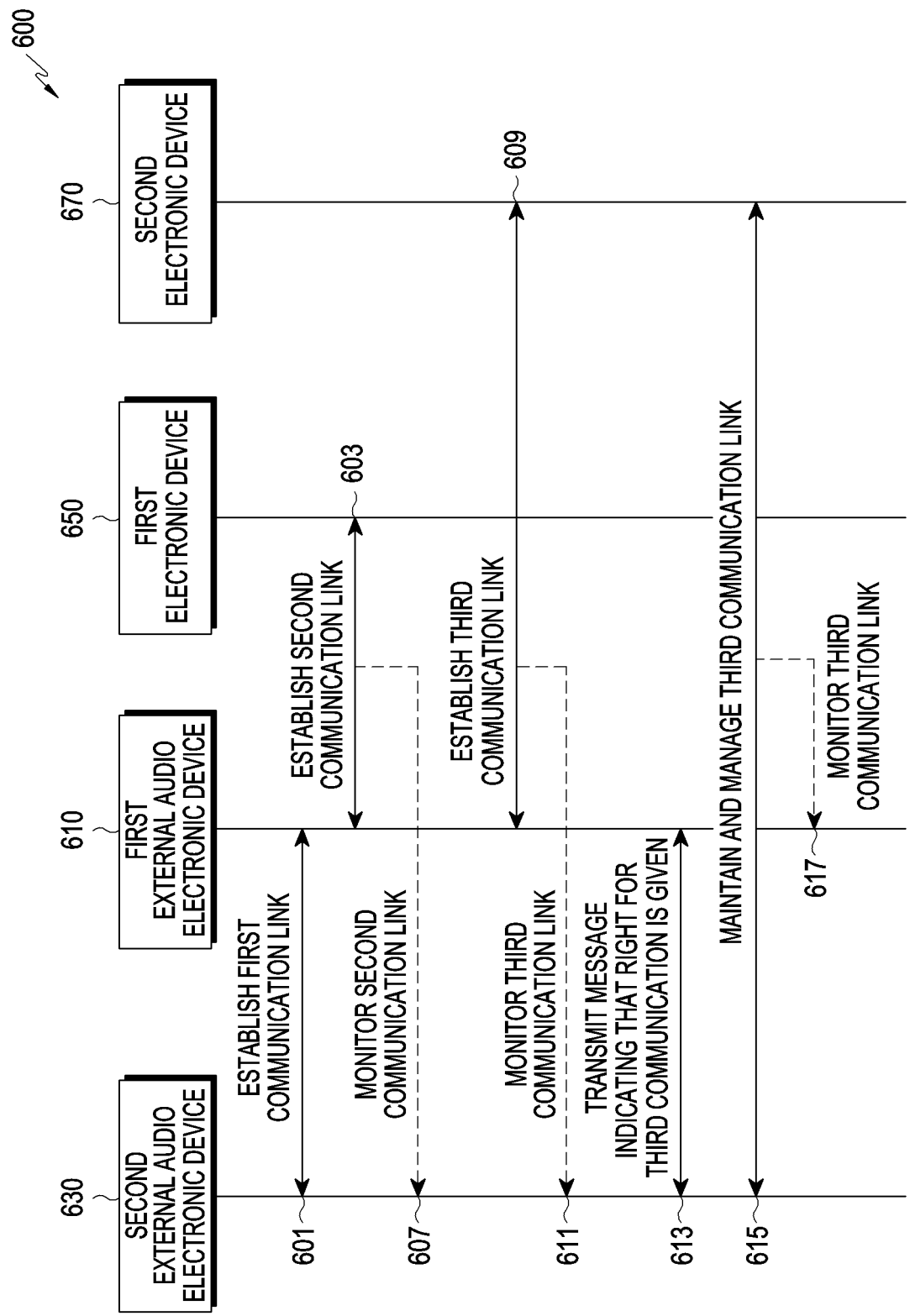
FIG. 6 is a flowchart illustrating a communication link management operation, according to an embodiment.

FIG. 6 is a flowchart 600 illustrating a communication link management operation, according to an embodiment. Steps for providing the communication link management operation may include steps 601 to 617. At least one of steps 601 to 617 may be omitted, the orders of some steps may be changed, or other steps may be added.

Referring to FIG. 6, in step 601, a first communication link 571 is established between a first external audio electronic device 610 and a second external audio electronic device 630 operating as one pair.

In step 603, the first external audio electronic device 610 establishes a second communication link 572 with a first electronic device 650 through a communication circuit 210a. Step 603 is described after step 601, but step 601 may be performed after step 603. In step 607, the second external audio electronic device 630 monitors a second communication link established between the first external audio electronic device 610 and the first electronic device 650.

The second external audio electronic device 630 may receive connection information related to the second communication link established between the first external audio electronic device 610 and the first electronic device 650 from the first external audio electronic device 610 through the first communication link and monitor the second communication link on the basis of the received connection information related to the second communication link.

Communication link-related connection information for monitoring the communication link may include at least one piece of address information of the first electronic device 650 (for example, at least one of a Bluetooth address or an LT address), clock information (for example, at least one of a Bluetooth piconet clock or master's CLKN (clock native)), channel information (for example, a used channel map), SDP result information, supported feature information, manufacture data, or key information (for example, a link key).

The second external audio electronic device 630 may receive data transmitted and received between the first external audio electronic device 610 and the first electronic device 650 through monitoring of the second communication link.

In step 609, the first external audio electronic device 610 establishes a third communication link 573 through the communication circuit 210a. The first external audio electronic device 610 may maintain and manage the third communication link.

In step 611, the second external audio electronic device 630 monitors a third communication link established between the first external audio electronic device 610 and the second electronic device 670.

The second external audio electronic device 630 may receive connection information related to the third communication link established between the first external audio electronic device 610 and the second electronic device 670 from the first external audio electronic device 610 through the first communication link and monitor the third communication link on the basis of the received connection information related to the third communication link.

Communication link-related connection information for monitoring the communication link may include at least one piece of address information of the second electronic device 670 (for example, at least one of a Bluetooth address or an LT address), clock information (for example, at least one of a Bluetooth piconet clock or master's CLKN (clock native)), channel information (for example, used channel map), service discovery protocol (SDP) result information, supported feature, manufacture data, or key information (for example, a link key).

The second external audio electronic device 630 may receive data transmitted and received between the first external audio electronic device 610 and the second electronic device 670 through monitoring of the third communication link.

In step 613, the first external audio electronic device 610 transmits a message indicating that the right for the third communication link established between the second electronic device 670 and the first external audio electronic device 610 to the second external audio electronic device 630.

The first external audio electronic device 610 may identify whether a condition for changing the entity of the right for the communication link to the second external audio electronic device 630 is satisfied. For example, the condition for changing the entity of the right for the communication link may include at least one of communication quality information of the external audio electronic device (for example, the first external audio electronic device 610 and/or the second external audio electronic device 630), state information of the external audio electronic device, a connection state of communication between the external audio electronic device and a plurality of electronic devices, or a user selection. When the second external audio electronic device 630 satisfies the condition for changing the entity of the right for the communication link, the first external audio electronic device 610 may transmit the message indicating that the right for the communication link is given. The first external audio electronic device 610 may identify at least one communication link for which the entity of the right is to be changed among a plurality of communication links established between the first external audio electronic device 610 and each of the plurality of electronic devices according to a predetermined condition.

For example, the first external audio electronic device 610 may identify at least one communication link for which the entity of the right is to be changed according to the order of generation of communication links with the first external audio electronic device 610. Additionally or alternatively, the first external audio electronic device 610 may identify, as the communication link for which the entity for the right is to be changed, a communication link established with at least one electronic device that is not outputting audio data among a plurality of electronic devices establishing communication links with the first external audio electronic device 610.

In step 615, the second external audio electronic device 630 maintains and manages the third communication link.

The second external audio electronic device 630 may maintain and manage the third communication link on behalf of the first external audio electronic device 610 while transmitting and receiving data to and from the second electronic device 670 on the basis of a message indicating that the right for the third communication link is given to the second external audio electronic device 630, received from the first external audio electronic device 610.

In step 617, the first external audio electronic device 610 receives data from the second electronic device 670 by only monitoring the third communication link established between the first external audio electronic device 610 and the second electronic device 670.

Figure 7:
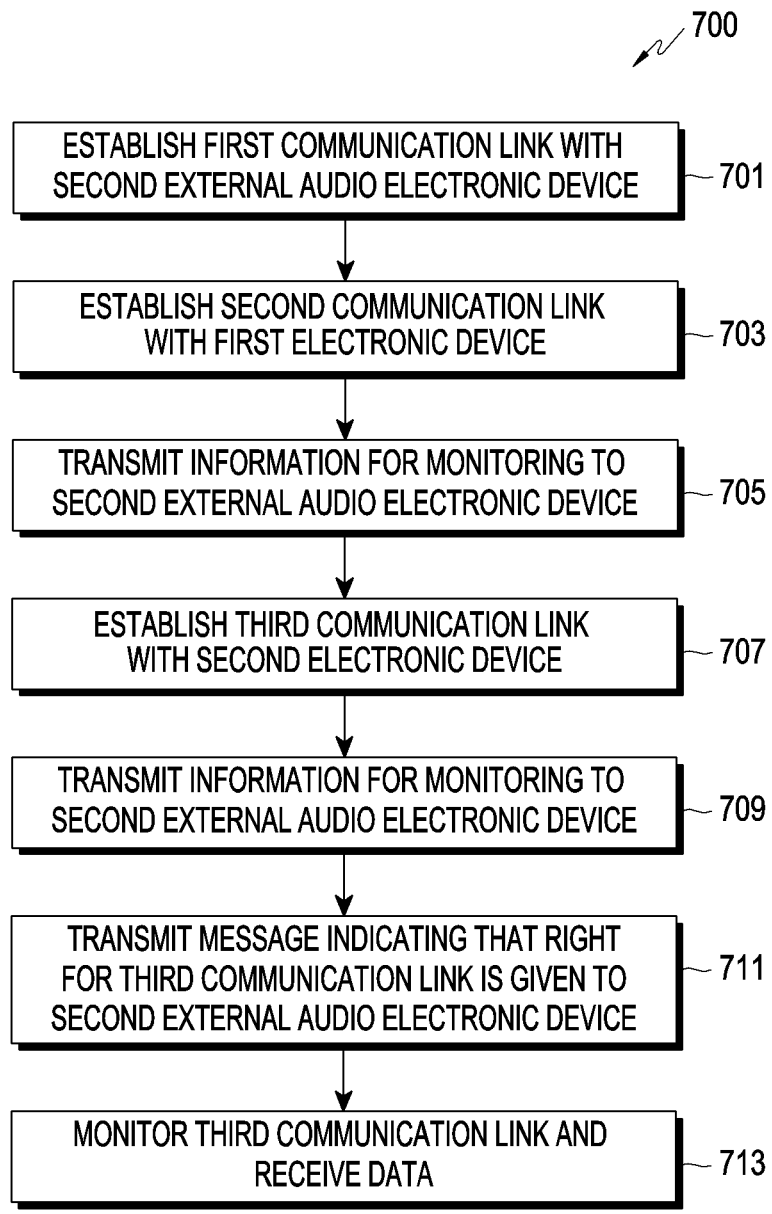
FIG. 7 is a flowchart illustrating a communication link management operation of a first external audio electronic device, according to an embodiment.

FIG. 7 is a flowchart 700 illustrating a communication link management operation by a first external audio electronic device, according to an embodiment. Operations for providing the communication link management operation may include steps 701 to 713. The communication link management operation may be performed by a first external audio electronic device 610 or a processor 280a of the first external audio electronic device. At least one of steps 701 to 713 may be omitted, the order of some steps may be changed, or other steps may be added.

In step 701, the first external audio electronic device establishes a first communication link with a second external audio electronic device 630 through a communication circuit 210a.

The first external audio electronic device and the second external audio electronic device may be configured such that the first external audio electronic device operates as a main external audio electronic device and the second external audio electronic device operates as a sub external audio electronic device through a step for establishing the first communication link. The first external audio electronic device may maintain and manage the first communication link while transmitting and receiving data to and from the second external audio electronic device.

The first external audio electronic device or the second external audio electronic device may inform the user that the first external audio electronic device and the second external audio electronic device are connected to each other through various methods that can be recognized by the user (for example, a sound or vibration).

In step 703, the first external audio electronic device establishes a second communication link with a first electronic device 650 through the communication circuit 210a.

The first external audio electronic device may maintain and manage the second communication link while transmitting and receiving data to and from the first electronic device.

In step 705, the first external audio electronic device transmits information for monitoring the second communication link to the second external audio electronic device.

The first external audio electronic device may transmit connection information related to the second communication link established with the first electronic device to the second external audio electronic device through the first communication link and allow the second external audio electronic device to monitor the second communication link.

Communication link-related connection information for monitoring the communication link may include at least one piece of address information of each of the first electronic device and the first external audio electronic device (for example, at least one of a Bluetooth address or an LT address), clock information (for example, at least one of a Bluetooth piconet clock or master's CLKN (clock native)), channel information (for example, a used channel map), SDP result information, supported feature information, manufacture data, or key information (for example, a link key).

In step 707, the first external audio electronic device establishes a third communication link with a second electronic device 670 through the communication circuit 210a.

The first external audio electronic device may maintain and manage the third communication link while transmitting and receiving data to and from the second electronic device.

In step 709, the first external audio electronic device transmits monitoring information to the second external audio electronic device.

The first external audio electronic device may transmit connection information related to the third communication link established with the second electronic device to the second external audio electronic device through the first communication link and allow the second external audio electronic device to monitor the third communication link.

In step 711, the first external audio electronic device transmits a message indicating that the right for the third communication link is given to the second external audio electronic device.

The first external audio electronic device may identify whether a condition for changing the entity of the right for at least one communication link among communication links with each of a plurality of electronic devices to the second external audio electronic device is satisfied. For example, the condition for changing the entity of the right for the communication link may include at least one of communication quality information of the external audio electronic device (for example, the first external audio electronic device 610 and/or the second external audio electronic device 630), state information of the external audio electronic device, a connection state of communication between the external audio electronic device and a plurality of electronic devices, or a user selection. Through the first communication link, the first external audio electronic device may receive communication quality information of the second communication link or the third communication link through which the second external audio electronic device may receive data through monitoring. When the condition for changing the entity of the right for the communication link to the second external audio electronic device is satisfied, the first external audio electronic device may transmit, to the second external audio electronic device, a message indicating that the right for the third communication link established between the first external audio electronic device and the second electronic device among the first electronic device and the second electronic device establishing the communication link with the first external audio electronic device 610 to the second external audio electronic device. The first external audio electronic device may identify at least one communication link for which the entity for the right is to be changed among a plurality of communication links established between the first external audio electronic device and each of a plurality of electronic devices according to a predetermined condition. For example, the first external audio electronic device may identify at least one communication link for which the entity of the right is to be changed according to an order communication links are established with the first external audio electronic device. Additionally or alternatively, the first external audio electronic device may identify, as the communication link for which the entity of the right is to be changed, a communication link established with at least one electronic device that is not outputting audio data among a plurality of electronic devices establishing communication links with the first external audio electronic device.

In step 713, the first external audio electronic device monitors the third communication link and receive data. The first external audio electronic device may hand over the right for the third communication link established between the second electronic device and the first external audio electronic device to the second external audio electronic device and monitor the third communication link. The first external audio electronic device may monitor the third communication link from the time point at which the right for the third communication link is given to the second external audio electronic device and receive data. The first external audio electronic device may monitor the third communication link from the time point at which a request for monitoring the third communication link is received from the second external audio electronic device after the right for the third communication link is handed over to the second external audio electronic device.

Figure 8:
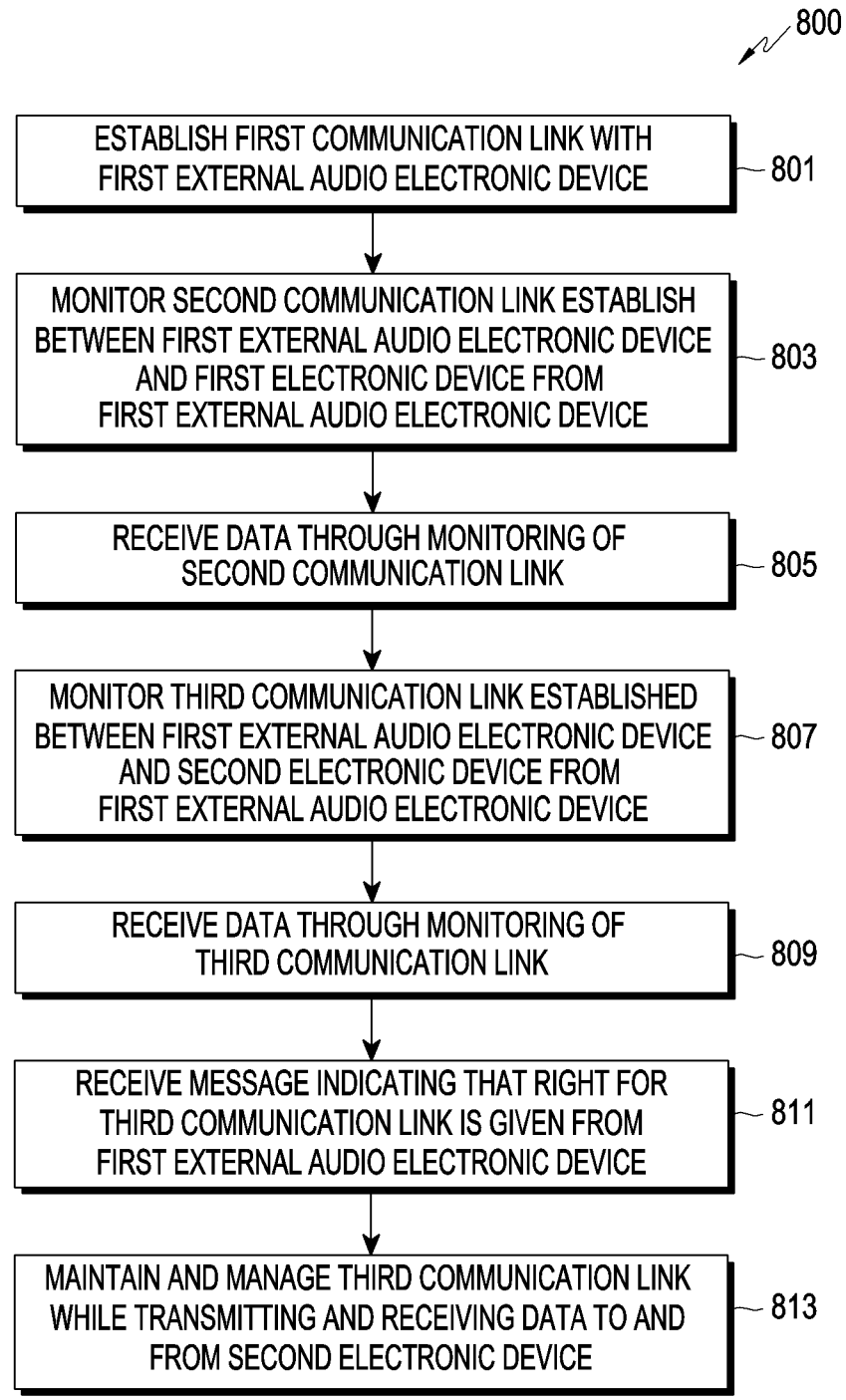
FIG. 8 is a flowchart illustrating a communication link management operation of a second external audio electronic device, according to an embodiment.

FIG. 8 is a flowchart 800 illustrating a communication link management operation by a second external audio electronic device, according to an embodiment. Operations for providing the communication link management operation may include steps 801 to 813. The communication link management operation may be performed by a second external audio electronic device. At least one of steps 801 to 813 may be omitted, the order of some steps may be changed, or other steps may be added.

In step 801, the second external audio electronic device establishes a first communication link with a first external audio electronic device through a communication circuit.

The first external audio electronic device or the second external audio electronic device may inform the user that the first external audio electronic device and the second external audio electronic device are connected to each other through various methods that can be recognized by the user (for example, a sound or vibration).

In an operation for establishing the first communication link, the first external audio electronic device may be configured as a main external audio electronic device, and the second external audio electronic device may be configured as a sub external audio electronic device. The first external audio electronic device which is the main external audio electronic device may maintain and manage the first communication link while transmitting and receiving data to and from the second external audio electronic device.

In step 803, the second external audio electronic device monitors the second communication link established between the first external audio electronic device and the first electronic device 650.

The second external audio electronic device may receive connection information related to the second communication link established between the first external audio electronic device and the first electronic device 650 from the first external audio electronic device and monitor the second communication link on the basis of the received connection information related to the second communication link.

Communication link-related connection information for monitoring the communication link may include at least one piece of address information of each of the first electronic device and the first external audio electronic device (for example, at least one of a Bluetooth address or an LT address), clock information (for example, at least one of a Bluetooth piconet clock or master's CLKN (clock native)), channel information (for example, a used channel map), SDP result information, supported feature information, manufacture data, or key information (for example, a link key).

In step 805, the second external audio electronic device receives data from the first electronic device on the basis of monitoring the second communication link.

In step 807, the second external audio electronic device monitors a third communication link established between the first external audio electronic device and the second electronic device 670.

Connection information related to the third communication link established between the first external audio electronic device and the second electronic device 670 may be received from the first external audio electronic device, and the third communication link may be monitored on the basis of the received connection information related to the third communication link.

In step 809, the second external audio electronic device receives data from the second electronic device on the basis of monitoring of the third communication link.

In step 811, the second external audio electronic device receives a message indicating that the right for the third communication link is given from the first external audio electronic device.

In step 813, the second external audio electronic device transmits and receives data to and from the second electronic device and maintains and manages the third communication link.

When receiving a message indicating that the right for the third communication link is given from the first external audio electronic device while the third communication link is monitored to receive data from the second electronic device, the second external audio electronic device configured as the sub external audio electronic device may transmit and receive data to and from the second electronic device, which is the role of the main external audio electronic device for the third communication link and maintain and manage the third communication link.

Figure 9:
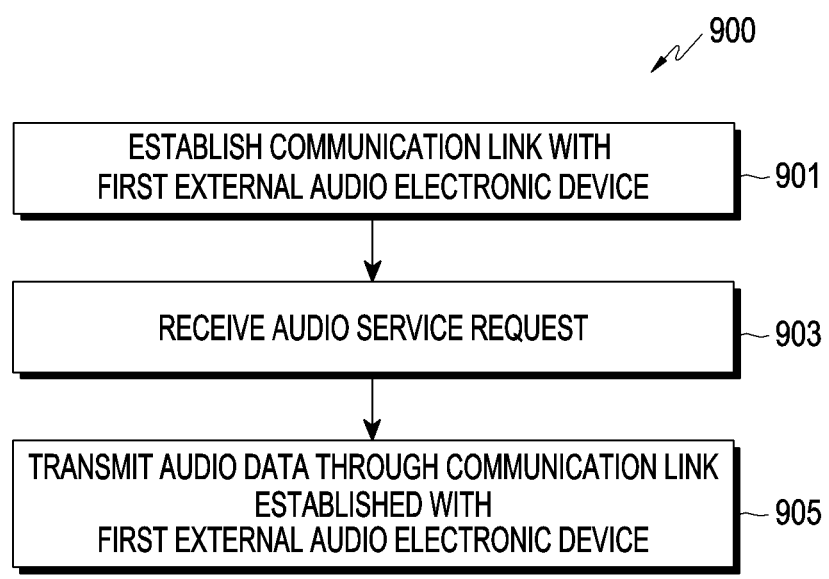
FIG. 9 is a flowchart illustrating an operation in which an electronic device outputs data, according to an embodiment.

FIG. 9 is a flowchart 900 illustrating an operation in which an electronic device outputs data, according to an embodiment. Operations for providing the communication link management operation may include steps 901 to 905. The communication link management operation may be performed by an electronic device 101 or at least one processor. At least one of steps 901 to 905 may be omitted, the order of some steps may be changed, or other steps may be added.

In step 901, the electronic device establishes a communication link (for example, the second communication link 572) with a first external audio electronic device 551*a* configured as the main external audio electronic device among a pair of external audio electronic devices operating as one pair.

When the electronic device (for example, the first electronic device 650) establishes a second communication link with the first external audio electronic device 610, the electronic device may transmit and receive a connection identification message (for example, a poll packet message) and a connection identification response message (for example, a null packet message) to and from the first external audio electronic device which is the entity of the right for the second communication link through the second communication link and maintain the third communication link.

The electronic device (for example, the first electronic device 650) may inform the user of the connection with a pair of external audio electronic devices operating as one pair through various methods that can be recognized by the user (for example, a sound or vibration).

In step 903, the electronic device receives a request for an audio service. For example, a music application among various applications for outputting audio data may be executed, and when reproduction of the audio data is selected by the user in the music application, receive a request for an audio service making a request for reproducing the audio data.

In step 905, the electronic device transmits the audio data to the first external audio electronic device through the communication link established with the first external audio electronic device.

The electronic device (for example, the first electronic device 650) may transmit the audio data to the first external audio electronic device which is the entity of the right for the second communication through the second communication link. Even though the current entity of the right for the second communication link is the second external audio electronic device, the electronic device may not know a change in the entity of the right for the second communication link to the second external audio electronic device. Accordingly, the electronic device transmits the audio data through the second communication link established with the first external audio electronic device, and the second external audio electronic device which is the current entity of the right may receive data from the electronic device. Further, when the second external audio electronic device transmits data to the electronic device to manage/maintain the second communication link, the electronic device may recognize that the data is received from the first external audio electronic device rather than from the second external audio electronic device.

When the first external audio electronic device and the second external audio electronic device establish the first communication link and the first external audio electronic device shares second communication link information with the second external audio electronic device, the second external audio electronic device may also receive the audio data by monitoring the second communication link.

The electronic device (for example, the first electronic device 650) may transmit the audio data to the first external audio electronic device which is the entity of the right for the second communication link through the second communication link.

FIG. 1A is a diagram 1000*a* illustrating a communication link management operation, according to an embodiment. FIG. 10B is a diagram 1000*b* illustrating a communication link management operation, according to an embodiment. FIG. 10C is a diagram 1000*c* illustrating a communication link management operation, according to an embodiment.

Figure 10A:
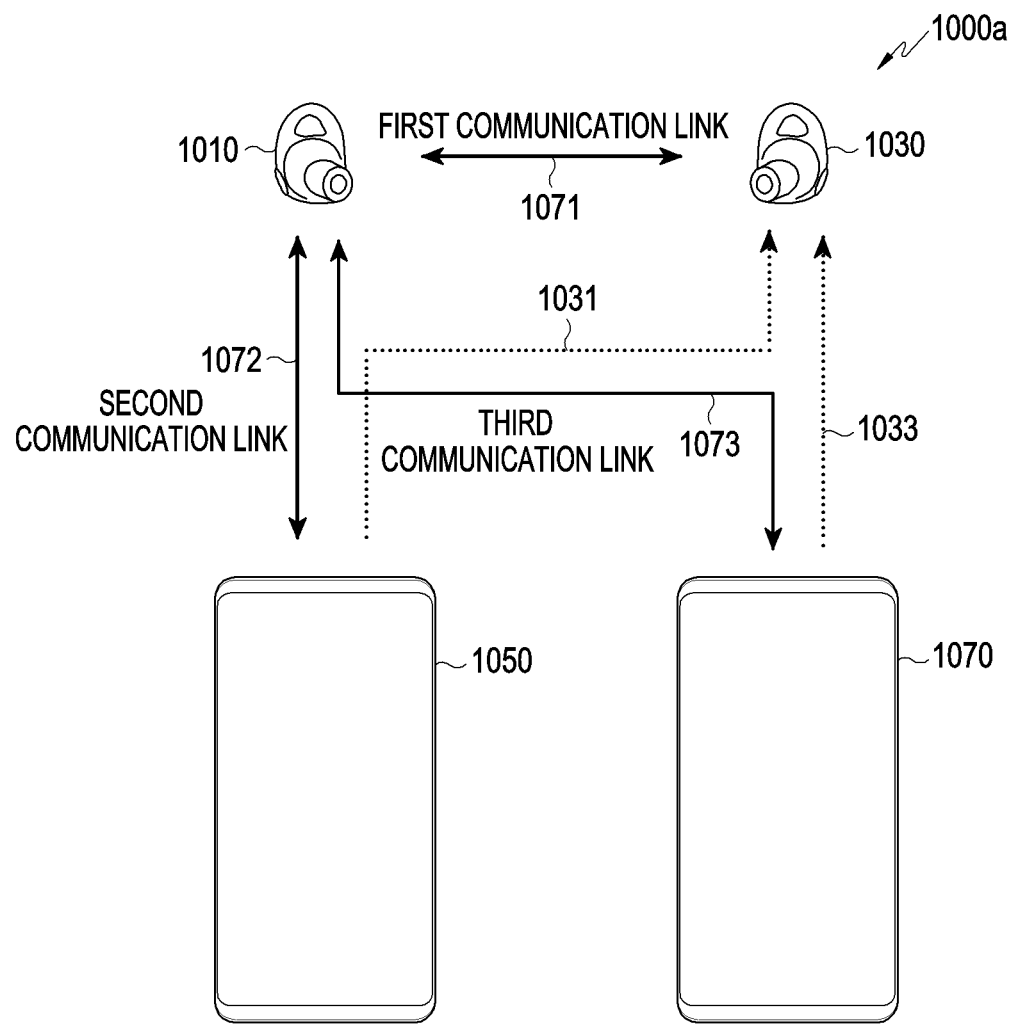
FIG. 10A illustrates a communication link management operation, according to an embodiment.
Figure 10B:
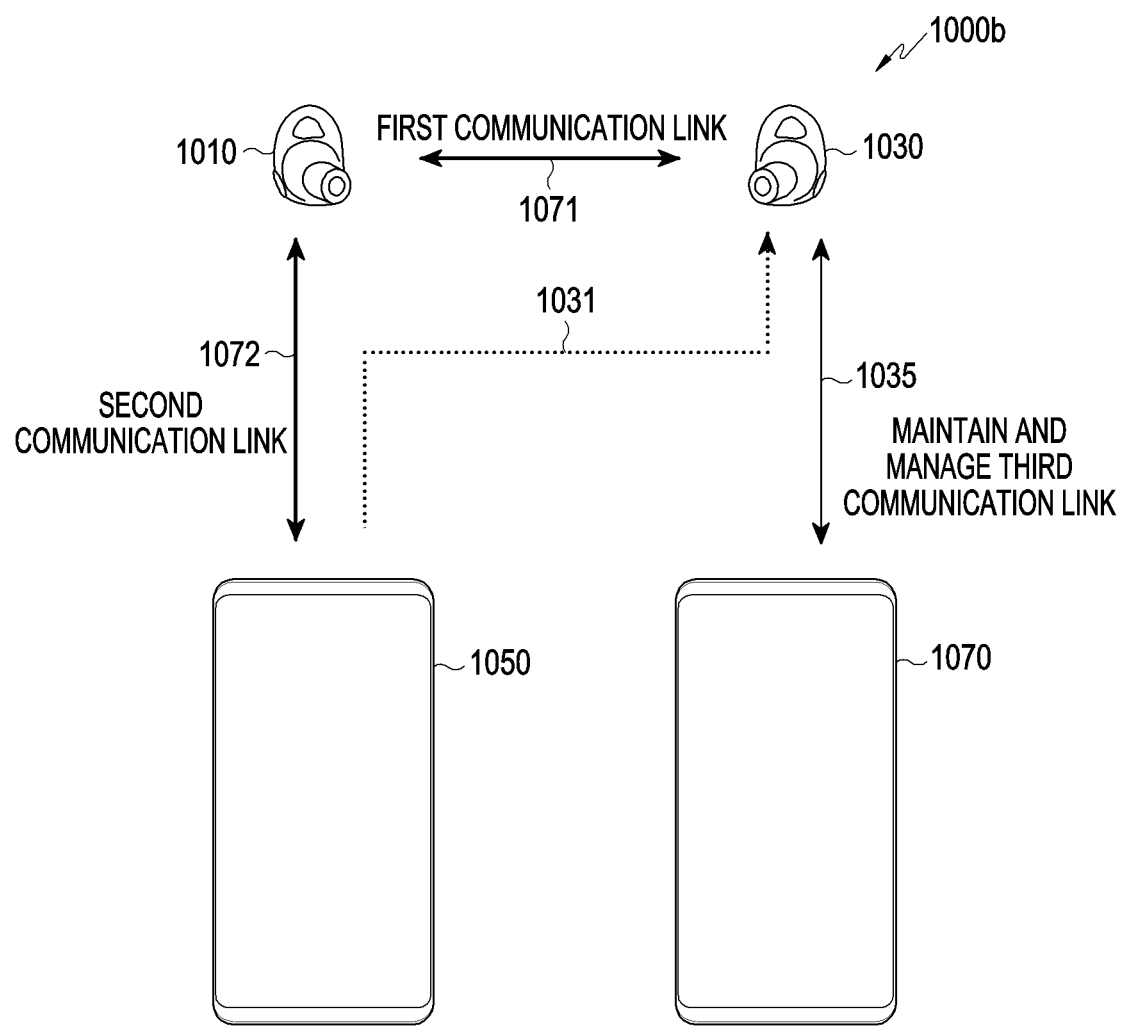
FIG. 10B illustrates a communication link management operation, according to an embodiment.
Figure 10C:
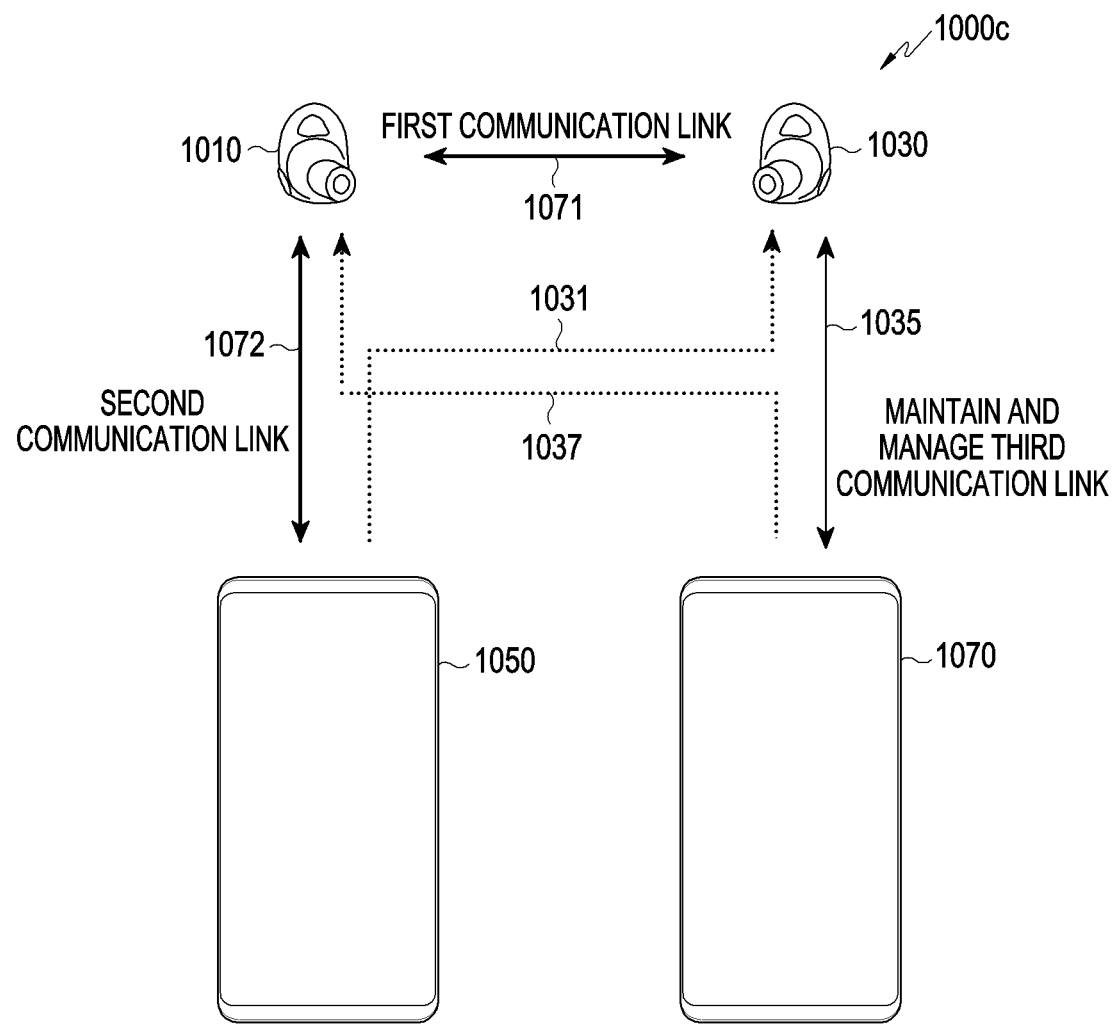
FIG. 10C illustrates a communication link management operation, according to an embodiment.

A first external audio electronic device 1010 of FIGS. 10A to 10C may be implemented to be substantially the same as or similar to the first external audio electronic device 551*a* of FIG. 5A, and a second external audio electronic device 1030 may be implemented to be substantially the same as or similar to the second external audio electronic device 553*a* of FIG. 5A.

As illustrated in FIG. 10A, the first external audio electronic device 1010 configured as a main external audio electronic device and the second external audio electronic device 1030 configured as a sub external audio electronic device may establish a first communication link 1071, and the first external audio electronic device 1010 which is the entity of the right for the first communication link may maintain and manage the first communication link while transmitting and receiving data to and from the second external audio electronic device 1030 through the first communication link 1071. The first external audio electronic device 1010 may establish a second communication link 1072 with a first electronic device 1050 and establish a third communication link 1073 with a second electronic device 1070. The first external audio electronic device 1010 which is the entity of the right for the second communication link 1072 and the third communication link 1073 may maintain and manage the second communication link 1072 and the third communication link 1073 while transmitting and receiving data to and from the first electronic device 1050 through the second communication link 1072 and transmitting data to the second electronic device 1070 through the third communication link 1073.

The first external audio electronic device 1010 may share connection information related to the second communication link and connection information related to the third communication link with the second external audio electronic device 1030 through the first communication link 1071. The second external audio electronic device 1030 may monitor the second communication link 1072 and the third communication link 1073 as indicated by reference numerals 1031 and 1033. The second external audio electronic device 1030 may monitor the second communication link 1072 and the third communication link 1073 on the basis of the connection information related to the second communication link and the connection information related to the third communication link received from the first external audio electronic device 1010 as indicated by reference numerals 1031 and 1033 and receive data from the first electronic device 1050 and the second electronic device 1070.

As illustrated in FIG. 10B, when the first external audio electronic device 1010 gives the right for a third communication link established between the first external audio electronic device 1010 and the second electronic device 1070 to the second external audio electronic device 1030 on the basis of a condition for changing the entity of the right for the communication link, the second external audio electronic device 1030 may transmit and receive data to and from the second electronic device 1070 through the third communication link established between the first external audio electronic device 1010 and the second electronic device 1070 without any direct connection with the second electronic device 1070.

For example, when a signal intensity (for example, −65 dBm) between the second external audio electronic device 1030 and the second electronic device 1070 is higher than a signal intensity (for example, −75 dBm) between the first external audio electronic device 1010 and the second electronic device 1070 while the second external audio electronic device 1030 monitors the second communication link 1072 and the third communication link 1073 as indicated by reference numerals 1031 and 1033, the first external audio electronic device 1010 may give the right for the third communication link 1073 to the second external audio electronic device 1030.

When the first external audio electronic device 1010 identifies that a battery level (for example, 45%) of the first external audio electronic device is lower than a battery level (for example, 50%) of the second external audio electronic device while the second external audio electronic device 1030 monitors the second communication link 1072 and the third communication link 1073 as indicated by reference numeral 1031 and 1033, the first external audio electronic device 1010 may give the right for the third communication link 1073 to the second external audio electronic device 1030.

When the first external audio electronic device 1010 detects that the first external audio electronic device 1010 is separated from the user's ears while the second external audio electronic device 1030 monitors the second communication link 1072 and the third communication link 1073 as indicated by reference numeral 1031 and 1033, the right for the second communication link and/or the right for the third communication link may be given to the second external audio electronic device 1030 worn on the user's ears.

When the first external audio electronic device 1010 establishes the third communication link 1073 with the second electronic device 1070 after establishing the second communication link 1072 with the first electronic device 1050, the right for the third communication link 1073 which is a communication link established for the last time may be given to the second external audio electronic device 1030.

For example, the first electronic device may establish the communication link with the first external audio electronic device 1010 or the second external audio electronic device 1030 on the basis of selection of the user of the first electronic device 1050, and the second electronic device 1070 may establish the communication link with the first external audio electronic device 1010 or the second external audio electronic device 1030 on the basis of selection of the user of the second electronic device 1070.

The first external audio electronic device 1010 may give the right for the third communication link to the second external audio electronic device and stop data transmission and reception through the third communication link. The second external audio electronic device 1030 may transmit and receive data to and from the second electronic device 1070 through the third communication link and maintain and manage the third communication link as indicated by reference numeral 1035, and monitor the second communication link to receive data from the first electronic device 1050 as indicated by reference numeral 1031. As illustrated in FIG. 10C, when data (for example, audio data) is received from the second electronic device 1070 while the first external audio electronic device 1010 maintains and manages the first communication link 1071 and the second communication link 1072 and the second external audio electronic device 1030 maintains and manages the third communication link as indicated by reference numeral 1035 and monitors the second communication link 1072 as indicated by reference numeral 1031, a request for monitoring the third communication link may be made to the first external audio electronic device 1010 through the first communication link 1071. When the request for monitoring the third communication link is made by the second external audio electronic device 1030, the first external audio electronic device 1010 may monitor the third communication link as indicated by reference numeral 1037 and receive data from the second electronic device 1070. The first external audio electronic device 1010 may monitor the third communication link and receive data (for example, audio data) transmitted from the second electronic device 1070 without any request for monitoring the third communication link from the second external audio electronic device 1030 after giving the right for the third communication link to the second external audio electronic device 1030.

The first external audio electronic device 1010 may maintain both the monitoring 1031 of the second communication link and the monitoring 1037 of the third communication link or maintain only monitoring one of monitoring 1031 of the second communication link or monitoring 1037 of the third communication link according to an operation state of each of the first electronic device 1050 and the second electronic device 1070. For example, when the first electronic device is currently in a standby mode and the second electronic device 1070 is in a music reproduction mode, only the third communication link may be monitored as indicated by reference numeral 1037.

The second external audio electronic device 1030 may make a request for withdrawing the right for the third communication link to the first external audio electronic device 1010 or the right for the third communication link may be automatically withdrawn by the first external audio electronic device 1010 on the basis of the condition for changing the entity of the right for the communication link.

For example, when the signal intensity between the second external audio electronic device 1030 and the second electronic device 1070 is lower than the signal intensity between the first external audio electronic device 1010 and the second electronic device 1070, the first external audio electronic device 1010 may automatically withdraw the right for the third communication link from the second external audio electronic device 1030, or the second external audio electronic device 1030 may make a request for withdrawing the right for the third communication link to the first external audio electronic device 1010.

When the battery level of the second external audio electronic device 1030 is lower than the battery level of the first external audio electronic device 1010, the first external audio electronic device 1010 may automatically withdraw the right for the third communication link from the second external audio electronic device 1030, or the second external audio electronic device 1030 may make a request for withdrawing the right for the third communication link to the first external audio electronic device 1010.

In order to identify the entity of the right for the communication link (for example, the second communication link or the third communication link), the first external audio electronic device 1010 and the second external audio electronic device 1030 may exchange device information (a battery state information or signal intensity information with the external electronic device) with the first electronic device 1050 or the second electronic device 1070 periodically or when an event (for example, a reception of data event) is generated.

Figure 11:
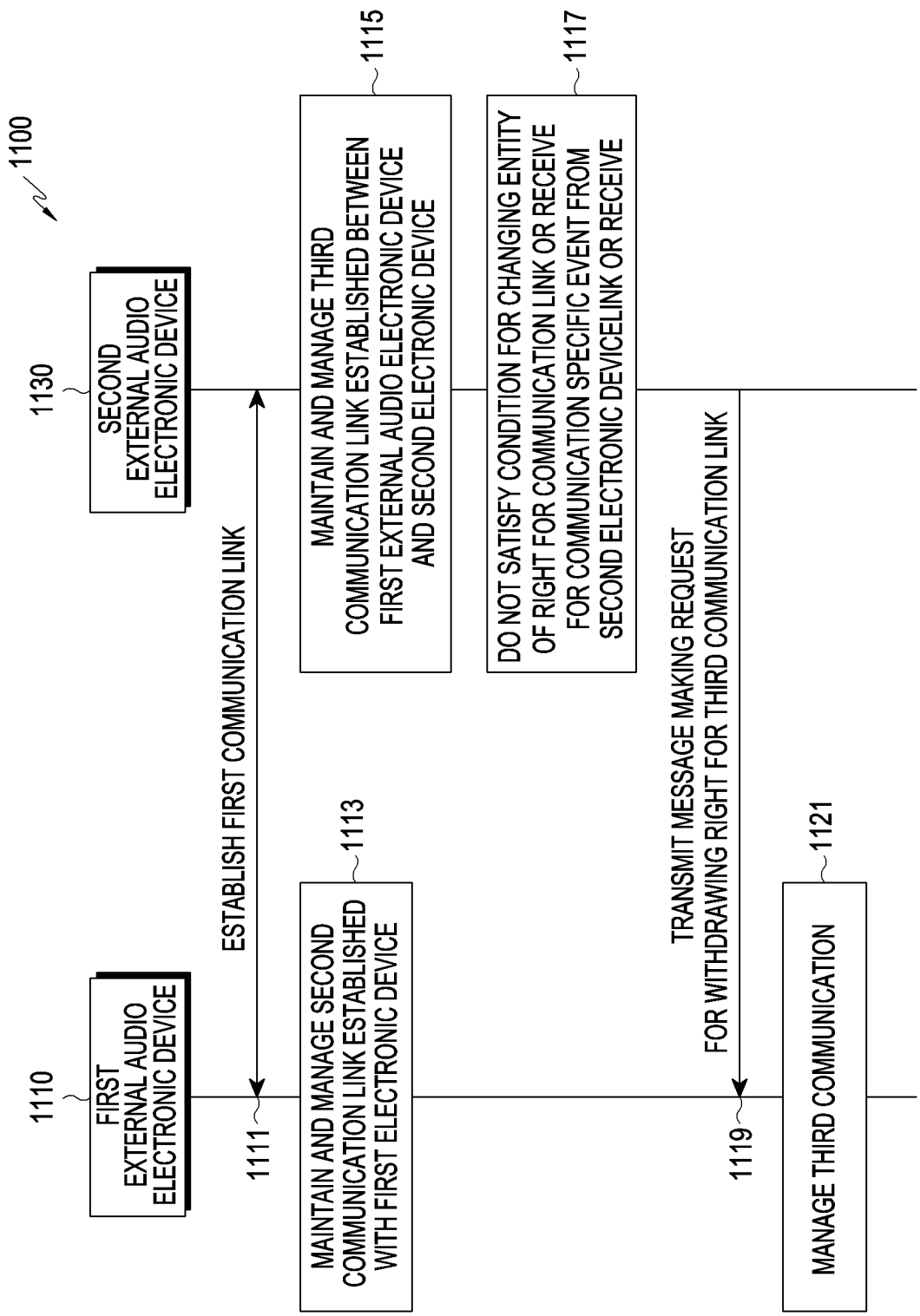
FIG. 11 is a flowchart illustrating a communication link management operation, according to an embodiment.

FIG. 11 is a diagram 1100 illustrating a communication link management operation, according to an embodiment. Operations for providing the communication link management operation may include steps 1111 to 1121. At least one of steps 1111 to 1121 may be omitted, the order of some steps may be changed, or other steps may be added.

In step 1111, a first external audio electronic device 1110 and a second external audio electronic device 1130 establishes a first communication link and performs bidirectional communication. When the second external audio electronic device 1130 satisfies the condition for changing the entity of the right for the communication link the first external audio electronic device 1110 may transfer the right for a third communication link established between the first external audio electronic device 1110 and the second electronic device to the second external audio electronic device 1130.

In step 1113, the first external audio electronic device 1110 maintains and manages a second communication link established with the first electronic device. The first external audio electronic device 1110 monitors the third communication link for which the right is transferred to the second external audio electronic device 1130.

In step 1115, the second external audio electronic device 1130 maintains and manages the third communication link established between the first external audio electronic device and the second electronic device on the basis of the right for the third communication link given from the first external audio electronic device 1110. The second external audio electronic device 1130 may monitor the second communication link.

In step 1117, the second external audio electronic device 1130 the condition for changing the entity of the right for the communication link is not satisfied, or the second external audio electronic device 1130 receives a specific event. The condition for changing the entity of the right for the communication link may include at least one of communication quality information, state information of the external audio electronic device, a connection state of communication between the external audio electronic device and a plurality of electronic devices, or a user selection. The specific event corresponding to the condition for withdrawing the right may be identified according to capability information of the first external audio electronic device 1110 and the second external audio electronic device 1130. For example, when a call is received from the second electronic device through the third communication link or when a microphone is included only in the first external audio electronic device 1110, the entity of the right for the third communication link may be changed from the second external audio electronic device 1130 to the first external audio electronic device 1110.

In step 1119, the second external audio electronic device 1130 transmits a message making a request for withdrawing the right for the third communication link to the first external audio electronic device 1110.

In step 1121, the first external audio electronic device 1110 withdraws the right for the third communication link according to a request from the second external audio electronic device 1130 and manages the third communication link while transmitting and receiving data to and from the second electronic device through the third communication link. The second external audio electronic device 1130 may monitor the third communication link.

Figure 12:
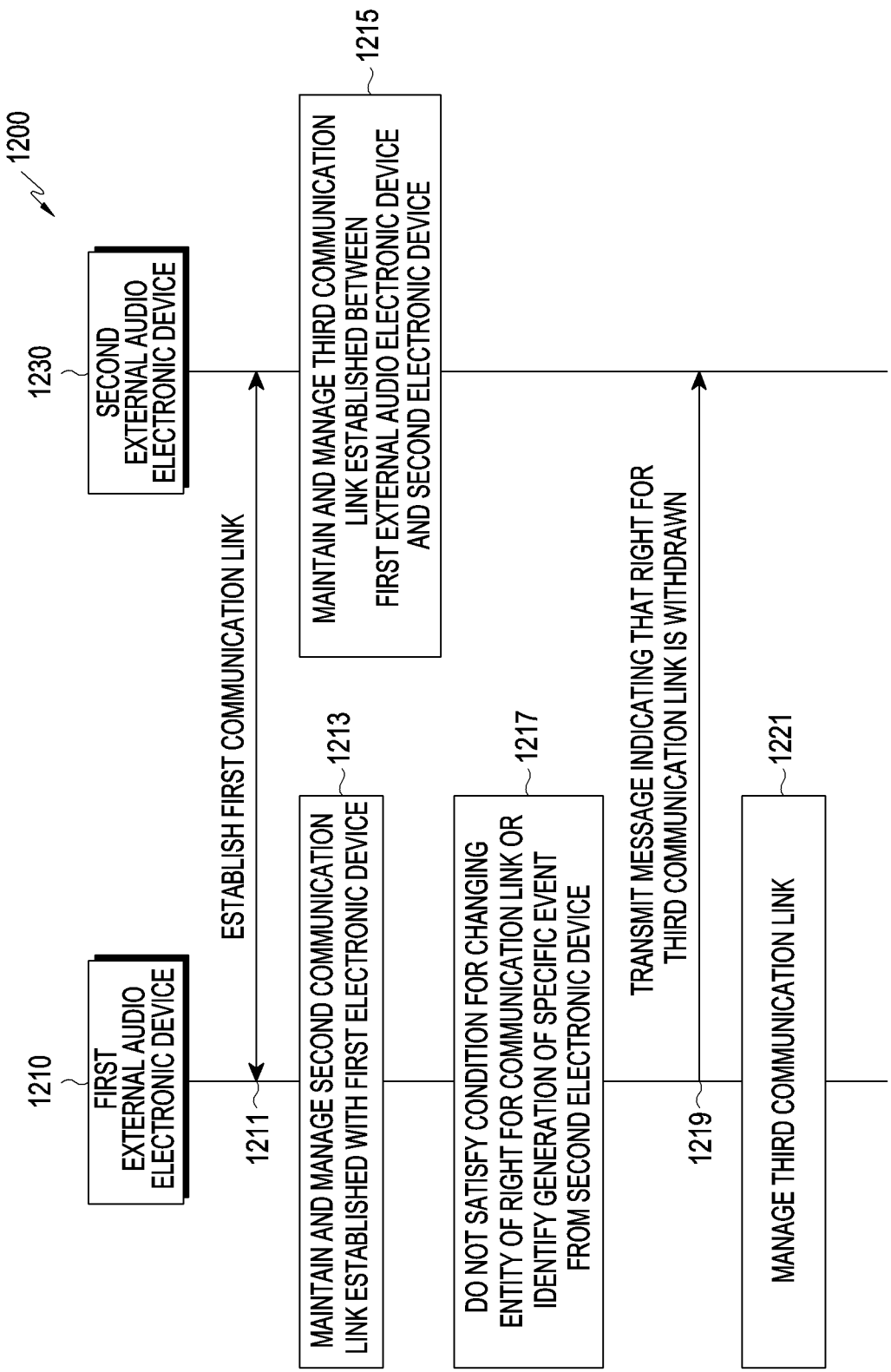
FIG. 12 is a flowchart illustrating a communication link management operation, according to an embodiment.

FIG. 12 is a diagram 1200 illustrating a communication link management operation, according to an embodiment. Operations for providing the communication link management operation may include steps 1211 to 1221. At least one of steps 1211 to 1221 may be omitted, an order of some steps may be changed, or other steps may be added.

In step 1211, a first external audio electronic device 1210 and a second external audio electronic device 1230 establishes a first communication link and performs bidirectional communication. When the second external audio electronic device 1230 satisfies the condition for changing the entity of the right for the communication link, the first external audio electronic device 1210 may transfer the right for a third communication link established between the first external audio electronic device 1210 and the second electronic device to the second external audio electronic device 1230.

In step 1213, the first external audio electronic device 1210 maintains and manages a second communication link established with the first electronic device and monitors the third communication link.

In step 1215, the second external audio electronic device 1230 maintains and manages the third communication link established between the first external audio electronic device 1210 and the second electronic device on the basis of the right for the third communication link given from the first external audio electronic device 1210 and monitors the second communication link.

In step 1217, the first external audio electronic device 1210 identifies that the second external audio electronic device 1230 does not satisfy the condition for changing the entity of the right for the communication link or identifies the generation of a specific event. It may be identified that the second external audio electronic device 1230 does not satisfy the condition for changing the entity of the right for the communication link or the generation of a specific event corresponding to the condition for withdrawing the right for the communication link from the second electronic device may be identified through monitoring of the third communication link. The specific event corresponding to the condition for withdrawing the right may be identified according to capability information of the first external audio electronic device 1210 and the second external audio electronic device 1230. For example, when a call is received from the second electronic device through the third communication link and a microphone is included only in the first external audio electronic device 1210, it may be identified that a change in the entity of the right for the third communication link from the second external audio electronic device 1230 to the first external audio electronic device 1210 is needed.

In step 1219, the first external audio electronic device 1210 transmits a message indicating the right for the third communication link is withdrawn to the second external audio electronic device 1230.

In step 1221, the first external audio electronic device 1210 withdraws the right for the third communication link from the second external audio electronic device 1230 and manages the third communication link while transmitting and receiving data to and from the second electronic device through the third communication link.

Figure 13:
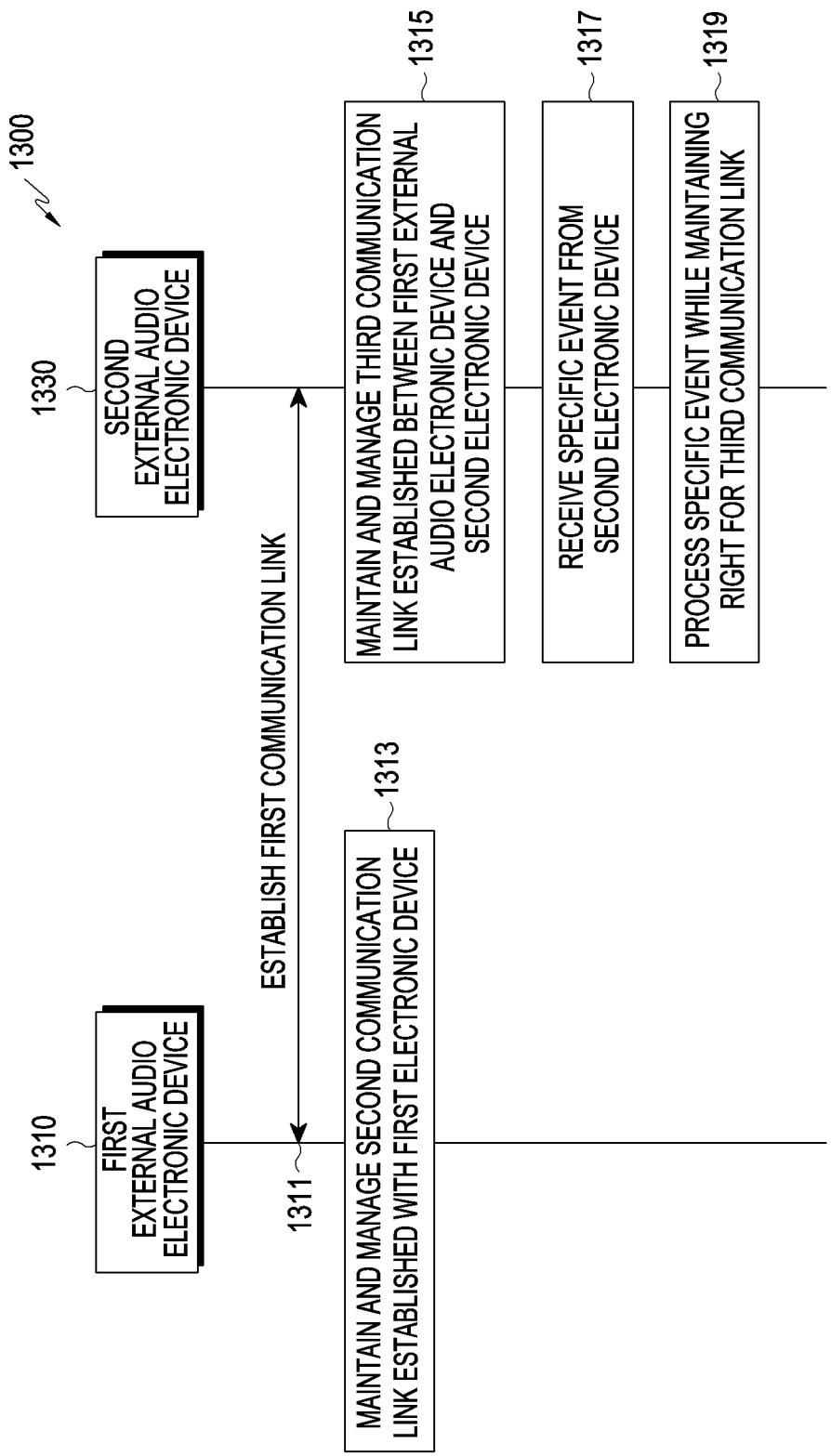
FIG. 13 is a flowchart illustrating a communication link management operation, according to an embodiment.

FIG. 13 is a diagram 1300 illustrating a communication link management operation, according to an embodiment. Operations for providing the communication link management operation may include steps 1311 to 1319. According to an embodiment, at least one of steps 1311 to 1319 may be omitted, the order of some steps may be changed, or other steps may be added.

In step 1311, a first external audio electronic device 1310 and a second external audio electronic device 1330 establishes a first communication link and performs bidirectional communication. When the second external audio electronic device 1330 satisfies the condition for changing the entity of the right for the communication link in the state in which the first external audio electronic device 1310 establishes a third communication link with a second electronic device, the right for a third communication link established between the first external audio electronic device 1310 and the second electronic device may be transferred to the second external audio electronic device 1330.

In step 1313, the first external audio electronic device 1310 maintains and manages a second communication link established with the first electronic device.

In step 1315, the second external audio electronic device 1330 maintains and manages the third communication link established between the first external audio electronic device 1310 and the second electronic device on the basis of the entity of the right for the third communication link given from the first external audio electronic device 1310. The second external audio electronic device 1330 maintains and manages the third communication link established between the first external audio electronic device 1310 and the second electronic device on the basis of the entity of the right for the third communication link given from the first external audio electronic device 1310 and monitors the second communication link.

In step 1317, the second external audio electronic device 1330 receives a specific event from the second electronic device.

In step 1319, the second external audio electronic device 1330 processes the specific event while maintaining the entity of the right for the third communication link. When the specific event received from the second electronic device is not an event corresponding to the condition for withdrawing the right for the communication link or when the condition for withdrawing the right is not configured in the event received from the second electronic device, the specific event may be processed while the entity of the right for the third communication link is maintained. When the specific event received from the second electronic device is not an event corresponding to the condition for withdrawing the right for the communication link or when the condition for withdrawing the right is not configured in the event received from the second electronic device, identification may be performed according to capability information of the first external audio electronic device 1310 and the second external audio electronic device 1330. For example, when a call is received from the second electronic device through the third communication link or when a microphone is included in the second external audio electronic device 1330, the second external audio electronic device 1330 may process the received specific event while maintaining the entity of the right for the third communication link. When the first external audio electronic device 1310 is not monitoring the third communication link, the second external audio electronic device 1330 may make a request for monitoring the third communication link to the first external audio electronic device 1310 and receive audio data corresponding to the specific event received from the second electronic device.

Figure 14A:
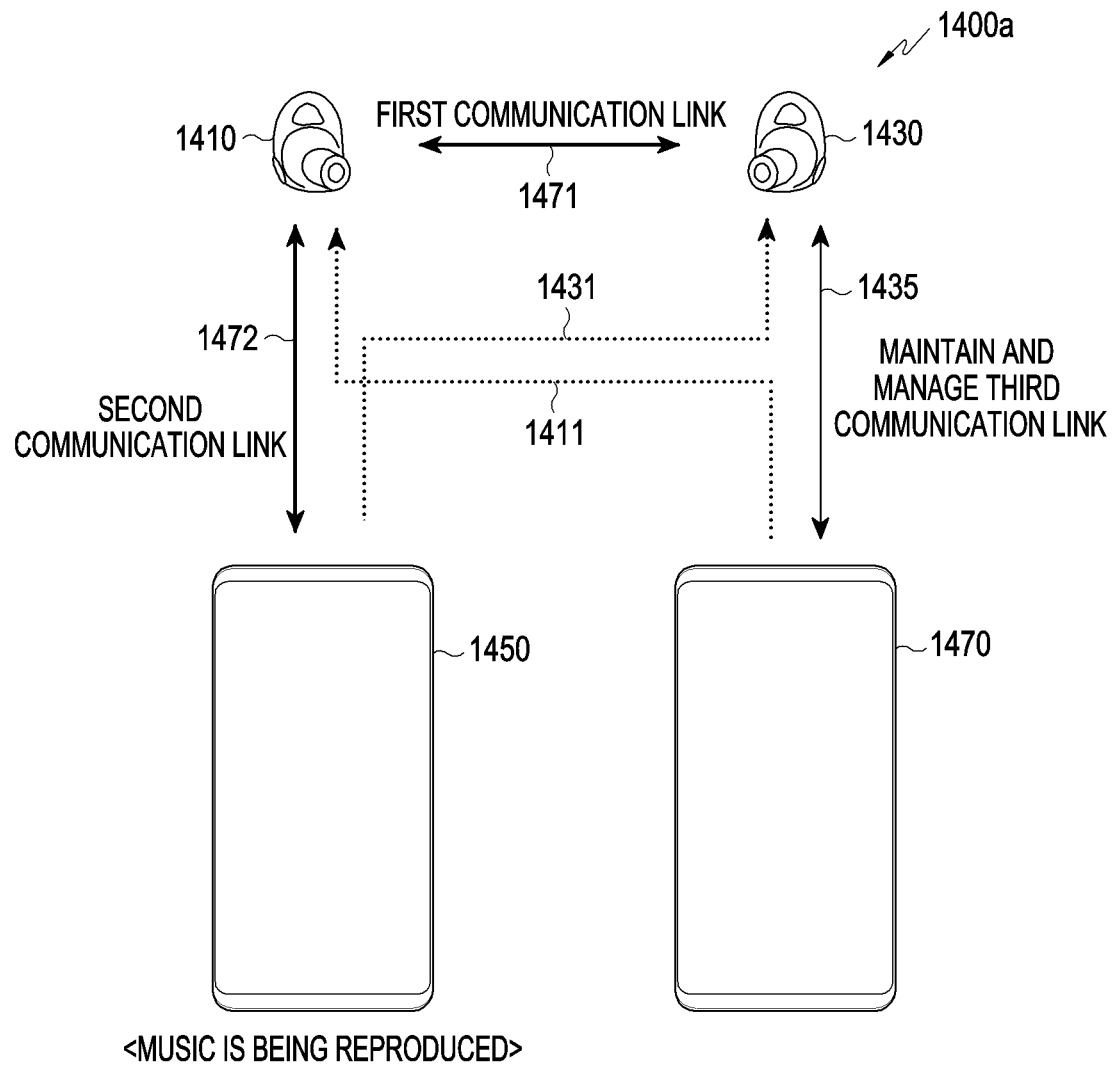
FIG. 14A illustrates a communication link management operation, according to an embodiment.
Figure 14B:
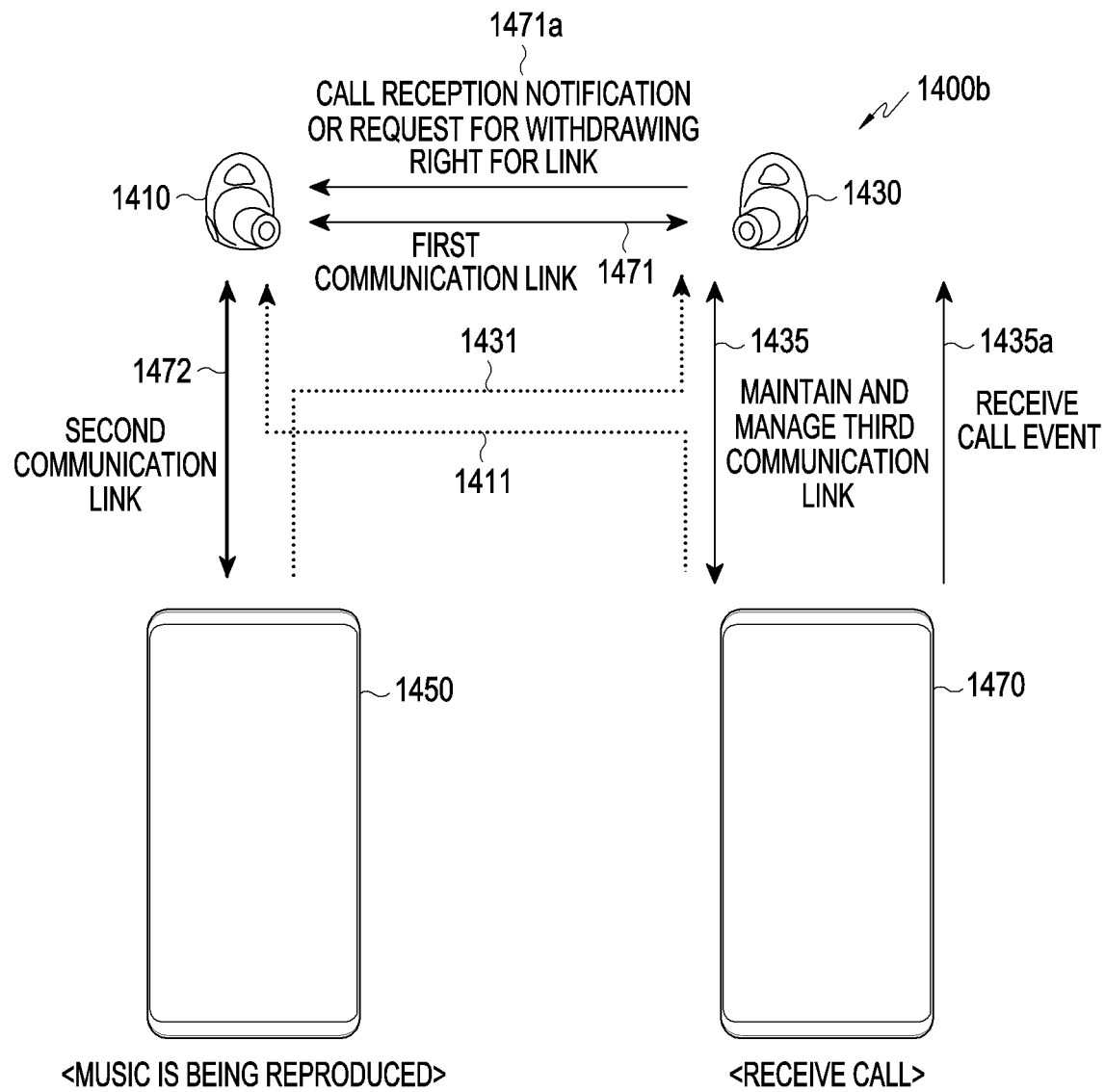
FIG. 14B illustrates a communication link management operation, according to an embodiment.
Figure 14C:
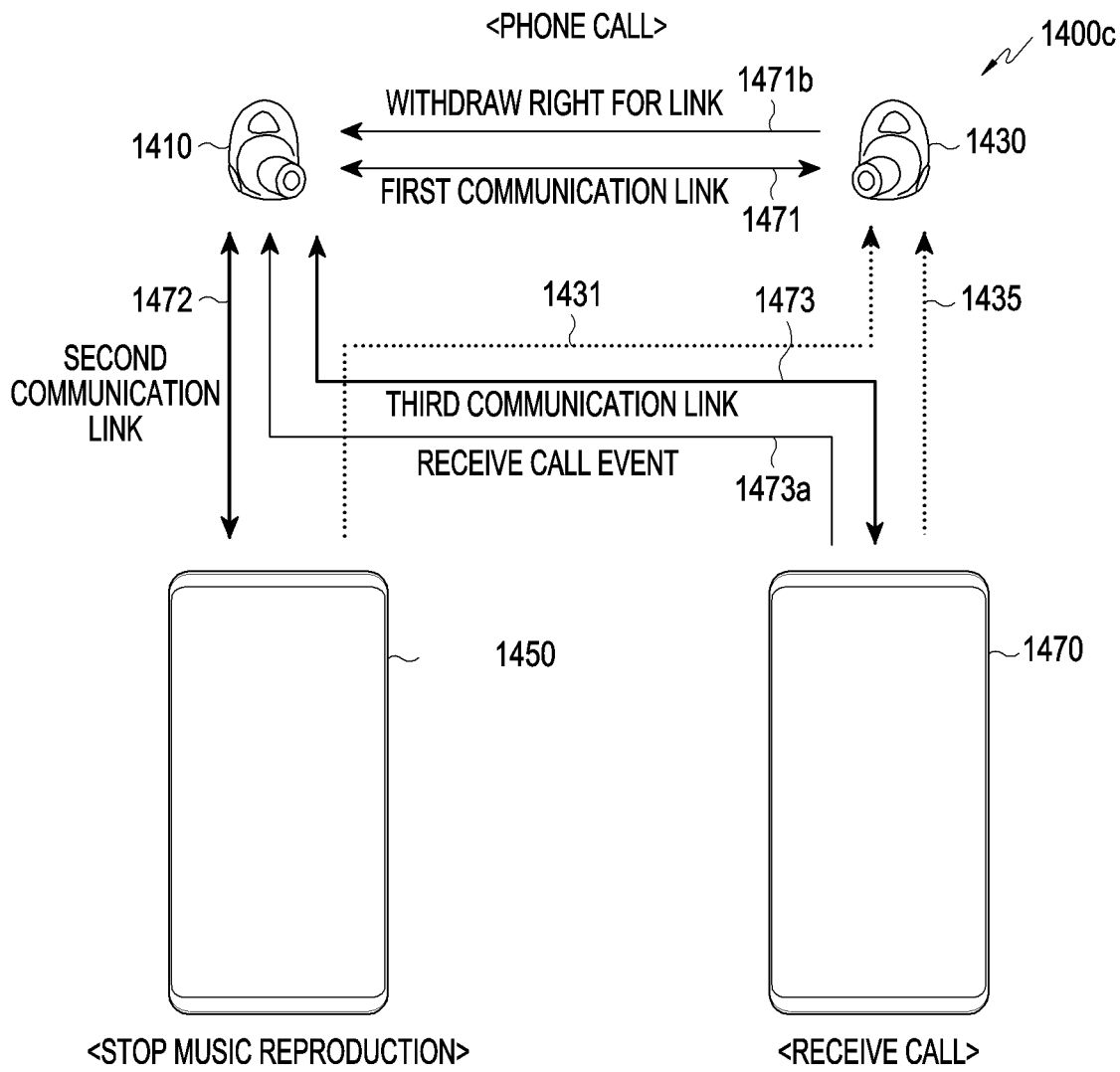
FIG. 14C illustrates a communication link management operation, according to an embodiment.

FIG. 14A is a diagram 1400a illustrating a communication link management operation, according to an embodiment. FIG. 14B is a diagram 1400b illustrating a communication link management operation, according to an embodiment. FIG. 14C is a diagram 1400c illustrating a communication link management operation, according to an embodiment.

A first external audio electronic device 1410 of FIGS. 14A to 14C may be implemented to be substantially the same as or similar to the first external audio electronic device 551a of FIG. 5A, and a second external audio electronic device 1430 may be implemented to be substantially the same as or similar to the second external audio electronic device 553a of FIG. 5A.

Referring to FIG. 14A, the first external audio electronic device 1410 and the second external audio electronic device 1430 may establish a first communication link 1471 therebetween. The first external audio electronic device 1410 may establish a second communication link 1472 with a first electronic device 1450, and the second external audio electronic device 1430 may monitor, for example, the second communication link 1472 on the basis of connection information related to the second communication link received from the first external audio electronic device 1410 as indicated by reference numeral 1431. In order to maintain and manage a third communication link established between the first external audio electronic device 1410 and a second electronic device 1470 on the basis of assignment of the right for the communication link received from the first external audio electronic device 1410, the second external audio electronic device 1430 may transmit and receive data to and from a third electronic device 1470 as indicated by reference numeral 1435, and the first external audio electronic device 1410 may monitor the third communication link as indicated by reference numeral 1411.

The first external audio electronic device 1410 may receive and output audio data related to music being reproduced by the first electronic device 1450 through the second communication link 1472, and the second external audio electronic device 1430 may monitor the second communication link 1472, receive music-related audio data from the first electronic device 1450, and output the audio data.

As illustrated in FIG. 14B, the second external audio electronic device 1430 may receive a call event corresponding to the condition for withdrawing the right from the second electronic device 1470 through the third communication link as indicated by reference numeral 1435a while the first external audio electronic device 1410 and the second external audio electronic device 1430 receive music-related audio data from the first electronic device 1450 and output the audio data. The second external audio electronic device 1430 may transmit a call reception notification and/or a message making a request for withdrawing the right for the third communication link to the first external audio electronic device 1410 through the first communication link 1471 as indicated by reference numeral 1471a. The call event may be an event requiring a microphone included in the first external audio electronic device 1410, and the second external audio electronic device 1430 may identify the call event as an event corresponding to the condition for withdrawing the right. The first external audio electronic device 1410 may monitor the third communication link, and the second external audio electronic device 1430 may transmit only a message making a request for withdrawing the right for the third communication link to the first external audio electronic device 1410 through the first communication link 1471.

As illustrated in FIG. 14C, the first external audio electronic device 1410 may withdraw the right for the third communication link 1435 on the basis of the call reception notification and/or the message making the request for withdrawing the third communication link received from the second external audio electronic device 1430 as indicated by reference numeral 1471b, stop outputting music-related audio data received from the first electronic device 1450 through the second communication link 1472, and process the call event received from the second electronic device 1470 through the third communication link 1473 as indicated by reference numeral 1473a. For example, the first external audio electronic device 1410 may receive call-related audio data from the second electronic device 1470 and output the call-related audio data. The second external audio electronic device 1430 may monitor the third communication link 1473 as indicated by reference numeral 1435, receive call-related audio data from the second electronic device 1470, and output the call-related audio data.

When the second external audio electronic device 1430 receives a call event that does not correspond to the condition for withdrawing the right from the second electronic device 1470 through the third communication link, the second external audio electronic device 1430 may maintain the right for the third communication link. For example, when the call event is an event requiring a microphone included in the second external audio electronic device 1430, the second external audio electronic device 1430 may maintain the right for the third communication link. The second external audio electronic device 1430 may stop outputting the music-related audio data received through monitoring of the second communication link 1472 while maintaining the right for the third communication link. For example, through the first communication link 1471, the second external audio electronic device 1430 may make a request for stopping the output of the music-related audio data transmitted to the first external audio electronic device 1430 through the second communication link 1472. The second external audio electronic device 1430 may process the call event received from the second electronic device 1470 through the third communication link. For example, the second external audio electronic device 1430 may receive and output the call-related audio data. The first external audio electronic device 1430 may receive the call-related audio data from the second electronic device 1470 and output the call-related audio data on the basis of monitoring 1411 of the third communication link.

The first external audio electronic device 1410 may give the right for the third communication link to the second external audio electronic device 1430 and may not monitor the third communication link. When receiving a call event corresponding to the condition for withdrawing the right from the second electronic device 1470 through the third communication link, the second external audio electronic device 1430 may transmit a call reception notification and a message making a request for withdrawing the right for the third communication link to the first external audio electronic device 1410 through the first communication link 1471. When receiving a call event that does not correspond to the condition for withdrawing the right from the second electronic device 1470 through the third communication link, the second external audio electronic device 1430 may transmit a message indicating call reception to the first external audio electronic device 1410 through the first communication link 1471 and maintain the right for the third communication link.

Figure 15:
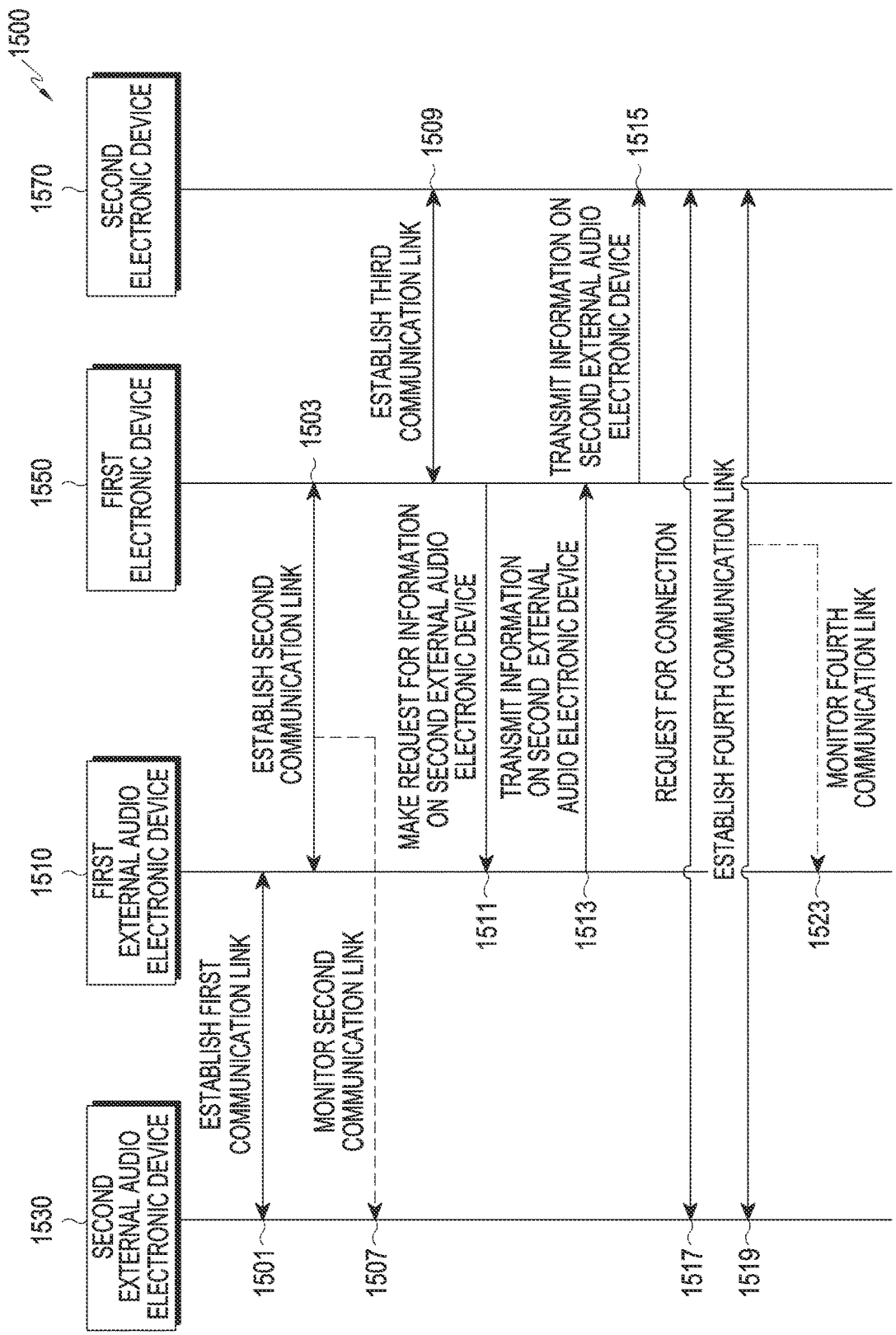
FIG. 15 is a flowchart illustrating a communication link management operation, according to an embodiment.

FIG. 15 is a flowchart 1500 illustrating a communication link management operation, according to an embodiment. Operations for providing the communication link management operation may include steps 1501 to 1523. According to an embodiment, at least one of steps 1501 to 1523 may be omitted, the order of some steps may be changed, or other steps may be added.

Referring to FIG. 15, in step 1501, a first external audio electronic device 1510 and a second external audio electronic device 1530 operating as one pair establish a first communication link therebetween.

In step 1503, the first external audio electronic device 1510 establishes a second communication link with a first electronic device 1550 through a communication circuit 210a.

In step 1507, the second external audio electronic device 1530 monitors a second communication link established between the first external audio electronic device 1510 and the first electronic device 1550.

The second external audio electronic device 1530 may receive connection information related to the second communication link established between the first external audio electronic device 1510 and the first electronic device 1550 from the first external audio electronic device 1510 through the first communication link. The second external audio electronic device 1530 may monitor the second communication link on the basis of the received connection information related to the second communication link.

Communication link-related connection information for monitoring the communication link may include at least one piece of address information of each of the first external audio electronic device 1510 and the first electronic device 1550 (for example, at least one of a Bluetooth address or an LT address), clock information (for example, at least one of a Bluetooth piconet clock or master's CLKN (clock native)), channel information (for example, a used channel map), SDP result information, supported feature information, manufacture data, or key information (for example, a link key).

Data may be received from the first electronic device 1550 on the basis of monitoring of the second communication link.

In step 1509, the first external audio electronic device 1550 establishes a third communication link with a second electronic device 1570 through a communication circuit 310.

In step 1511, the first electronic device 1550 makes a request for information on the second external audio electronic device 1530 to the first external audio electronic device 1510 through the second communication link. The first electronic device 1550 may know the existence of the second external audio electronic device 1530 by receiving information on the second external audio electronic device 1530 establishing the communication link with the first external audio electronic device 1510 from the first external audio electronic device 1510 during a connection process for establishing the second communication link with the first external audio electronic device 1510. When the first electronic device 1550 receives information on the second external audio electronic device 1530 establishing the first communication link with the first external audio electronic device 1510 from the first external audio electronic device 1510 and stores the information in advance during a connection process for establishing the second communication link with the first external audio electronic device 1510, step 1511 may be omitted.

In step 1513, the first external audio electronic device 1510 transmits information (for example, address information) on the second external audio electronic device 1530 establishing the first communication link to the first electronic device 1550 according to a request from the first electronic device 1550.

In step 1515, the first electronic device 1550 receives information on the second external audio electronic device 1530 from the first external audio electronic device 1510 and transmits the information on the second external audio electronic device 1530 and/or a message making a request for establishing the communication link with the second external audio electronic device 1530 to the second electronic device 1570 through the third communication link.

In step 1517, the second electronic device 1570 makes a request for the connection to establish the communication link to the second external audio electronic device 1530 on the basis of the information (for example, address information) on the second external audio electronic device 1530.

In step 1519, the second electronic device 1570 and the second external audio electronic device 1530 are connected after performing a connection process for establishing the communication link (for example, a paging operation and a pairing operation) and establish a fourth communication link. For example, the second electronic device 1570 may establish the fourth communication link with the second external audio electronic device 1530 after the pairing operation and the connection operation via an inquiry operation and a page operation with the second external audio electronic device 1530 using a BT legacy protocol on the basis of the information (for example, address information) on the second external audio electronic device 1530. For example, the second electronic device 1570 may establish the fourth communication link with the second external audio electronic device 1530 after an advertising operation, a scan operation, and a connection operation using a BLE protocol with the second external audio electronic device 1530 on the basis of the information on the second external audio electronic device 1530.

In step 1523, the first external audio electronic device 1510 monitors the fourth communication link established between the second external audio electronic device 1530 and the second electronic device 1570.

The first external audio electronic device 1510 may receive connection information related to the fourth communication link established between the second external audio electronic device 1530 and the second electronic device 1570 from the second external audio electronic device 1530 through the first communication link and monitor the fourth communication link on the basis of the received connection information related to the fourth communication link.

The first external audio electronic device 1510 may receive data from the second electronic device 1570 on the basis of monitoring of the fourth communication link.

Figure 16:
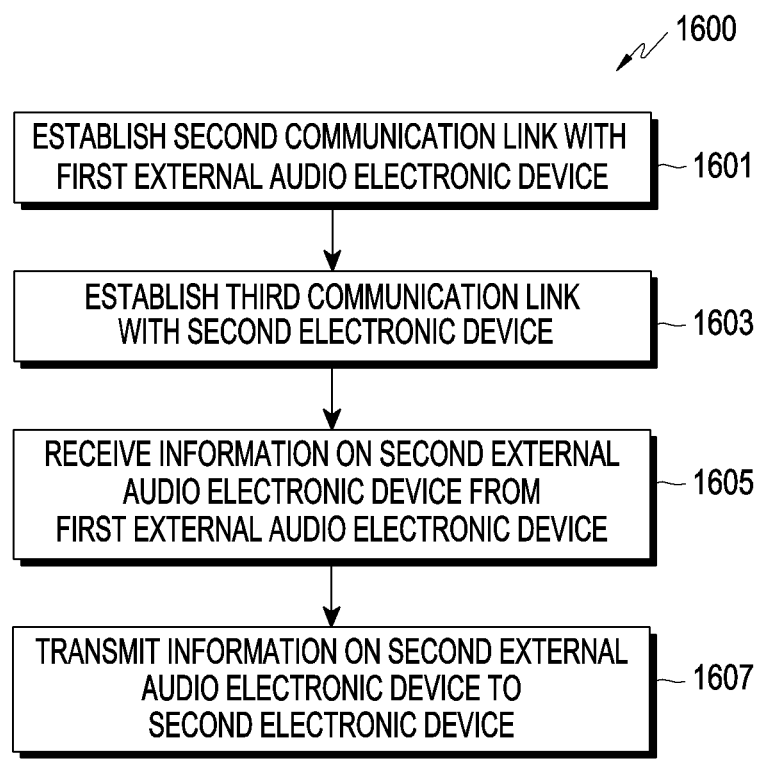
FIG. 16 is a flowchart illustrating a communication link management operation of a first electronic device, according to an embodiment.

Although FIG. 15 illustrates that the first external audio electronic device 1510 establishes the communication link with the first electronic device 1550 in the state in which the first external audio electronic device 1510 and the second external audio electronic device 1530 first establish the communication link therebetween, the first external audio electronic device 1510 may first establish the communication link with the first electronic device 1550 and then first external audio electronic device 1510 and the second external audio electronic device 1530 may establish the communication link therebetween. FIG. 16 is a flowchart 1600 illustrating a communication link management of a first electronic device, according to an embodiment. Operations for providing the communication link management operation may include steps 1601 to 1607. The communication link management operation may be performed by an electronic device or at least one processor of the electronic device. At least one of steps 1601 to 1607 may be omitted, the order of some steps may be changed, or other steps may be added.

In step 1601, the first electronic device establishes a second communication link with a first external audio electronic device configured as a main external audio electronic device among a pair of external audio electronic devices operating one pair through a communication circuit 310. When the first electronic device establishes the second communication link with the first external audio electronic device, the first electronic device may maintain the second communication link while transmitting and receiving a connection identification message (for example, a poll packet message) and a connection identification response message (for example, a null packet message) to and from the first external audio electronic device through the second communication link.

In step 1603, the first electronic device establishes a third communication link with a second electronic device 1570 through a communication circuit 310.

In step 1605, the first electronic device makes a request for information (for example, address information) on a second external audio electronic device 1570 to the first external audio electronic device and receives the same.

In step 1607, the first electronic device transmits information on the second external audio electronic device received from the first external audio electronic device and/or a message making a request for establishing the communication link with the second external audio electronic device to the second electronic device.

Figure 17:
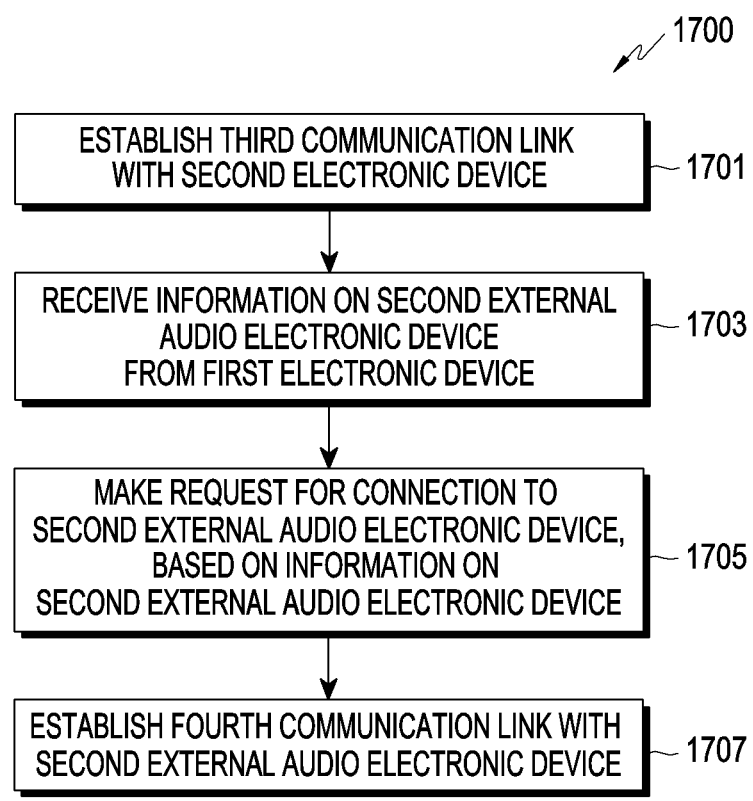
FIG. 17 is a flowchart illustrating a communication link management operation of a second electronic device, according to an embodiment.

FIG. 17 is a flowchart 1700 illustrating communication link management of a second electronic device, according to an embodiment. Operations for providing the communication link management operation may include steps 1701 to 1707. The communication link management operation may be performed by an electronic device or at least one processor of the electronic device. At least one of steps 1701 to 1707 may be omitted, the order of some steps may be changed, or other steps may be added.

In step 1701, the second electronic device establishes a third communication link with a first electronic device 1550 through a communication circuit 310.

In step 1703, the second electronic device receives information (for example, address information) on a second external audio electronic device 1530 and/or a message making a request for establishing the communication link with the second external audio electronic device from the first electronic device.

In step 1705, the second electronic device makes a request for the connection to establish the communication link to the second external audio electronic device on the basis of the information on the second external audio electronic device received from the first electronic device.

In step 1707, the second electronic device may be connected to a second external audio electronic device 1530 after performing a connection process for establishing the communication link (for example, a paging operation and a pairing operation) and may establish a fourth communication link.

Figure 18:
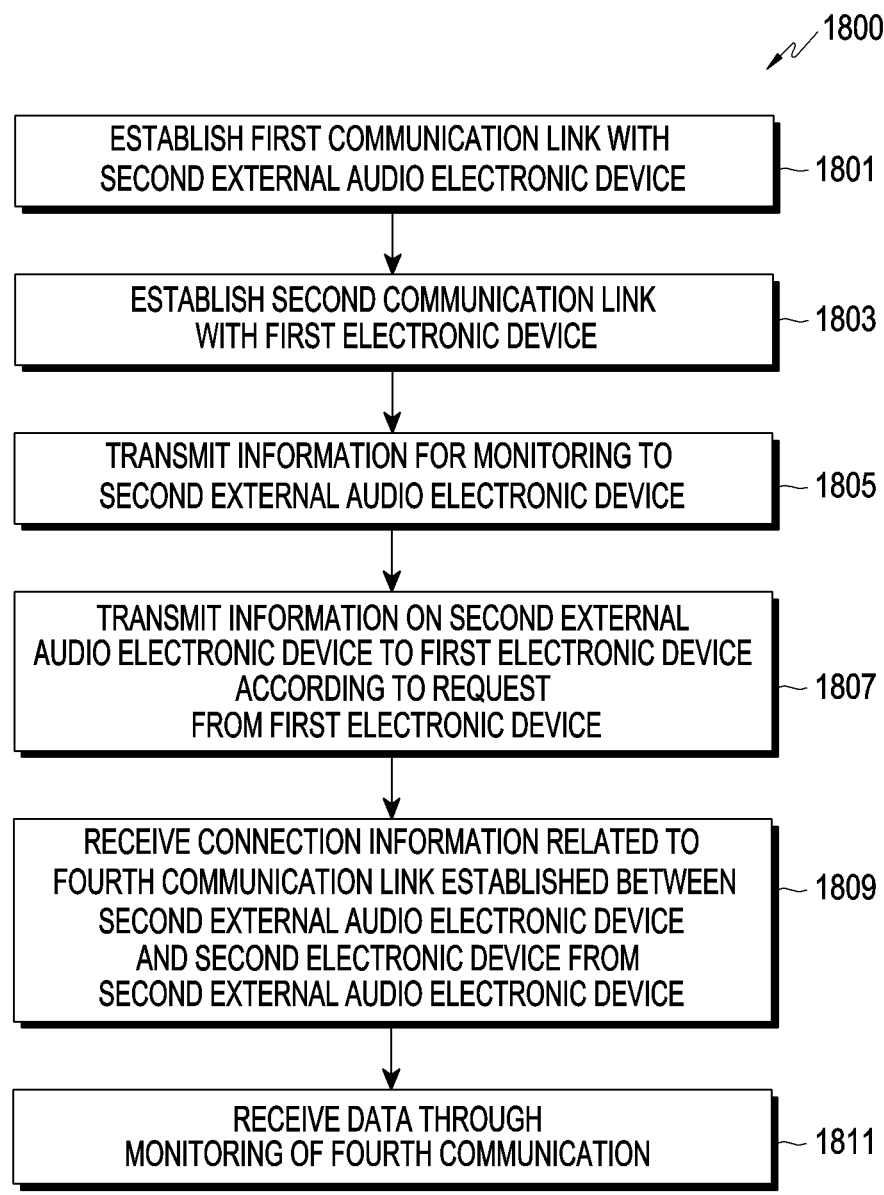
FIG. 18 is a flowchart illustrating a communication link management operation of a first external audio electronic device, according to an embodiment.

FIG. 18 is a flowchart 1800 illustrating a communication link management operation by a first external audio electronic device, according to an embodiment. Operations for providing the communication link management operation may include steps 1801 to 1811. The communication link management operation may be performed by a first external audio electronic device or a processor 280*a* of the first external audio electronic device. At least one of steps 1801 to 1811 may be omitted, the order of some steps may be changed, or other steps may be added.

In step 1801, the first external audio electronic device establishes a first communication link with a second external audio electronic device 1530 through a communication circuit 210*a*. In an operation for establishing the first communication link, the first external audio electronic device may be configured as a main external audio electronic device, and the second external audio electronic device may be configured as a sub external audio electronic device. The first external audio electronic device may maintain and manage the first communication link while transmitting and receiving data to and from the second external audio electronic device.

In step 1803, the first external audio electronic device establishes a second communication link with a first electronic device 1550 through the communication circuit 210*a*. The first external audio electronic device may maintain and manage the second communication link while transmitting and receiving data to and from the first electronic device.

In step 1805, the first external audio electronic device transmits information for monitoring the second communication link to the second external audio electronic device 1530.

The first external audio electronic device may transmit connection information related to the second communication link established with the first electronic device to the second external audio electronic device 1530 through the first communication link and allow the second external audio electronic device to monitor the second communication link. Communication link-related connection information for monitoring the communication link may include at least one piece of address information of each of the first external audio electronic device and the electronic device (for example, at least one of a Bluetooth address or an LT address), clock information (for example, at least one of a Bluetooth piconet clock or master's CLKN (clock native)), channel information (for example, a used channel map), SDP result information, supported feature information, manufacture data, or key information (for example, a link key).

In step 1807, the first external audio electronic device transmits information on the second external audio electronic device to the first electronic device through the second communication link.

The second external audio electronic device may transmit the information on the second external audio electronic device to the first electronic device according to a request from the first electronic device or without any request from the first electronic device.

In step 1809, the first external audio electronic device receives connection information related to a fourth communication link established between the second external audio electronic device and a second electronic device 1570 from the second external audio electronic device through the first communication link. The first external audio electronic device may monitor the forth communication link on the basis of the received connection information related to the fourth communication link.

In step 1811, the first external audio electronic device receives data from the second electronic device on the basis of monitoring of the fourth communication link.

Figure 19:
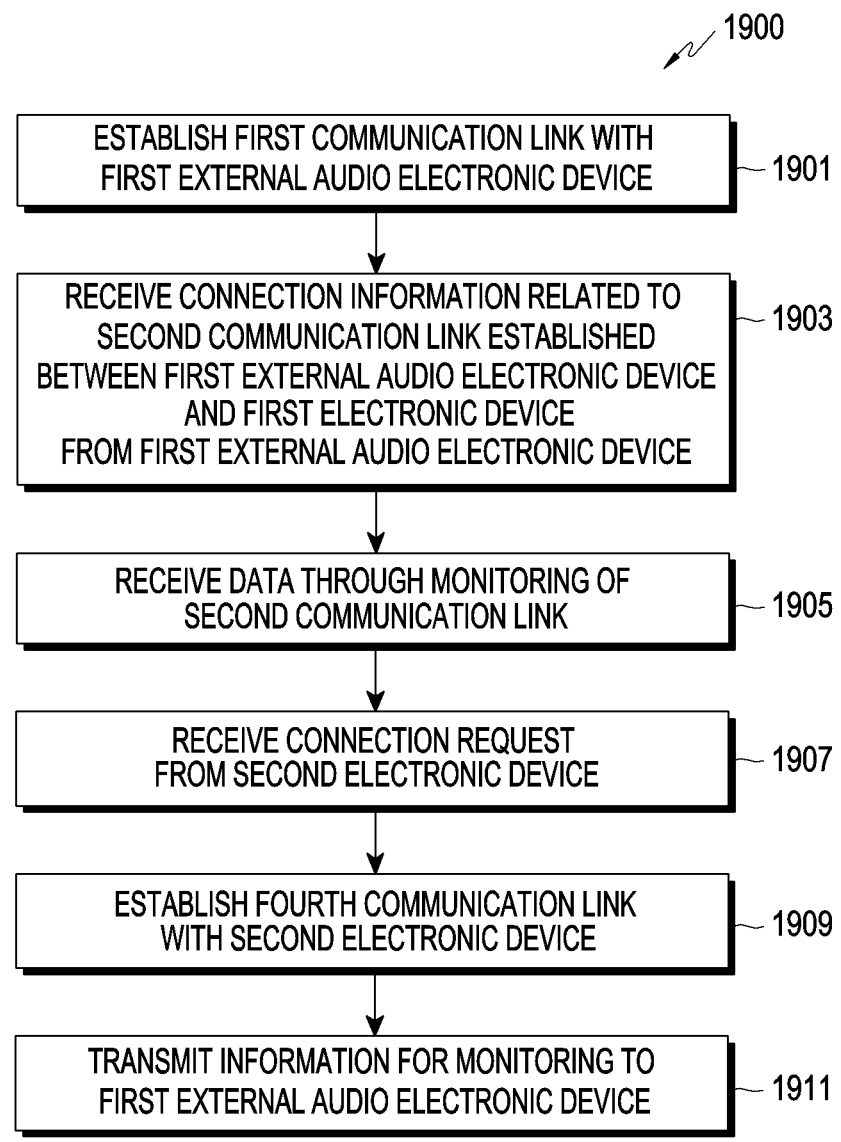
FIG. 19 is a flowchart illustrating a communication link management operation of a second external audio electronic device, according to an embodiment.

FIG. 19 is a flowchart 1900 illustrating a communication link management operation of a second external audio electronic device, according to an embodiment. Operations for providing the communication link management operation may include steps 1901 to 1911. The communication link management operation may be performed by a second external audio electronic device. At least one of steps 1901 to 1911 may be omitted, the order of some steps may be changed, or other steps may be added.

In step 1901, the second external audio electronic device establishes a first communication link with a first external audio electronic device 1510 through the communication circuit. In an operation for establishing the first communication link, the first external audio electronic device may be configured as a main external audio electronic device, and the second external audio electronic device may be configured as a sub external audio electronic device.

In step 1903, the second external audio electronic device receives connection information related to the second communication link established between the first external audio electronic device and a first electronic device 1550 from the first external audio electronic device 1510 through the first communication link. The second external audio electronic device may monitor the second communication link established between the first external audio electronic device and the first electronic device 1550 on the basis of the received connection information related to the second communication link.

In step 1905, the second external audio electronic device receives data from the first electronic device on the basis of monitoring of the second communication link.

In step 1907, the second external audio electronic device receives a connection request for establishing a fourth communication link from a second electronic device 1570.

In step 1909, the second external audio electronic device is connected to the second electronic device 1570 after performing a connection process for establishing the communication link (for example, a paging operation and a pairing operation) and establishes the fourth communication link.

In step 1911, the second external audio electronic device transmits information for monitoring the fourth communication link to the first external audio electronic device.

The second external audio electronic device may transmit connection information related to the fourth communication link to the first external audio electronic device through the first communication link in order to allow the first external audio electronic device to monitor the fourth communication link.

Figure 20:
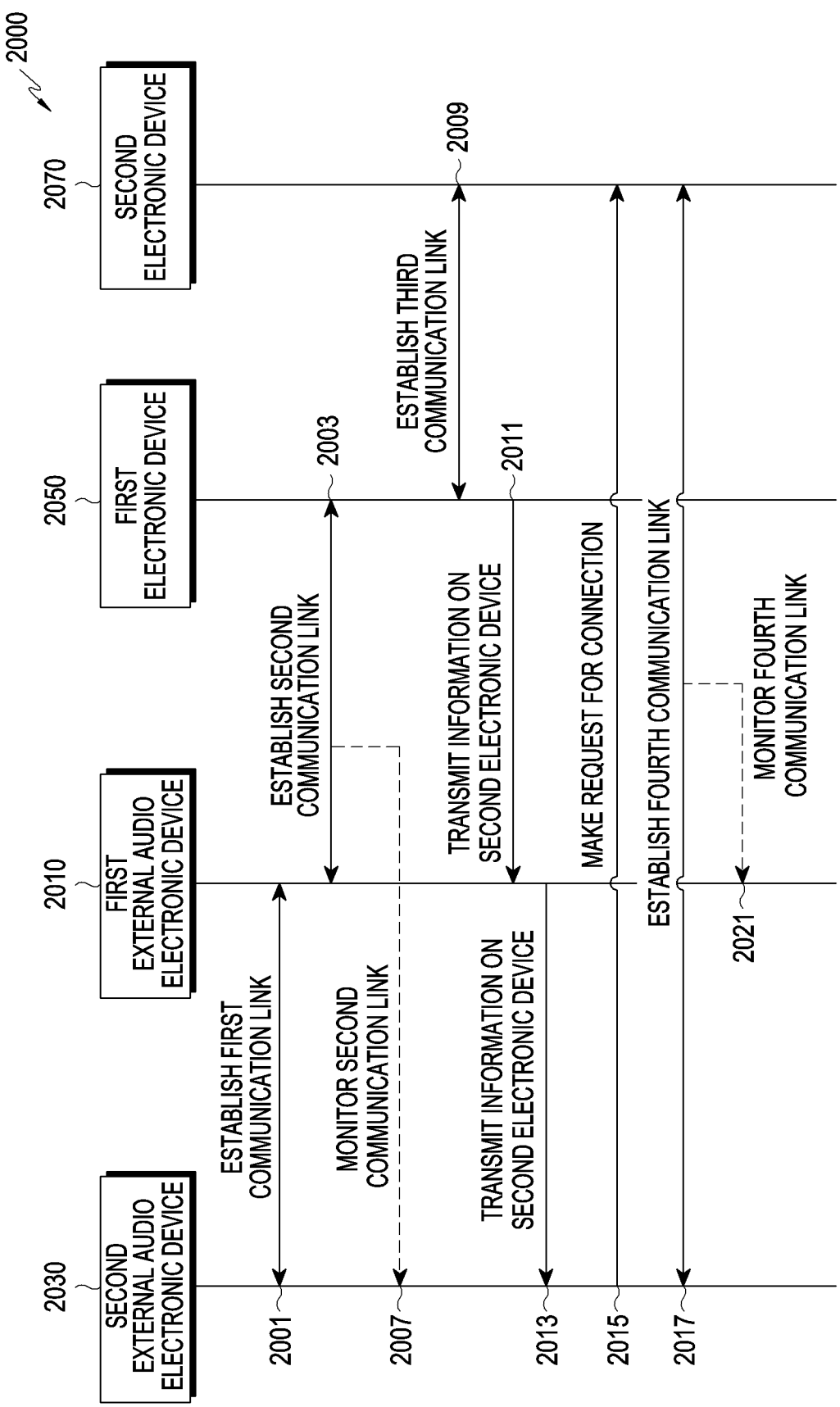
FIG. 20 is a flowchart illustrating a communication link management operation, according to an embodiment.

FIG. 20 is a flowchart 2000 illustrating a communication link management operation, according to an embodiment. Operations for providing the communication link management operation may include steps 2001 to 2021. At least one of steps 2001 to 2021 may be omitted, the order of some steps may be changed, or other steps may be added.

Referring to FIG. 20, in step 2001, a first external audio electronic device 2010 and a second external audio electronic device 2030 operating as one pair establish a first communication link therebetween.

In step 2003, the first external audio electronic device 2010 establishes a second communication link with a first electronic device 2050 through a communication circuit 210a.

In step 2007, the second external audio electronic device 2030 monitors a second communication link established between the first external audio electronic device 2010 and the first electronic device 2050.

The second external audio electronic device 2030 may receive connection information related to the second communication link established between the first external audio electronic device 2010 and the first electronic device 2050 from the first external audio electronic device 2010 through the first communication link and monitor the second communication link on the basis of the received connection information related to the second communication link.

Communication link-related connection information for monitoring the communication link may include at least one piece of address information of each of the first external audio electronic device 2010 and the first electronic device 2050 (for example, at least one of a Bluetooth address or an LT address), clock information (for example, at least one of a Bluetooth piconet clock or master's CLKN (clock native)), channel information (for example, a used channel map), SDP result information, supported feature information, manufacture data, or key information (for example, a link key).

The second external audio electronic device 2030 receives data from the first electronic device 2050 on the basis of monitoring of the second communication link.

In step 2009, the first electronic device 2050 establishes a third communication link with a second electronic device 2070 through a communication circuit 310.

In step 2011, when the first electronic device 2050 establishes a third communication link with a second electronic device 2070, the first electronic device 2050 transmits information (for example, address information) on the second electronic device 2070 establishing the third communication link to the first external audio electronic device 1510 through the second communication link.

When receiving the information of the second electronic device 2070 from the first electronic device 2050, the first external audio electronic device 2010 may transmit the information on the second electronic device 2070 and/or a message making a request for establishing the communication link with the second electronic device 2070 to the second external audio electronic device 2030 through the first communication link.

In step 2015, the second external audio electronic device 2030 makes a request for the connection to establish the communication link to the second electronic device 2070 on the basis of the information on the second electronic device 2070.

In step 2017, the second external audio electronic device 2030 and the second electronic device 2070 are connected after performing a connection process for establishing the communication link (for example, a paging operation and a pairing operation) and establish a fourth communication link.

For example, the second external audio electronic device 2030 may establish the fourth communication link with the second electronic device 2070 after the pairing operation and the connection operation via an inquiry operation and a page operation with the second electronic device 2070 using a BT legacy protocol on the basis of the information (for example, address information) on the second electronic device 2070. Additionally or alternatively, the second external audio electronic device 2030 may establish the fourth communication link with the second electronic device 2070 after an advertising operation, a scan operation, and a connection operation using a BLE protocol with the second electronic device 2070 on the basis of the information (for example, address information) on the second electronic device 2070.

In step 2021, the first external audio electronic device 2010 monitors the fourth communication link established between the second external audio electronic device 2030 and the second electronic device 2070.

The first external audio electronic device 2030 may receive connection information related to the fourth communication link received from the second external audio electronic device 2030 through the first communication link, monitor the fourth communication link on the basis of the received connection information related to the fourth communication link, and receive data from the second electronic device 2070.

Figure 21:
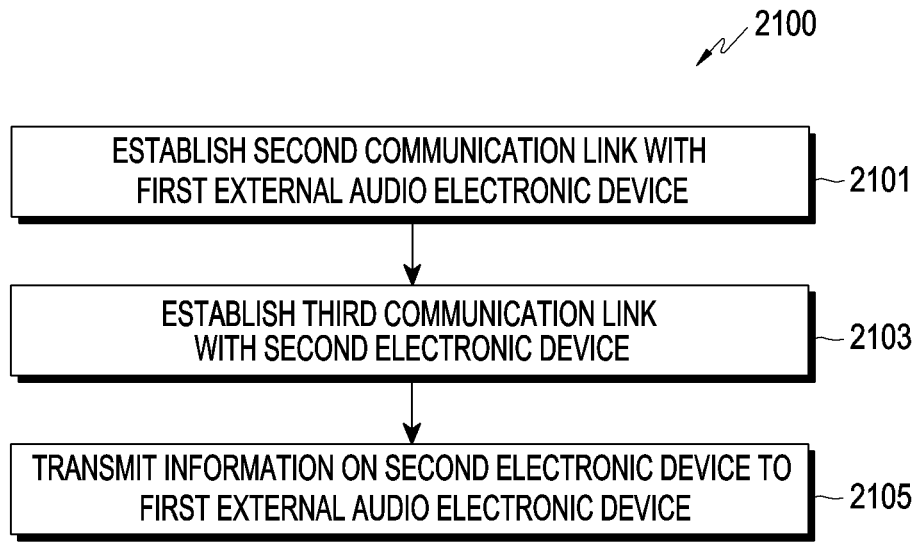
FIG. 21 is a flowchart illustrating a communication link management operation of a first electronic device, according to an embodiment.

FIG. 21 is a flowchart 2100 illustrating communication link management of a first electronic device, according to an embodiment. Operations for providing the communication link management operation may include steps 2101 to 2105. The communication link management operation may be performed by an electronic device or at least one processor of the electronic device. At least one of steps 2101 to 2103 may be omitted, the order of some steps may be changed, or other steps may be added.

In step 2101, a first electronic device establishes a second communication link with a first external audio electronic device configured as a main external audio electronic device among a pair of external audio electronic devices operating as one pair through a communication circuit 310. When the first electronic device establishes the second communication link with the first external audio electronic device, the first electronic device may maintain the second communication link while transmitting and receiving a connection identification message (for example, a poll packet message) and a connection identification response message (for example, a null packet message) to and from the first external audio electronic device through the second communication link.

In step 2103, the first electronic device establishes a third communication link with a second electronic device 2070 through a communication circuit 310.

In step 2105, the first electronic device transmits information (for example, address information) on the second electronic device establishing the third communication link to the first external audio electronic device through the second communication link.

Figure 22:
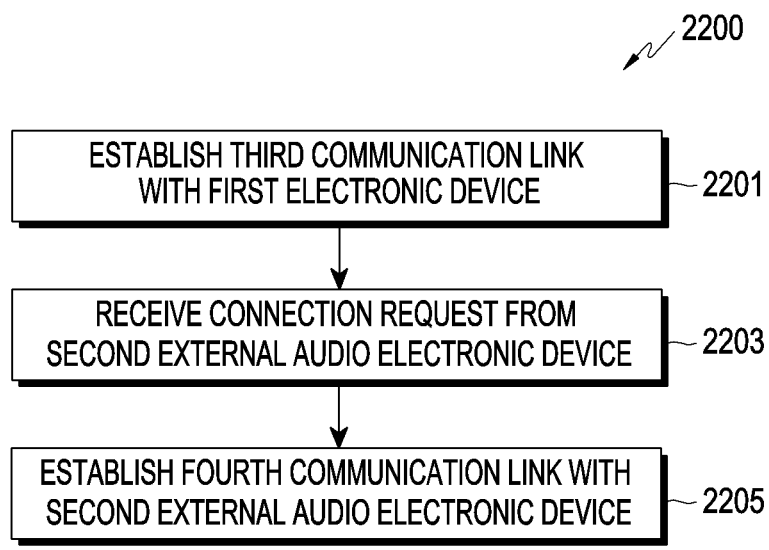
FIG. 22 is a flowchart illustrating a communication link management operation of a second electronic device, according to an embodiment.

FIG. 22 is a flowchart 2200 illustrating a communication link management operation of a second electronic device, according to an embodiment. Operations for providing the communication link management operation may include steps 2201 to 2205. The communication link management operation may be performed by an electronic device or at least one processor of the electronic device. According to an embodiment, at least one of steps 2201 to 2205 may be omitted, the order of some steps may be changed, or other steps may be added.

In step 2201, the second electronic device establishes a third communication link with a first electronic device 2050 through a communication circuit 310.

In steps 2203, the second electronic device receives a connection request for establishing the communication link from a second external audio electronic device.

In step 2205, the second electronic device is connected after performing a connection process for establishing the communication link (for example, a paging operation and a pairing operation) with the second external audio electronic device and may establish a fourth communication link.

Figure 23:
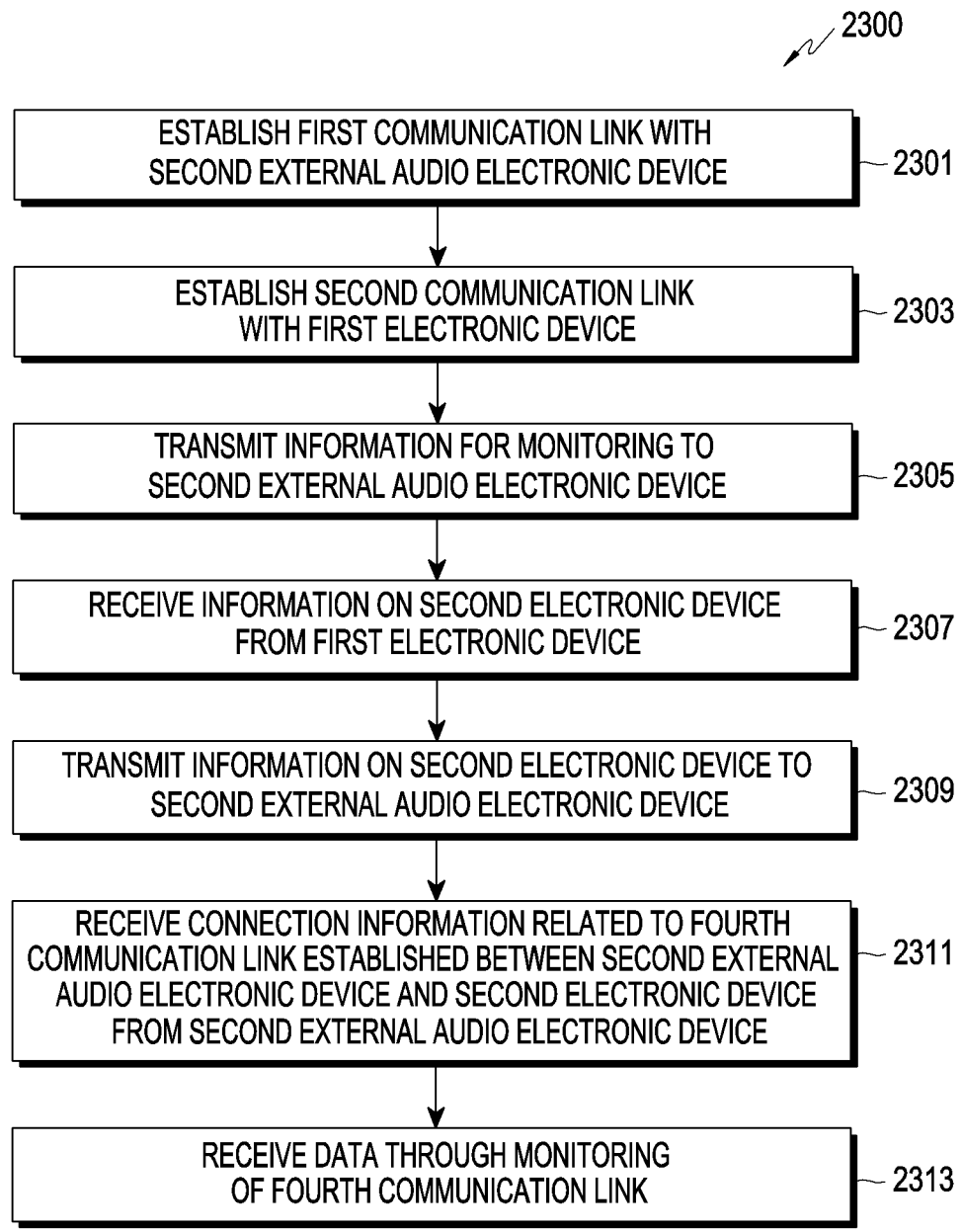
FIG. 23 is a flowchart illustrating a communication link management operation of a first external audio electronic device, according to an embodiment.

FIG. 23 is a flowchart 2300 illustrating a communication link management operation of a first external audio electronic device, according to an embodiment. Operations for providing the communication link management operation may include steps 2301 to 2313. The communication link management operation may be performed by a first external audio electronic device or a processor 280*a* of the first external audio electronic device. At least one of steps 2301 to 2313 may be omitted, the order of some steps may be changed, or other steps may be added.

In step 2301, the first external audio electronic device establishes a first communication link with a second external audio electronic device through a communication circuit 210*a*. In an operation for establishing the first communication link, the first external audio electronic device may be configured as a main external audio electronic device, and the second external audio electronic device may be configured as a sub external audio electronic device. The first external audio electronic device may maintain and manage the first communication link while transmitting and receiving data to and from the second external audio electronic device.

In step 2303, the first external audio electronic device establishes a second communication link with a first electronic device 2050 through the communication circuit 210*a*. The first external audio electronic device may maintain and manage the second communication link while transmitting and receiving data to and from the first electronic device.

In step 2305, the first external audio electronic device transmits information for monitoring the second communication link to the second external audio electronic device 2030.

The first external audio electronic device may transmit connection information related to the second communication link established with the first electronic device to the second external audio electronic device 2030 through the first communication link and allow the second external audio electronic device to monitor the second communication link.

Communication link-related connection information for monitoring the communication link may include at least one piece of address information of each of the first external audio electronic device and the first electronic device (for example, at least one of a Bluetooth address or an LT address), clock information (for example, at least one of a Bluetooth piconet clock or master's CLKN (clock native)), channel information (for example, a used channel map), SDP result information, supported feature information, manufacture data, or key information (for example, a link key).

In step 2307, the first external audio electronic device receives information (for example, address information) on the second electronic device establishing a third communication link with the first electronic device from the first electronic device through the second communication link.

In step 2309, the first external audio electronic device receives information on the second electronic device 2070 from the first electronic device and transmits the information on the second electronic device and/or a message making a request for establishing the communication link with the second electronic device to the second external audio electronic device through the first communication link.

In step 2311, the first external audio electronic device receives connection information related to a fourth communication link established between the second external audio electronic device and the second electronic device from the second external audio electronic device through the first communication link. The first external audio electronic device may monitor the fourth communication link established between the second external audio electronic device and the second electronic device on the basis of the received connection information related to the fourth communication link.

In step 2313, the first external audio electronic device receives data from the second electronic device on the basis of monitoring of the fourth communication link.

Figure 24:
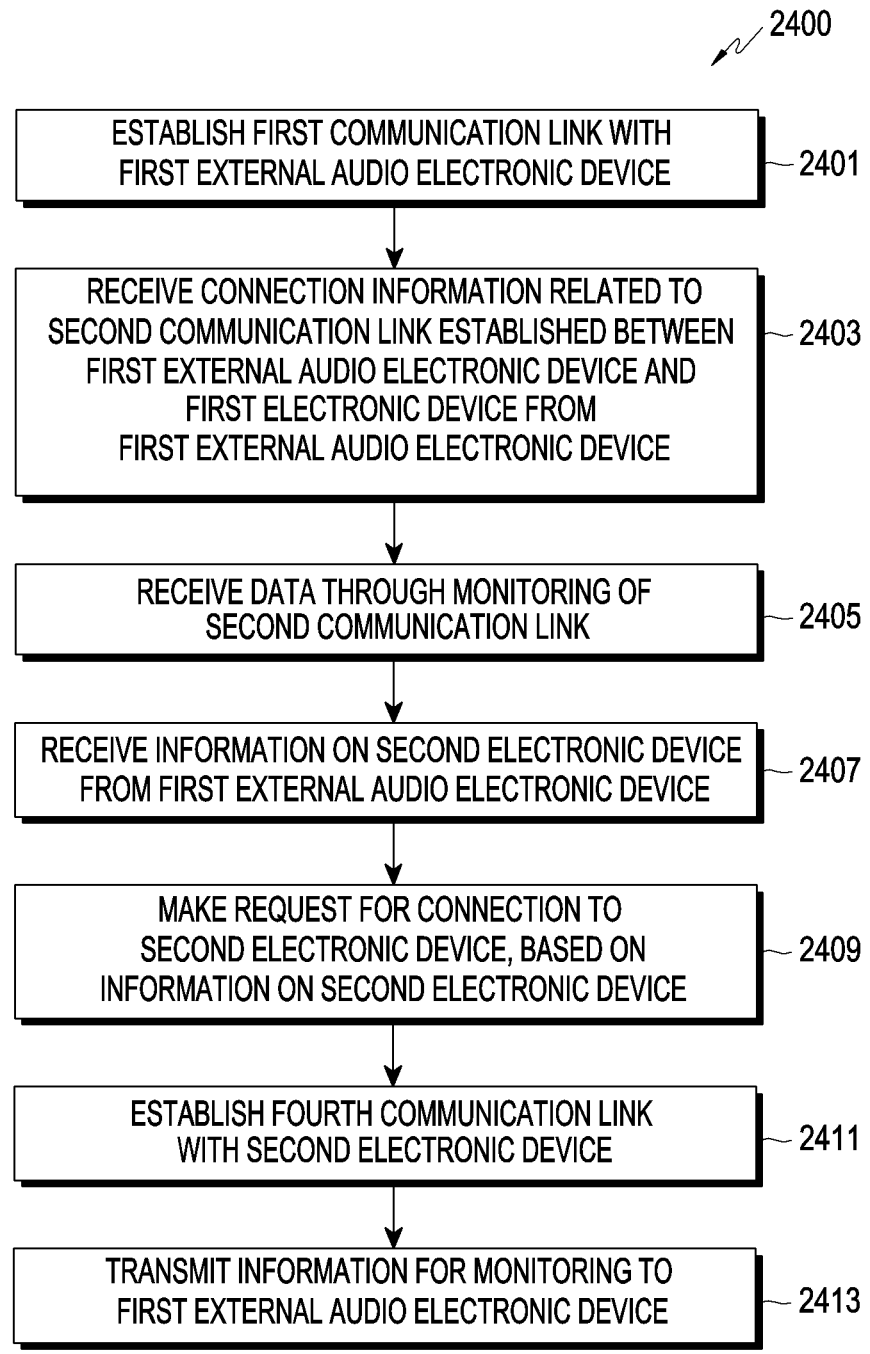
FIG. 24 is a flowchart illustrating a communication link management operation of a second external audio electronic device, according to an embodiment.

FIG. 24 is a flowchart 2400 illustrating a communication link management operation of a second external audio electronic device, according to an embodiment. Operations for providing the communication link management operation may include steps 2401 to 2413. The communication link management operation may be performed by a second external audio electronic device. At least one of steps 2401 to 2413 may be omitted, the order of some steps may be changed, or other steps may be added.

In step 2401, the second external audio electronic device establishes a first communication link with a first external audio electronic device 2010 through a communication circuit 210*b*. In an operation for establishing the first communication link, the first external audio electronic device may be configured as a main external audio electronic device, and the second external audio electronic device may be configured as a sub external audio electronic device. The first external audio electronic device may maintain and manage the first communication link while transmitting and receiving data to and from the second external audio electronic device.

In step 2403, the second external audio electronic device receives connection information related to a second communication link established between the first external audio electronic device and a first electronic device 2050 from the first external audio electronic device through the first communication link. The second external audio electronic device may monitor the second communication link established between the first external audio electronic device and the first electronic device on the basis of the received connection information related to the second communication link.

In step 2405, the second external audio electronic device receives data from the first electronic device on the basis of monitoring of the second communication link.

In step 2407, the second external audio electronic device receives information (for example, address information) on a second electronic device 1570 and/or a message making a request for establishing the communication link with the second electronic device through the first communication link.

In step 2409, the second external audio electronic device makes a request for the communication link to the second electronic device on the basis of the information on the second electronic device received from the first external audio electronic device.

In step 2411, the second external audio electronic device is connected after performing a connection process for establishing the communication link with the second electronic device (for example, a paging operation and a pairing operation) and establishes a fourth communication link.

In step 2413, the second external audio electronic device transmits information for monitoring the fourth communication link to the first external audio electronic device through the first communication link. The second external audio electronic device may transmit connection information related to the fourth communication link to the first external audio electronic device to allow the first external audio electronic device to monitor the fourth communication link.

Figure 25A:
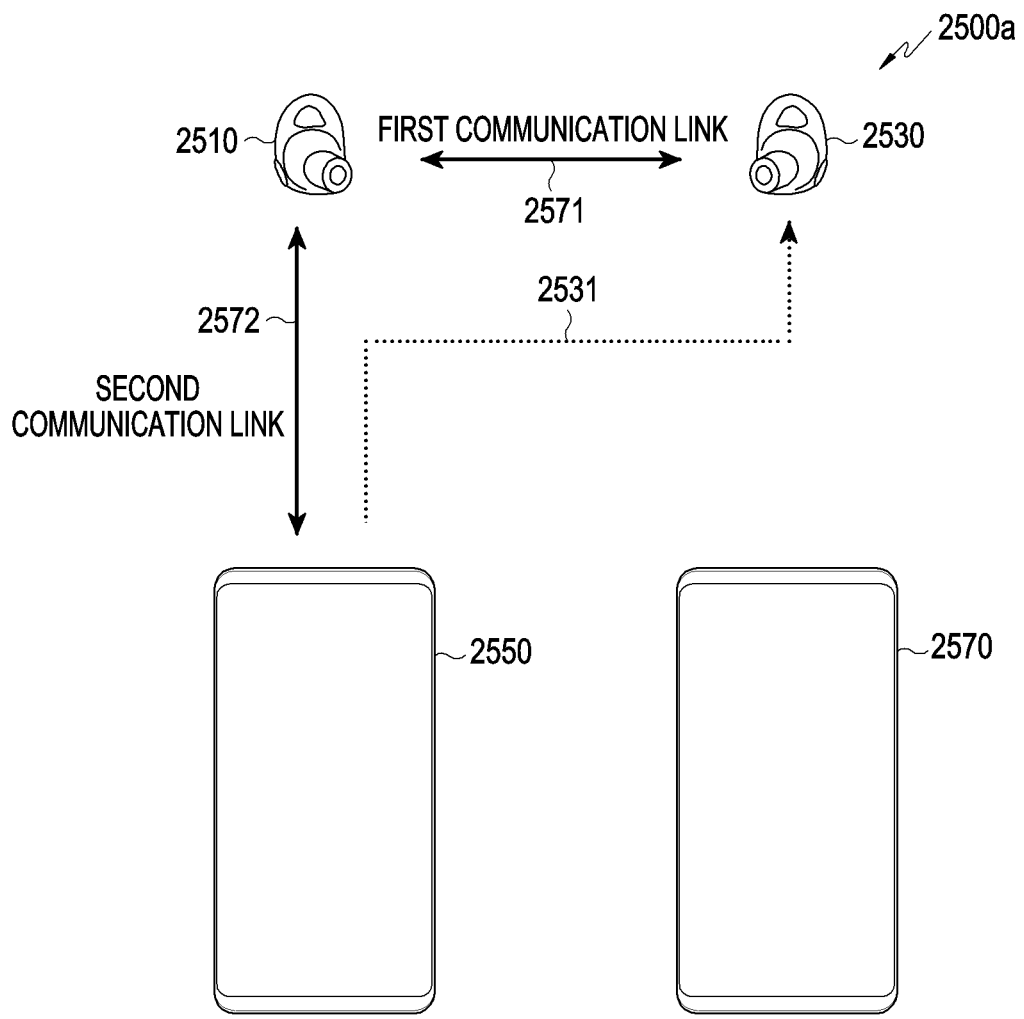
FIG. 25A illustrates a communication link management operation, according to an embodiment.
Figure 25B:
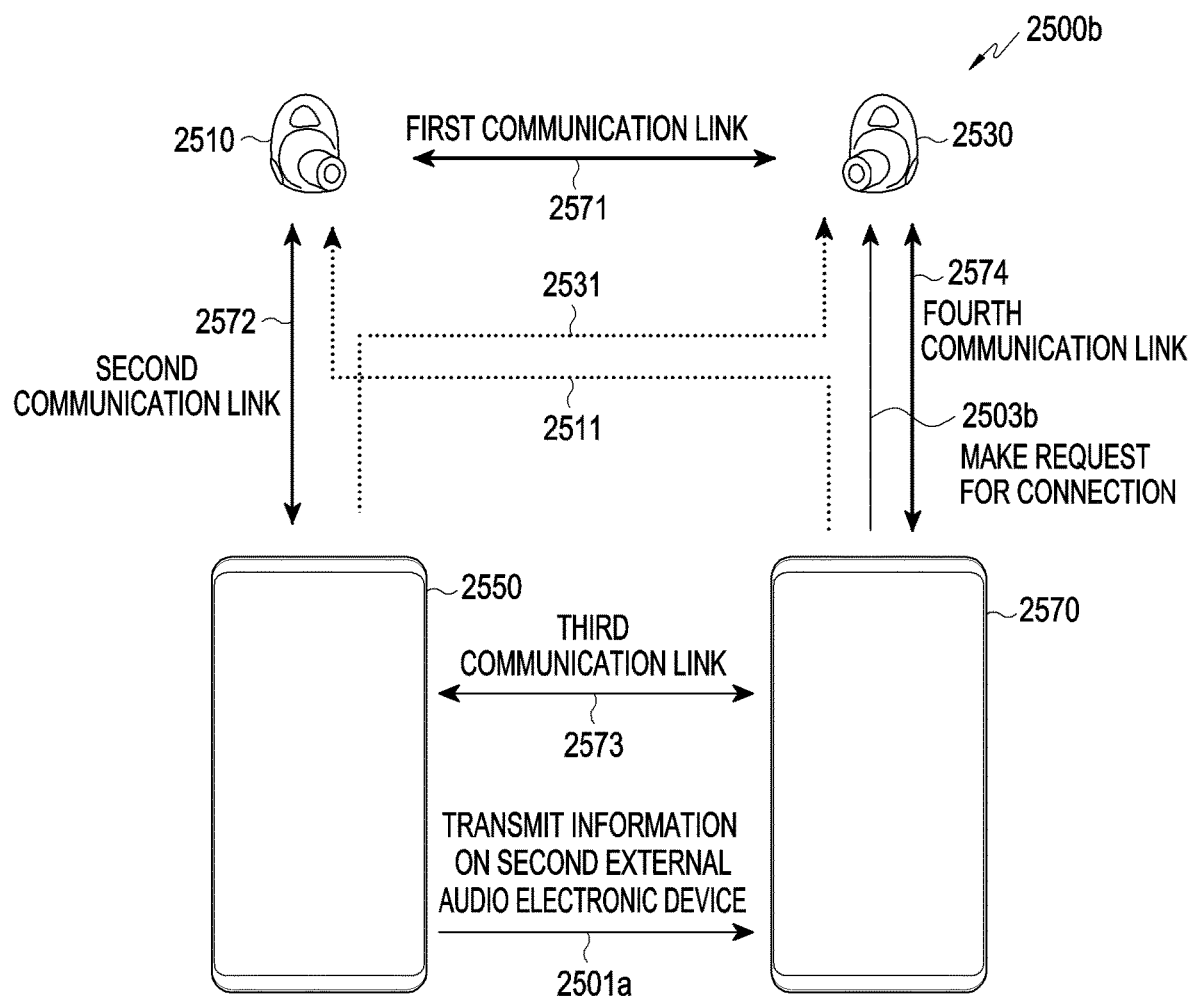
FIG. 25B illustrates a communication link management operation, according to an embodiment.
Figure 25C:
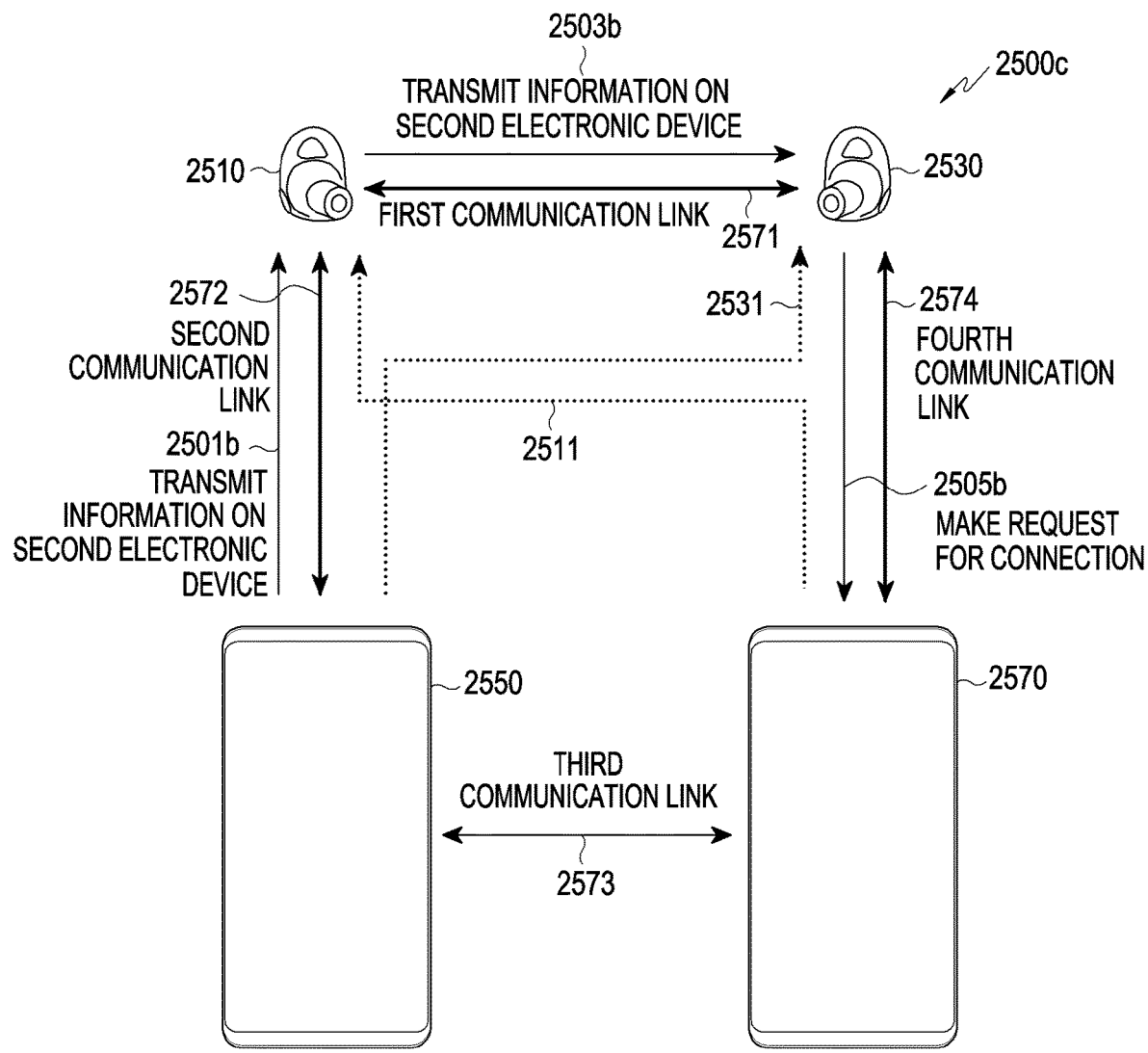
FIG. 25C illustrates a communication link management operation, according to an embodiment.

FIG. 25A is a diagram 2500a illustrating a communication link management operation, according to an embodiment. FIG. 25B is a diagram 1400b illustrating a communication link management operation, according to an embodiment. FIG. 25C is a diagram 1400c illustrating a communication link management operation, according to an embodiment.

A first external audio electronic device 2510 of FIGS. 25A to 25C may be implemented to be substantially the same as or similar to the first external audio electronic device 551b of FIG. 5B, and a second external audio electronic device 2530 may be implemented to be substantially the same as or similar to the second external audio electronic device 553b of FIG. 5B.

Referring to FIG. 25A, the first external audio electronic device 2510 configured as a main external audio electronic device may establish a first communication link 2571 with a second external audio electronic device 2530 configured as a sub external audio electronic device, and the first external audio electronic device 2510 which is the entity of the right for the first communication link 2571 may maintain and manage the first communication link while transmitting and receiving data to and from the second external audio electronic device 2530 through the first communication link 2571. The first external audio electronic device 2510 may establish a second communication link 2572 with a first electronic device 2550 and transmit connection information related to the second communication link established with the first electronic device 2550 to the second external audio electronic device 2530 through the first communication link 2571. The second external audio electronic device 2530 may monitor the second communication link 2572 as indicated by reference numeral 2531. The second external audio electronic device 2530 may monitor the second communication link 2572 on the basis of the connection information related to the second communication link received from the first external audio electronic device 2510 as indicated by reference numeral 2531.

The first electronic device 2550 may establish a third communication link 2573 with the second electronic device 2570. For example, the first external audio electronic device 2510 and the second external audio electronic device 2530 establish the first communication link, and the first electronic device 2550 may establish a third communication link 2573 with the second electronic device 2570 while the first external audio electronic device 2510 establishes the second communication link 2572 with the first electronic device 2550. Additionally or alternatively, the first electronic device 2550 may first establish the third communication link 2573 with the second electronic device 2570 and then establish the second communication link 2572 with the first external audio electronic device 2510. The first electronic device 2550 may transmit the information (for example, address information) on the second external audio electronic device 2530 received after making the request for the same to the first external audio electronic device 2510 and/or a message making a request for establishing the communication link with the second external audio electronic device 2530 to the second electronic device 2570 as indicated by reference numeral 2501a. The second electronic device 2570 may make a request for the connection to establish the communication link to the second external audio electronic device 2530 on the basis of the information on the second external audio electronic device received from the first electronic device 2550 as indicated by reference numeral 2503b. The second electronic device 2570 and the second external audio electronic device 2530 may be connected after performing a connection process for establishing the communication link (for example, a paging operation and a pairing operation) and may establish a fourth communication link 2574. The second external audio electronic device 2530 may transmit information related to the fourth communication link established with the second electronic device 2570 to the first external audio electronic device 2510 through the first communication link 2571. The first external audio electronic device 2510 may monitor the fourth communication link as indicated by reference numeral 2511. The first external audio electronic device 2510 may monitor the fourth communication link on the basis of the information related to the fourth communication link received from the second external audio electronic device 2530 as indicated by reference numeral 2511.

As illustrated in FIG. 25C, the first electronic device 2550 may establish the third communication link 2573 with the second electronic device 2570. For example, the first external audio electronic device 2510 and the second external audio electronic device 2530 establish the first communication link, and the first electronic device 2550 may establish a third communication link 2573 with the second electronic device 2570 while the first external audio electronic device 2510 establishes the second communication link 2572 with the first electronic device 2550. Additionally or alternatively, the first electronic device 2550 may first establish the third communication link 2573 with the second electronic device 2570 and then establish the second communication link 2572 with the first external audio electronic device 2510.

When the third communication link 2573 with the second electronic device 2570 is established, the first electronic device 2550 may transmit information (for example, address information) on the second electronic device 2570 to the first external audio electronic device 2510 through the second communication link 2572 as indicated by reference numeral 2501b. The first external audio electronic device 2510 may receive the information on the second electronic device 2570 from the first electronic device 2550 and transmit the information on the second electronic device 2570 and/or a message making a request for establishing the communication link with the second electronic device to the second external audio electronic device 2530 through the first communication link 2571 as indicated by reference numeral 2503b. The second external audio electronic device 2530 may make a request for the connection to establish the communication link to the second electronic device 2570 on the basis of the information on the second electronic device 2570 received from the first external audio electronic device 2510 as indicated by reference numeral 2505b. The second external audio electronic device 2530 and the second electronic device 2570 may be connected after performing a connection process for establishing the communication link (for example, a paging operation and a pairing operation) and may establish a fourth communication link 2574. The second external audio electronic device 2530 may transmit information related to the fourth communication link established with the second electronic device 2570 to the first external audio electronic device 2510 through the first communication link 2571. The first external audio electronic device 2510 may monitor the fourth communication link 2574 as indicated by reference numeral 2511. The first external audio electronic device 2510 may monitor the fourth communication link 2574 on the basis of the information related to the fourth communication link received from the second external audio electronic device 2530 as indicated by reference numeral 2511.

Figure 26:
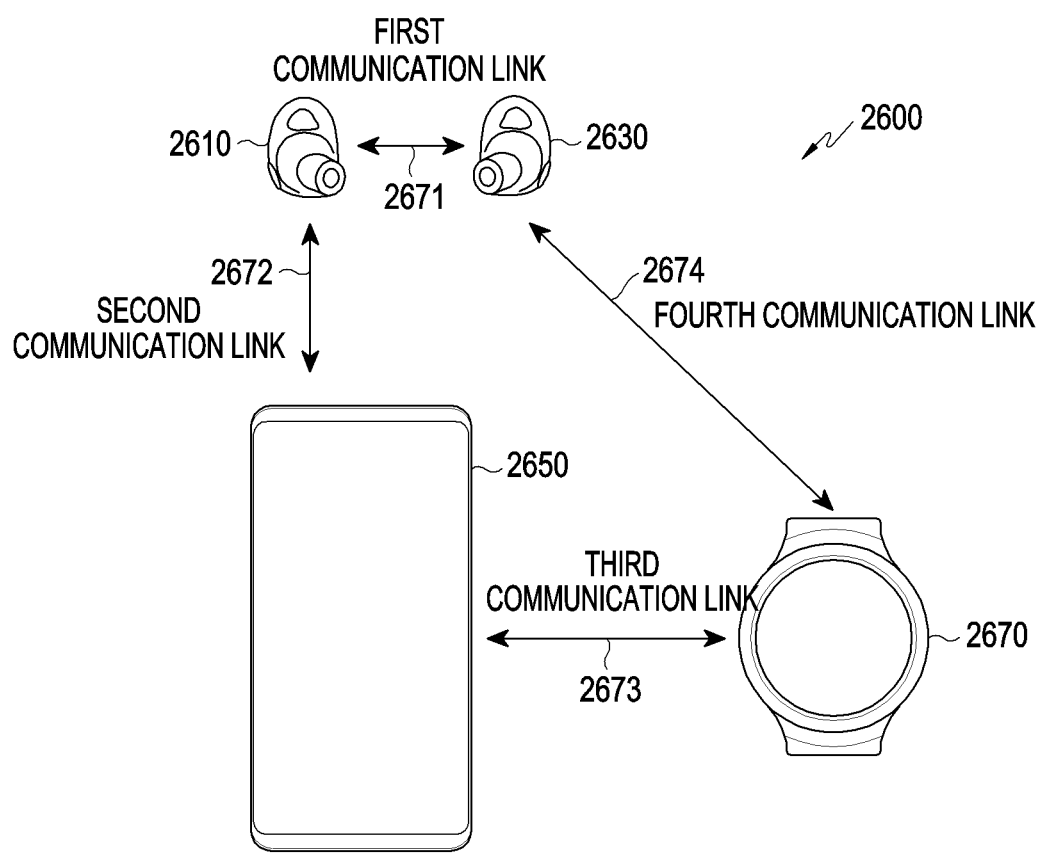
FIG. 26 illustrates a communication link management operation, according to an embodiment.

FIG. 26 is a diagram 2600 illustrating a communication link management operation, according to an embodiment.

Referring to FIG. 26, a main earbud 2610 (for example, the first external audio electronic device) and a sub earbud 2630 (for example, the second external audio electronic device) may establish a first communication link 2671. In the state in which a smartphone 2650 (for example, the first electronic device) establishes a second communication link 2672 with the main earbud 2610 (for example, the first external audio electronic device) performing a master function among a pair of earbuds, the smartphone 2650 and a watch phone 2670 (or a wearable device) (for example, the second electronic device) may establish a third communication link 2673 therebetween. The sub earbud 2630 may receive information (for example, address information) on the watch phone 2670 from the main earbud 2610.

The watch phone 2670 may receive information on the sub earbud 2630 from the smartphone 2650. The watch phone 2670 and the sub earbud 2630 (for example, the second external audio electronic device) may establish a fourth communication link 2674 therebetween by a request from the watch phone 2670 receiving information on the sub earbud 2630 or from the sub earbud 2630 receiving information on the watch phone 2670. Thereafter, when the user reproduces music through the smartphone 2650, the main earbud 2610 may receive music-related audio data through the second communication link 2672, the sub earbud 2630 for monitoring the second communication link 2672 may receive music-related audio data, and the main earbud 2610 and the sub earbud 2630 may be synchronized and output music. Alternatively, when the user reproduces music through the watch phone 2670, the sub earbud 2630 may receive music-related audio data through the fourth communication link 2674, the main earbud 2610 for monitoring the fourth communication link 2674 may receive music-related audio data, and the main earbud 2610 and the sub earbud 2630 may be synchronized and output music.

Figure 27A:
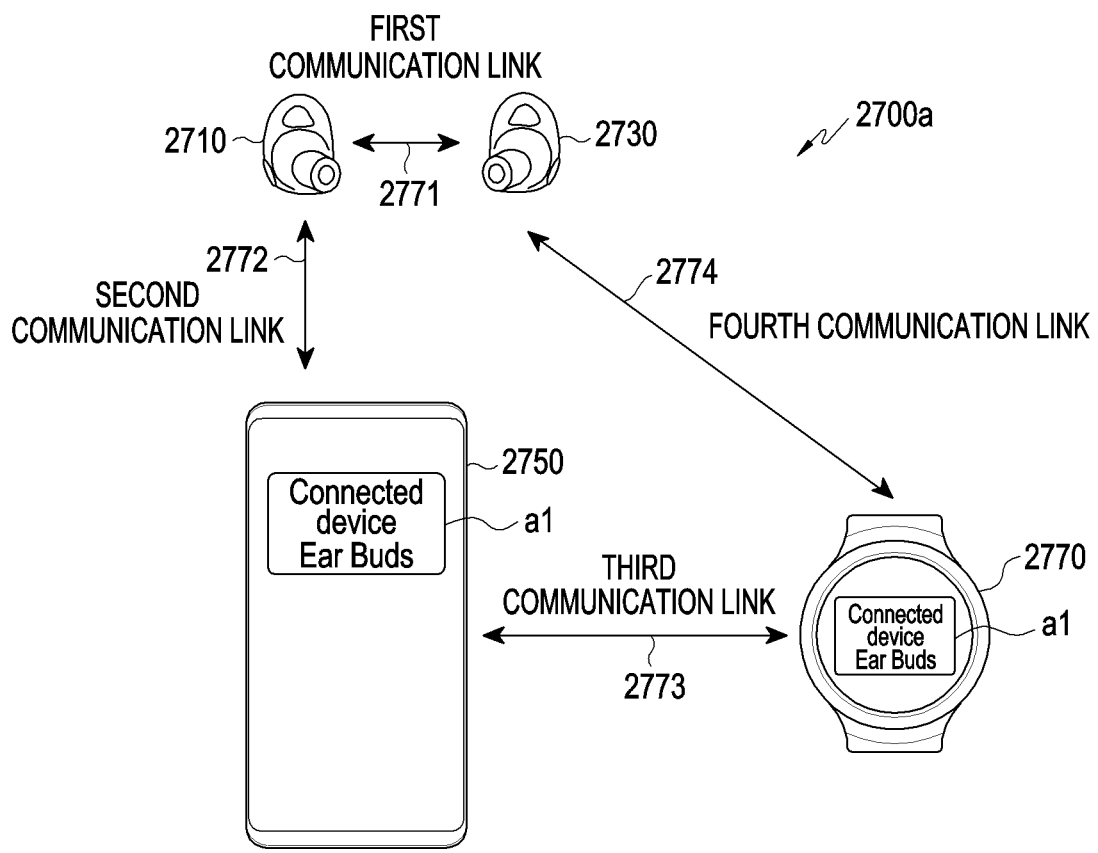
FIG. 27A illustrates a communication link management operation, according to an embodiment.
Figure 27B:
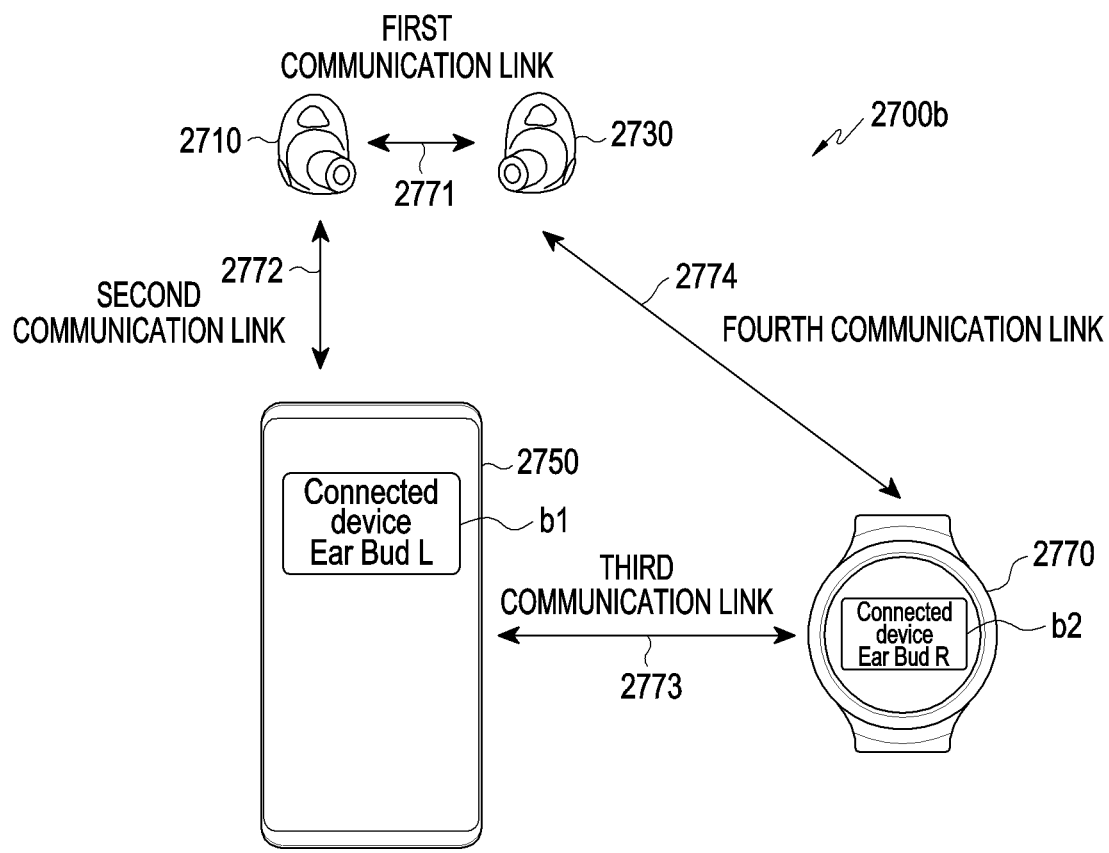
FIG. 27B illustrates a communication link management operation, according to an embodiment.

FIG. 27A is a diagram 2700a illustrating a communication link management operation, according to an embodiment. FIG. 27B is a diagram 2700b illustrating a communication link management operation, according to an embodiment.

Referring to FIG. 27A, a main earbud 2710 (for example, the first external audio electronic device) and a sub earbud 2730 (for example, the second external audio electronic device) may establish a first communication link 2771. A smartphone 2750 (for example, the first electronic device) may establish a second communication link 2772 with the main earbud 2710 (for example, the first external audio electronic device), and the smartphone 2750 and a watch phone (or a wearable device) 2770 (for example, the second electronic device) may establish a third communication link 2773. The watch phone 2770 may establish a fourth communication link 2774 with the sub earbud 2730 on the basis of information (for example, address information) on the sub earbud 2730 (for example, the second external audio electronic device) from the smartphone 2750 through the third communication link. Alternatively, the sub earbud 2730 may establish a fourth communication link 2774 with the watch phone 2770 on the basis of the information on the watch phone 2770 received from the main earbud 2710 through the first communication link.

The smartphone 2750 may receive information on the sub earbud 2730 from the main earbud 2710 through the second communication link 2772, the watch phone 2770 may receive information on the main earbud 2710 through the fourth communication link 2774, and each of the smartphone 2750 and the watch phone 2770 may display received information. For example, the smartphone 2750 and the watch phone 2770 may have the same name (al) configured in and displayed on a pair of earbuds 2710 and 2730.

Referring to FIG. 27B, the main earbud 2710 (for example, the first external audio electronic device) and the sub earbud 2730 (for example, the second external audio electronic device) may establish the first communication link 2771. The smartphone 2750 (for example, the first electronic device) may establish the second communication link 2772 with the main earbud 2710 (for example, the first external audio electronic device), and the smartphone 2750 may establish the third communication link 2773 with the watch phone 2770. The watch phone 2770 (for example, the second electronic device) may establish a fourth communication link 2774 with the sub earbud 2730 on the basis of information (for example, address information) on the sub earbud 2730 (for example, the second external audio electronic device) from the smartphone 2750 through the third communication link. Alternatively, the sub earbud 2730 may establish a fourth communication link 2774 with the watch phone 2770 on the basis of the information on the watch phone 2770 received from the main earbud 2710 through the first communication link.

The smartphone 2750 may receive information on the sub earbud 2730 from the main earbud 2710 through the second communication link 2772, the watch phone 2770 may receive information on the main earbud 2710 through the fourth communication link 2774, and the smartphone 2750 and the watch phone 2770 may display different pieces of information. For example, the smartphone 2750 may display information b1 indicating the main earbud as being L establishing the second communication link 2772, and the watch phone 2770 may display information b2 indicating the sub earbud as being R for establishing the fourth communication link 2774.

According to an embodiment, a method of managing a communication link of an audio electronic device may include an operation of establishing a first communication link with an external audio electronic device through a communication circuit of the audio electronic device, an operation of receiving data from a first external electronic device by monitoring a second communication link established between the external audio electronic device and the first external electronic device, and an operation of, when a right for a third communication link established between the external audio electronic device and a second external electronic device is given from the external audio electronic device, managing and/or maintaining the third communication link and transmitting and receiving data to and from the second external electronic device.

The method may further include an operation of, when the first communication link is established, configuring the external audio electronic device as a main audio electronic device serving as a master and configuring the audio electronic device as a sub audio electronic device serving as a slave.

The operation of monitoring the second communication link may include an operation of monitoring the second communication link, based on second communication link connection-related information received from the external audio electronic device.

The operation of managing and/or maintaining the third communication link may include an operation of, when the audio electronic device satisfies a condition for changing an entity of the right for the third communication link, receiving a request for changing the entity of the right for the third communication link from the external audio electronic device and managing and/or maintaining the third communication link.

The condition for changing the entity of the right for the communication link may include at least one of communication quality information of the audio electronic device and/or the external audio electronic device, state information, a connection state of communication with a plurality of external electronic devices, or a user selection.

The method may further include an operation of, when the audio electronic device operating as the entity of the right for the third communication link does not satisfy the condition for changing the entity of the right for the third communication link, returning the right for the third communication link to the external audio electronic device, monitoring the third communication link, and receiving data from the second external electronic device.

The method may further include an operation of, when a specific event is received from the second external electronic device and a condition for processing the specific event is not satisfied, returning the right for the third communication link to the external audio electronic device, monitoring the third communication link, and receiving data from the second external electronic device.

The method may further include an operation of, when a specific event is received from the second external electronic device and a condition for processing the specific event is satisfied, allowing the audio electronic device to maintain the right for the third communication link and process the specific event.

The method may further include an operation of transmitting and receiving a packet message for maintaining the third communication link to and from the second external electronic device through the third communication link.

The method may further include an operation of transmitting a response message indicating whether data transmitted from the second external electronic device through the third communication link is normally received to the second external electronic device.

The method may further include an operation of, when the external audio electronic device does not monitor the third communication link and data is received from the second external electronic device through the third communication link, informing, through the first communication link, the external audio electronic device of reception of the data through the third communication link.

The method may further include an operation of, when the right for the third communication link is withdrawn from the external audio electronic device and a right for the second communication link is given while the third communication link is managed and/or maintained, returning the right for the third communication link to the external audio electronic device, monitoring the third communication link to receive data from the second external electronic device, managing and/or maintaining the second communication link, and transmitting and receiving data to and from the first external electronic device.

The method may further include an operation of, when a right for the second communication link is given from the external audio electronic device while the third communication link is managed and/or maintained, managing and/or maintaining the third communication link and managing and/or maintaining the second communication link.

According to an embodiment, a method of managing a communication link of an audio electronic device may include an operation of establishing a first communication link with an external audio electronic device through a communication circuit of the external audio electronic device, an operation of establishing a second communication link with a first external electronic device and transmitting second communication link connection-related information associated with the second communication link to the external audio electronic device through the first communication link, an operation of establishing a third communication link with a second external electronic device and transmitting third communication link connection-related information associated with the third communication link to the external audio electronic device through the first communication link, an operation of receiving information on the external audio electronic device through the first communication link and determining whether to give a right for the second communication link, based on the received information, and an operation of giving the right for the second communication link to the external audio electronic device, based on the identification, and monitoring the second communication link.

The operation of determining whether to give the right for the second communication link may further include an operation of, when the information on the external audio electronic device matches a condition for changing an entity of the right for the second communication link, giving the right for the second communication link to the external audio electronic device.

According to an embodiment, a method of managing a communication link of an electronic device may include an operation of establishing a first communication link with an external electronic device through a communication circuit of the electronic device, an operation of receiving information on an audio electronic device from the external electronic device through the first communication link, and an operation of establishing a second communication link with the audio electronic device, based on the received information on the audio electronic device.

The information on the audio electronic device may include address information of the audio electronic device.

According to an embodiment, a method of managing a communication link of an audio electronic device may include an operation of establishing a first communication link with an external audio electronic device through a communication circuit of the audio electronic device, an operation of monitoring a second communication link established between the external audio electronic device and a first external electronic device from the external audio electronic device through the first communication link and receiving data from the first external electronic device, an operation of receiving information on a second external electronic device establishing a third communication link with the first external electronic device through the first communication link, and an operation of establishing a fourth communication link with the second external electronic device, based on the received information on the second external electronic device.

The operation of monitoring the second communication link may include an operation of receiving connection information related to the second communication link from the external audio electronic device and an operation of monitoring the second communication link, based on the received connection information related to the second communication link.

According to various embodiments, the method may further include an operation of transmitting connection information related to the fourth communication link to the external audio electronic device through the first communication link.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A storage medium storing instructions is provided. The instructions may be configured to cause at least one processor to, when executed by the at least one processor, perform at least one operation. The at least one operation may include an operation of establishing a first communication link with an external audio electronic device through a communication circuit, an operation of monitoring a second communication link established between the external audio electronic device and a first external electronic device and receiving data from the first external electronic device, and an operation of, when a right for a third communication link established between the external audio electronic device and a second external electronic device is given from the external audio electronic device, managing and/or maintaining the third communication link and transmitting and receiving data to and from the second external electronic device.

Embodiments of the disclosure provide specific examples only to assist in describing the technology according to embodiments of the disclosure, and do not limit the scope of the embodiments of the disclosure. Therefore, the scope of various embodiments of the disclosure should be construed to include that all modifications or modified forms derived from the technical idea of various embodiments of the disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An audio electronic device comprising:
   a first audio electronic device; and
   a second audio electronic device,
   wherein the first audio electronic device is configured to:
   establish a first communication link between the first audio electronic device and the second audio electronic device;
   establish a second communication link between the first audio electronic device and a first external electronic device; and
   establish a third communication link established between the first audio electronic device and a second external electronic device, and
   wherein the second audio electronic device is configured to:
   receive data transmitted between the first audio electronic device and the first external electronic device through the second communication link by monitoring the second communication link;
   when a condition for changing an entity of a right for the third communication link satisfied, manage and maintain the third communication link; and
   transmit and receive data to and from the second external electronic device through the third communication link while the second audio electronic device monitors the third communication link.

2. The audio electronic device of claim 1, wherein, when the first communication link is established, the second audio electronic device is further configured to set the first audio electronic device as a main audio electronic device serving as a master and set the second audio electronic device as a sub audio electronic device serving as a slave.

3. The audio electronic device of claim 1, wherein the second audio electronic device is further configured to monitor the second communication link, based on second communication link connection-related information received from the first audio electronic device.

4. The audio electronic device of claim 1, wherein, when the second audio electronic device satisfies the condition for changing the entity of the right for the third communication link, the second audio electronic device is further configured to receive a request for changing the entity of the right for the third communication link from the first audio electronic device and manage and or maintain the third communication link.

5. The audio electronic device of claim 4, wherein the condition for changing the entity of the right for communication link includes at least one of communication quality information of the second audio electronic device or the first audio electronic device, state information, a connection state of communication with a plurality of external electronic devices, or a user selection.

6. The audio electronic device of claim 1, wherein, when the second audio electronic device operating as the entity of the right for the third communication link does not satisfy the condition for changing the entity of the right for the third communication link, the second audio electronic device is further configured to return the right for the third communication link to the first audio electronic device, monitor the third communication link, and receive data from the second external electronic device.

7. The audio electronic device of claim 1, wherein, when a specific event is received from the second external electronic device and a condition for processing the specific event is not satisfied, the second audio electronic device is further configured to return the right for the third communication link to the first audio electronic device, monitor the third communication link, and receive data from the second external electronic device.

8. The audio electronic device of claim 1, wherein, when a specific event is received from the second external electronic device and a condition for processing the specific event is satisfied, the second audio electronic device is further configured to maintain the right for the third communication link and process the specific event.

9. The audio electronic device of claim 1, wherein the second audio electronic device is further configured to transmit and receive a packet message for maintaining the third communication link to and from the second external electronic device through the third communication link.

10. The audio electronic device of claim 1, wherein the second audio electronic device is further configured to transmit a response message indicating whether data transmitted from the second external electronic device through the third communication link is normally received to the second external electronic device.

11. The audio electronic device of claim 1, wherein, when the first audio electronic device does not monitor the third communication link and data is received from the second external electronic device through the third communication link, the second audio electronic device is further configured to inform, through the first communication link, the first audio electronic device of reception of the data through the third communication link.

12. The audio electronic device of claim 1, wherein, when the right for the third communication link is withdrawn from the first audio electronic device and a right for the second communication link is given while the third communication link is managed and maintained, the second audio electronic device is further configured to return the right for the third communication link to the first audio electronic device, monitor the third communication link to receive data from the second external electronic device, manage or maintain the second communication link, transmit, and receive data to and from the first external electronic device.

13. The audio electronic device of claim 1, wherein, when a right for the second communication link is given from the first audio electronic device while the third communication link is managed and maintained, the second audio electronic device is further configured to manage and maintain the third communication link and manage and maintain the second communication link.

* * * * *